US012614144B2

(12) United States Patent (10) Patent No.: US 12,614,144 B2

Nagashima et al. (45) Date of Patent: Apr. 28, 2026

(54) INFORMATION PROCESSING SYSTEM, INFORMATION PROCESSING DEVICE, AND METHOD

(71) Applicant: Rakuten Group, Inc., Tokyo (JP)

(72) Inventors: Tomohide Nagashima, Tokyo (JP); Toshiaki Tazume, Tokyo (JP); Yusuke Aso, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 422 days.

(21) Appl. No.: 17/733,122

(22) Filed: Apr. 29, 2022

(65) Prior Publication Data

US 2022/0351129 A1 Nov. 3, 2022

(30) Foreign Application Priority Data

Apr. 30, 2021 (JP) ................................. 2021-077757

(51) Int. Cl.
*G06Q 10/0833* (2023.01)
*B65G 1/06* (2006.01)
*B65G 1/137* (2006.01)

(52) U.S. Cl.
CPC ........... *G06Q 10/0833* (2013.01); *B65G 1/06* (2013.01); *B65G 1/1371* (2013.01); *B65G 2201/0202* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| 9,552,564 | B1 * | 1/2017 | Martenis | ............ | G07C 9/00571 |
| 10,043,149 | B1 * | 8/2018 | Iacono | ............... | G06Q 30/0637 |

(Continued)

FOREIGN PATENT DOCUMENTS

| JP | 2018-151923 A | 9/2018 |
| JP | 2020-9354 A | 1/2020 |

(Continued)

OTHER PUBLICATIONS

Bakshi, Soovadeep, et al. "A fast algorithm on minimum-time scheduling of an autonomous ground vehicle using a traveling salesman framework." Journal of Dynamic Systems, Measurement, and Control 140.12 (2018): 121011. (Year: 2018).*

(Continued)

*Primary Examiner* — Emmett K. Walsh

(74) *Attorney, Agent, or Firm* — Sughrue Mion, PLLC

(57) ABSTRACT

An information processing system includes at least one memory storing program code and at least one processor. The program code is configured to, when it is detected that a user has accessed the information processing system, cause the at least one processor to, when one or more of a plurality of storage boxes are vacant, extract a vicinity route having an end point located at a delivery destination of the user or within a vicinity of the delivery destination from among delivery routes of transportable objects stored in one or more of the plurality of storage boxes and cause the at least one processor to identify a pickup point at which a delivery vehicle is able to pick up a transportable object before the delivery vehicle reaches the end point of the extracted vicinity route.

19 Claims, 29 Drawing Sheets

(56)  References Cited

U.S. PATENT DOCUMENTS

| | | | |
|---|---|---|---|
| 11,055,655 B1 * | 7/2021 | Neumann ........ | G06Q 10/08355 |
| 2015/0242810 A1 * | 8/2015 | Rifai ................. | G06Q 10/0834 |
| | | | 705/26.81 |
| 2018/0240045 A1 * | 8/2018 | Zhang ................... | G06Q 50/40 |
| 2019/0004539 A1 | 1/2019 | Yu et al. | |

FOREIGN PATENT DOCUMENTS

| | | |
|---|---|---|
| JP | 2020-179984 A | 11/2020 |
| WO | 2019/238865 A1 | 12/2019 |

OTHER PUBLICATIONS

Tadashi Nezu, "Is Uber Eats Outdated? Robot Delivers Dishes to Garden", Nikkei xTech, Jun. 24, 2020, Nikkei Business Publications, Inc. (5 pages total).

* cited by examiner

Figure 4:
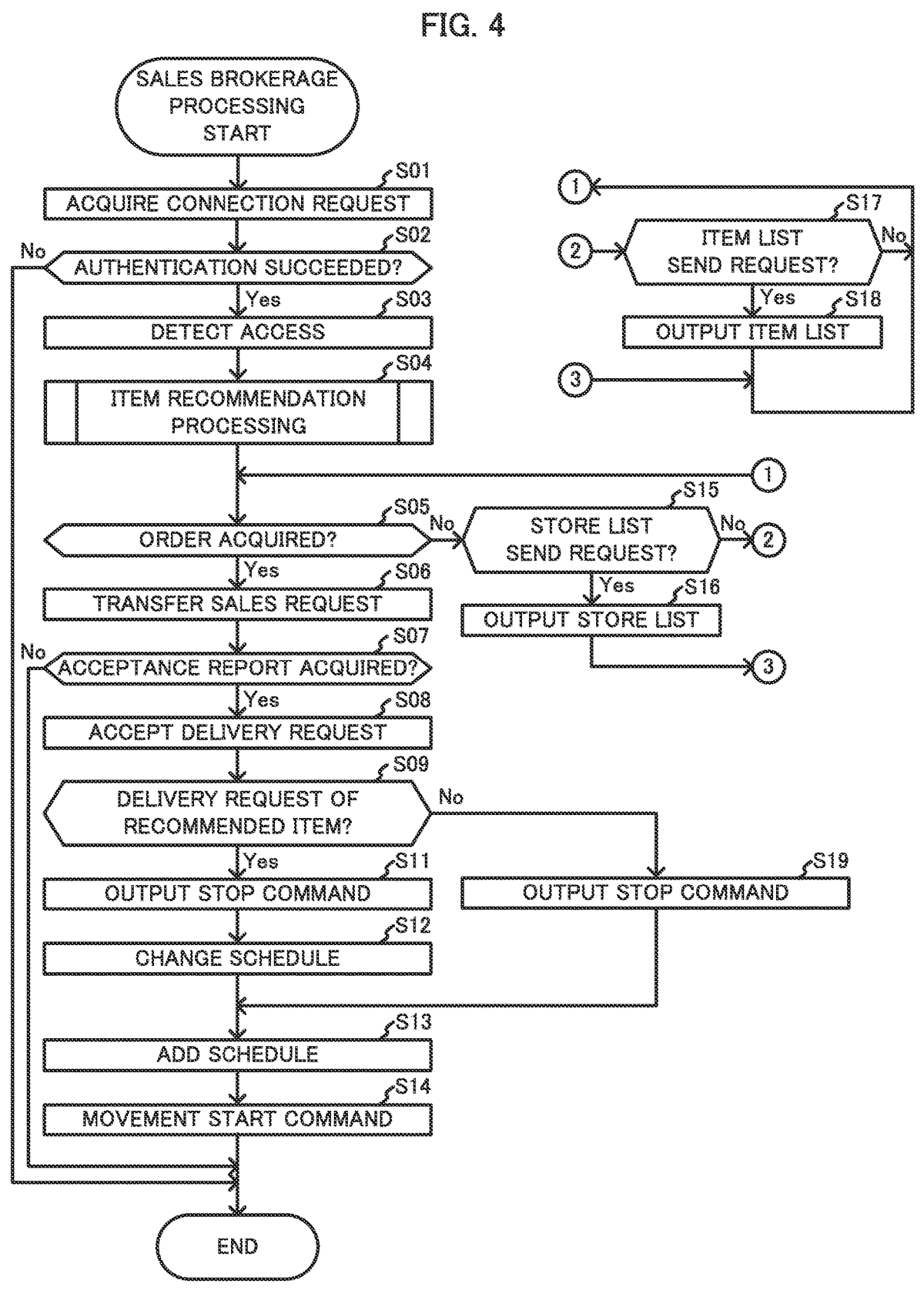

SALES BROKERAGE
PROCESSING
START

S01
ACQUIRE CONNECTION REQUEST

S02
AUTHENTICATION SUCCEEDED? — No

Yes

S03
DETECT ACCESS

S04
ITEM RECOMMENDATION
PROCESSING

S05
ORDER ACQUIRED? — No

Yes

S06
TRANSFER SALES REQUEST

S07
ACCEPTANCE REPORT ACQUIRED? — No

Yes

S08
ACCEPT DELIVERY REQUEST

S09
DELIVERY REQUEST OF
RECOMMENDED ITEM? — No

Yes

S11
OUTPUT STOP COMMAND

S12
CHANGE SCHEDULE

S13
ADD SCHEDULE

S14
MOVEMENT START COMMAND

END

S19
OUTPUT STOP COMMAND

S15
STORE LIST
SEND REQUEST? — No ②

Yes

S16
OUTPUT STORE LIST

③

①

S17
ITEM LIST
SEND REQUEST? — No

②

Yes

S18
OUTPUT ITEM LIST

USER TABLE

| USER ID | PASSWORD | DELIVERY DESTINATION |
|---------|----------|----------------------|
| U1 | **** | SETAGAYA-KU, TOKYO |
| U2 | **** | CHIYODA-KU, TOKYO |
| U3 | **** | CHUO-KU, TOKYO |
| U4 | **** | MINATO-KU, TOKYO |
| ... | **** | ... |

FIG. 7

SCHEDULE TABLE

| | DELIVERY VEHICLE ID | BOX ID | STATE | ITEM ID | USER ID | PICKUP SCHEDULE | | | DELIVERY SCHEDULE | | |
|---|---|---|---|---|---|---|---|---|---|---|---|
| | | | | | | PICKUP POINT | PICKUP ROUTE | STAGE NUMBER | DELIVERY DESTINATION | DELIVERY ROUTE | STAGE NUMBER |
| 1 | 400 | 1 | STORING STATE | I11 | U1 | G1 (···) | S4G1 | NULL | D1 (···) | G1D1 | 1 |
| 2 | 400 | 2 | VACANT STATE | NULL | NULL | NULL | NULL | NULL | NULL | NULL | NULL |
| 3 | 400 | 3 | VACANT STATE | NULL | NULL | NULL | NULL | NULL | NULL | NULL | NULL |
| 4 | 400 | 4 | VACANT STATE | NULL | NULL | NULL | NULL | NULL | NULL | NULL | NULL |
| 5 | 500 | 1 | RESERVED STATE | I33 | U3 | G3 (···) | S5G3 | 1 | D3 (···) | G3D3 | 2 |
| 6 | 500 | 2 | VACANT STATE | NULL | NULL | NULL | NULL | NULL | NULL | NULL | NULL |
| 7 | 500 | 3 | VACANT STATE | NULL | NULL | NULL | NULL | NULL | NULL | NULL | NULL |
| 8 | 500 | 4 | VACANT STATE | NULL | NULL | NULL | NULL | NULL | NULL | NULL | NULL |

FIG. 8

STORE TABLE

| STORE ID | NAME | LOCATION OF PICKUP POINT |
|---|---|---|
| S1 | SUPERMARKET S1 | G1 (···) |
| S2 | RESTAURANT S2 | G2 (···) |
| S3 | RESTAURANT S3 | G3 (···) |
| S4 | TEA ROOM S4 | G4 (···) |
| S5 | TAVERN S5 | G5 (···) |
| ... | ... | ... |

FIG. 9

ITEM TABLE

| STORE ID | ITEM ID | NAME | PREPARATION TIME |
|---|---|---|---|
| S1 | I11 | TOMATO | 5 MIN |
| S1 | I12 | BREAD | 5 MIN |
| ... | ... | ... | ... |
| S2 | I21 | STEAK | 30 MIN |
| S2 | I22 | HAMBURGER | 15 MIN |
| S2 | I23 | RAMEN NOODLES | 15 MIN |
| ... | ... | ... | ... |
| S3 | I31 | ICE CREAM | 5 MIN |
| S3 | I32 | SOUP SERVED COLD | 5 MIN |
| ... | ... | ... | ... |
| S4 | I41 | COFFEE | 5 MIN |
| ... | ... | ... | ... |
| S5 | I51 | BEER | 5 MIN |
| ... | ... | ... | ... |

FIG. 10

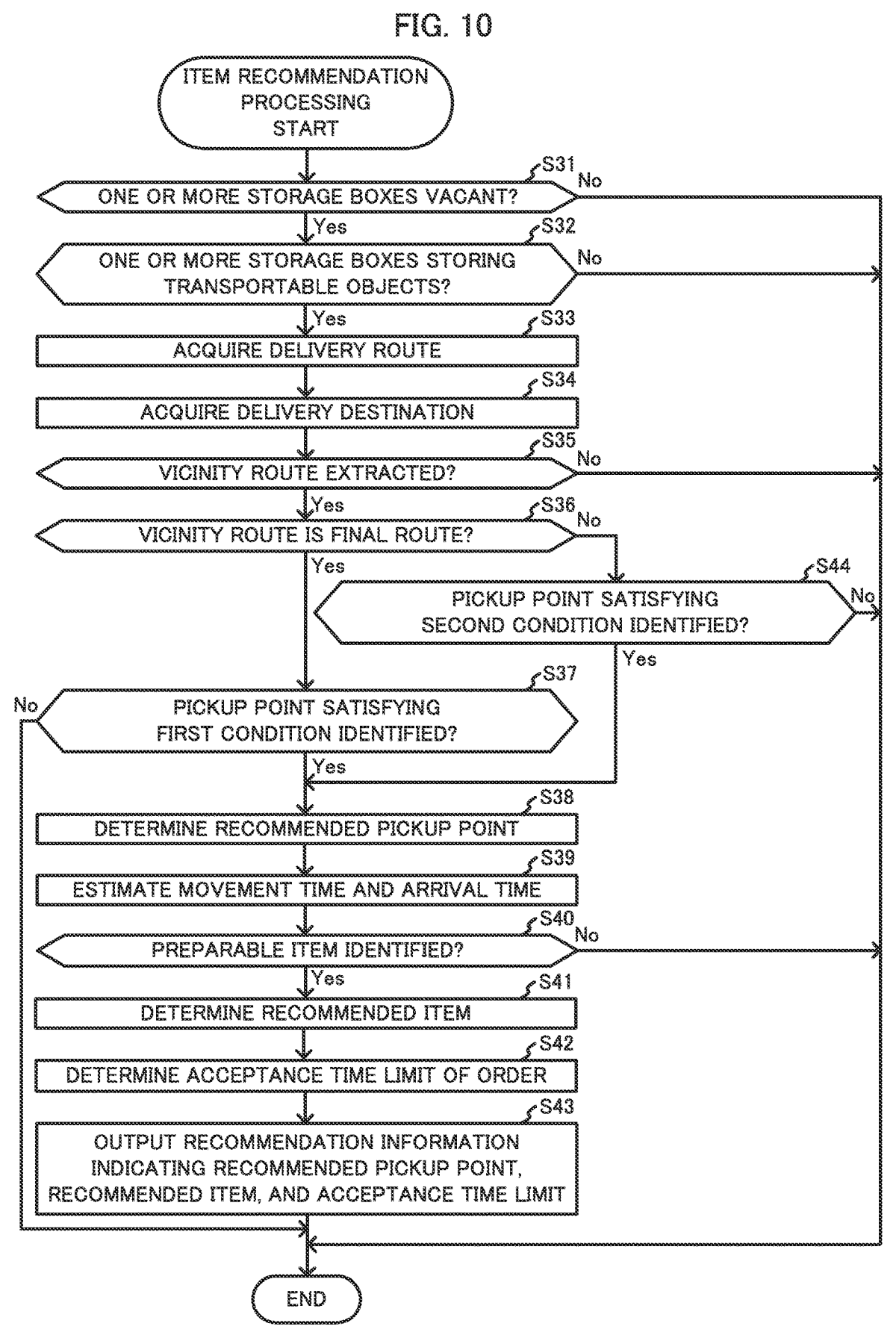

ITEM RECOMMENDATION
PROCESSING
START

S31   No
ONE OR MORE STORAGE BOXES VACANT?

Yes

S32   No
ONE OR MORE STORAGE BOXES STORING
TRANSPORTABLE OBJECTS?

Yes

S33
ACQUIRE DELIVERY ROUTE

S34
ACQUIRE DELIVERY DESTINATION

S35   No
VICINITY ROUTE EXTRACTED?

Yes

S36   No
VICINITY ROUTE IS FINAL ROUTE?

Yes

S44   No
PICKUP POINT SATISFYING
SECOND CONDITION IDENTIFIED?

Yes

No   S37
PICKUP POINT SATISFYING
FIRST CONDITION IDENTIFIED?

Yes

S38
DETERMINE RECOMMENDED PICKUP POINT

S39
ESTIMATE MOVEMENT TIME AND ARRIVAL TIME

S40   No
PREPARABLE ITEM IDENTIFIED?

Yes

S41
DETERMINE RECOMMENDED ITEM

S42
DETERMINE ACCEPTANCE TIME LIMIT OF ORDER

S43
OUTPUT RECOMMENDATION INFORMATION
INDICATING RECOMMENDED PICKUP POINT,
RECOMMENDED ITEM, AND ACCEPTANCE TIME LIMIT

END

FIG. 15

SCHEDULE TABLE

| | DELIVERY VEHICLE ID | BOX ID | STATE | ITEM ID | USER ID | PICKUP SCHEDULE | | | DELIVERY SCHEDULE | | |
|---|---|---|---|---|---|---|---|---|---|---|---|
| | | | | | | PICKUP POINT | PICKUP ROUTE | STAGE NUMBER | DELIVERY DESTINATION | DELIVERY ROUTE | STAGE NUMBER |
| 1 | 400 | 1 | STORING STATE | I11 | U1 | G1 (···) | S4G1 | NULL | D1 (···) | GXD1 | 2 |
| 2 | 400 | 2 | RESERVED STATE | I22 | U2 | G2 (···) | TGX | 1 | D2 (···) | D1D2 | 3 |
| 3 | 400 | 3 | VACANT STATE | NULL | NULL | NULL | NULL | NULL | NULL | NULL | NULL |
| 4 | 400 | 4 | VACANT STATE | NULL | NULL | NULL | NULL | NULL | NULL | NULL | NULL |
| 5 | 500 | 1 | RESERVED STATE | I33 | U3 | G3 (···) | S5G3 | 1 | D3 (···) | G3D3 | 2 |
| 6 | 500 | 2 | VACANT STATE | NULL | NULL | NULL | NULL | NULL | NULL | NULL | NULL |
| 7 | 500 | 3 | VACANT STATE | NULL | NULL | NULL | NULL | NULL | NULL | NULL | NULL |
| 8 | 500 | 4 | VACANT STATE | NULL | NULL | NULL | NULL | NULL | NULL | NULL | NULL |

FIG. 17

SCHEDULE TABLE

| | DELIVERY VEHICLE ID | BOX ID | STATE | ITEM ID | USER ID | PICKUP SCHEDULE | | | DELIVERY SCHEDULE | | |
|---|---|---|---|---|---|---|---|---|---|---|---|
| | | | | | | PICKUP POINT | PICKUP ROUTE | STAGE NUMBER | DELIVERY DESTINATION | DELIVERY ROUTE | STAGE NUMBER |
| 1 | 400 | 1 | STORING STATE | I11 | U1 | G1 (···) | S4G1 | NULL | D1 (···) | GXD1 | 1 |
| 2 | 400 | 2 | STORING STATE | I22 | U2 | G2 (···) | TGX | NULL | D2 (···) | D1D2 | 2 |
| 3 | 400 | 3 | VACANT STATE | NULL | NULL | NULL | NULL | NULL | NULL | NULL | NULL |
| 4 | 400 | 4 | VACANT STATE | NULL | NULL | NULL | NULL | NULL | NULL | NULL | NULL |
| 5 | 500 | 1 | RESERVED STATE | I33 | U3 | G3 (···) | S5G3 | 1 | D3 (×·×) | G3D3 | 2 |
| 6 | 500 | 2 | VACANT STATE | NULL | NULL | NULL | NULL | NULL | NULL | NULL | NULL |
| 7 | 500 | 3 | VACANT STATE | NULL | NULL | NULL | NULL | NULL | NULL | NULL | NULL |
| 8 | 500 | 4 | VACANT STATE | NULL | NULL | NULL | NULL | NULL | NULL | NULL | NULL |

FIG. 18

SCHEDULE TABLE

| | DELIVERY VEHICLE ID | BOX ID | STATE | ITEM ID | USER ID | PICKUP SCHEDULE | | | DELIVERY SCHEDULE | | |
|---|---|---|---|---|---|---|---|---|---|---|---|
| | | | | | | PICKUP POINT | PICKUP ROUTE | STAGE NUMBER | DELIVERY DESTINATION | DELIVERY ROUTE | STAGE NUMBER |
| 1 | 400 | 1 | VACANT STATE | NULL | NULL | NULL | NULL | NULL | NULL | NULL | NULL |
| 2 | 400 | 2 | STORING STATE | I22 | U2 | G2 ( ·· ) | TGX | NULL | D2 ( ·· ) | D1D2 | 1 |
| 3 | 400 | 3 | VACANT STATE | NULL | NULL | NULL | NULL | NULL | NULL | NULL | NULL |
| 4 | 400 | 4 | VACANT STATE | NULL | NULL | NULL | NULL | NULL | NULL | NULL | NULL |
| 5 | 500 | 1 | RESERVED STATE | I33 | U3 | G3 ( ·· ) | S5G3 | 1 | D3 ( ·· ) | G3D3 | 2 |
| 6 | 500 | 2 | VACANT STATE | NULL | NULL | NULL | NULL | NULL | NULL | NULL | NULL |
| 7 | 500 | 3 | VACANT STATE | NULL | NULL | NULL | NULL | NULL | NULL | NULL | NULL |
| 8 | 500 | 4 | VACANT STATE | NULL | NULL | NULL | NULL | NULL | NULL | NULL | NULL |

FIG. 21

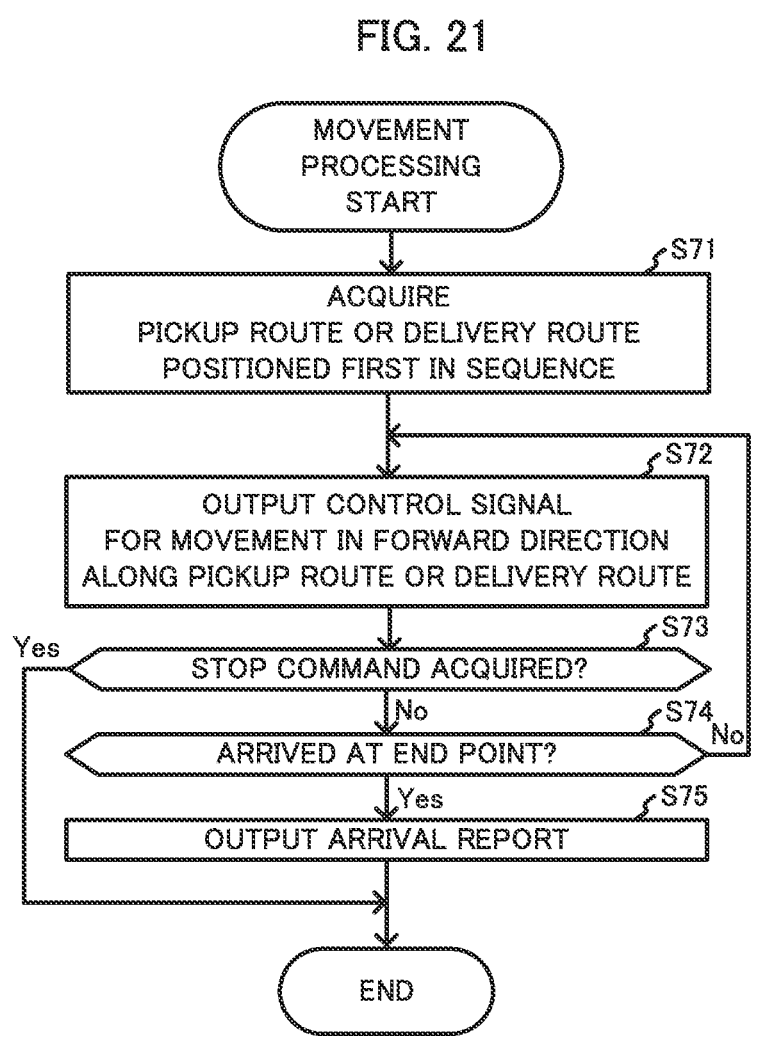

```
        ┌─────────────────┐
        │    MOVEMENT     │
        │   PROCESSING    │
        │     START       │
        └────────┬────────┘
                 │                                    ┌S71
        ┌────────▼─────────────────────────────┐
        │             ACQUIRE                   │
        │  PICKUP ROUTE OR DELIVERY ROUTE       │
        │    POSITIONED FIRST IN SEQUENCE       │
        └────────┬─────────────────────────────┘
                 │                                    ┌S72
        ┌────────▼─────────────────────────────┐
        │      OUTPUT CONTROL SIGNAL            │
        │  FOR MOVEMENT IN FORWARD DIRECTION    │
        │ ALONG PICKUP ROUTE OR DELIVERY ROUTE  │
        └────────┬─────────────────────────────┘
                 │                                    ┌S73
  Yes   ◄────────┤   STOP COMMAND ACQUIRED?    ►
                 │No                                  ┌S74   No
                 ◄───   ARRIVED AT END POINT?  ───────►
                 │Yes                                 ┌S75
        ┌────────▼─────────────────────────────┐
        │       OUTPUT ARRIVAL REPORT           │
        └────────┬─────────────────────────────┘
                 │
        ┌────────▼────────┐
        │      END        │
        └─────────────────┘
```

FIG. 22

FIG. 29
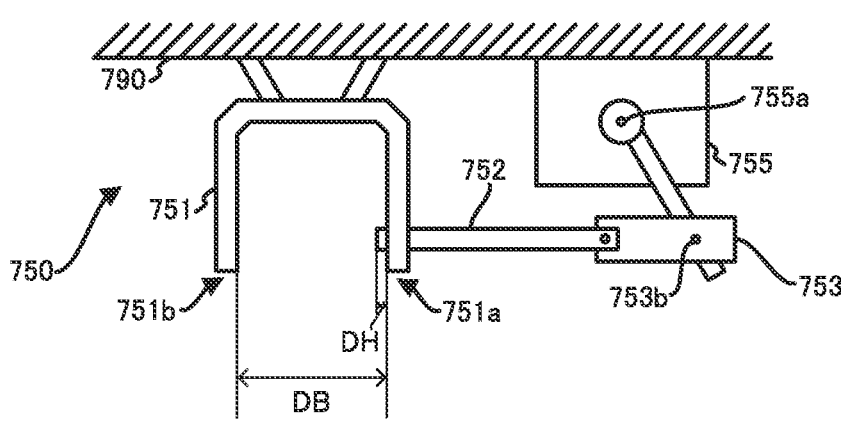
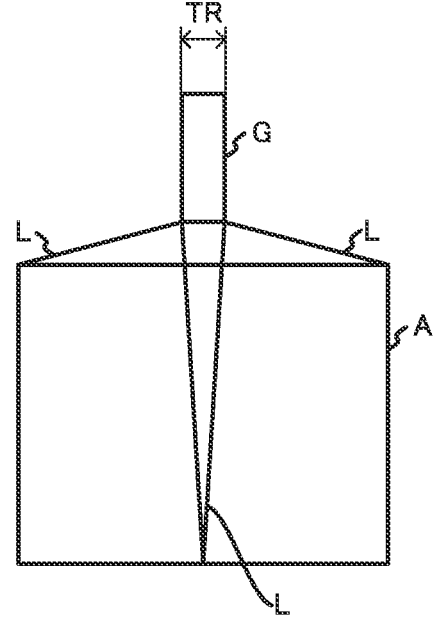

INFORMATION PROCESSING SYSTEM, INFORMATION PROCESSING DEVICE, AND METHOD

CROSS-REFERENCE TO RELATED APPLICATION

This application claims the benefit of Japanese Patent Application No. 2021-077757, filed on Apr. 30, 2021, the entire disclosure of which is incorporated by reference herein.

FIELD

This application relates generally to an information processing system, an information processing device, and a method.

BACKGROUND

Conventionally, a system that, when accepting a delivery request of a transportable object, causes, for example, a delivery vehicle including a delivery robot to move to a pickup point of the transportable object the delivery of which is requested has been known (for example, Unexamined Japanese Patent Application Publication No. 2018-151923).

SUMMARY

However, there has been a problem in that a system disclosed in Unexamined Japanese Patent Application Publication No. 2018-151923 only picks up the transportable object at a predetermined point and cannot identify a pickup point that enables delivery efficiency to be improved.

Accordingly, the present disclosure has been made in consideration of the above-described problem, and an objective of the present disclosure is to provide an information processing system, an information processing device, and a method that are capable of identifying a pickup point of a transportable object that enables delivery efficiency to be improved.

In order to achieve the above-described objective, an information processing system according to a first aspect of the present disclosure is an information processing system including:

at least one memory storing program code; and at least one processor configured to access the program code and operate as instructed by the program code, wherein the program code includes:

control code configured to cause the at least one processor to, when a delivery request of a transportable object is accepted, perform control to cause a delivery vehicle having a plurality of storage boxes to deliver the transportable object;

acquisition code configured to cause the at least one processor to, when it is detected that a user has accessed the information processing system, acquire a delivery destination set or estimated with respect to the user;

extraction code configured to cause the at least one processor to, when one or more of the plurality of storage boxes are vacant, extract a vicinity route having an end point located at the acquired delivery destination of the user or within a vicinity of the delivery destination from among delivery routes of transportable objects stored in one or more of the plurality of storage boxes; and identification code configured to cause the at least one processor to identify a pickup point at which the delivery vehicle is able to pick up a transportable object before the delivery vehicle reaches the end point of the extracted vicinity route.

BRIEF DESCRIPTION OF THE DRAWINGS

A more complete understanding of this application can be obtained when the following detailed description is considered in conjunction with the following drawings, in which:

FIG. 3 is a hardware configuration diagram illustrating a configuration example of an information processing device;

FIG. 4 is a flowchart illustrating an example of sales brokerage processing that the information processing device executes;

FIG. 6 is a diagram illustrating an example of a user table that the information processing device stores;

FIG. 7 is a diagram illustrating an example of a schedule table that the information processing device stores before acceptance of an order;

FIG. 8 is a diagram illustrating an example of a store table that the information processing device stores;

FIG. 9 is a diagram illustrating an example of an item table that the information processing device stores;

FIG. 10 is a flowchart illustrating an example of item recommendation processing that the information processing device executes;

FIG. 15 is a diagram illustrating an example of the schedule table that the information processing device stores after acceptance of an order of a second user;

FIG. 17 is a diagram illustrating an example of the schedule table that the information processing device stores after a delivery vehicle has arrived at a recommended pickup point;

FIG. 18 is a diagram illustrating an example of the schedule table that the information processing device stores after the delivery vehicle has arrived at a delivery destination of a first user;

FIG. 21 is a flowchart illustrating an example of movement processing that the delivery vehicle executes;

FIG. 22 is a hardware configuration diagram illustrating a configuration example of a terminal device;

FIG. 29 is a diagram illustrating an example of the hook in an unlocked state that the delivery vehicle includes.

DETAILED DESCRIPTION

Embodiment

Hereinafter, an embodiment of the present disclosure is described with reference to the drawings.

Figure 1:
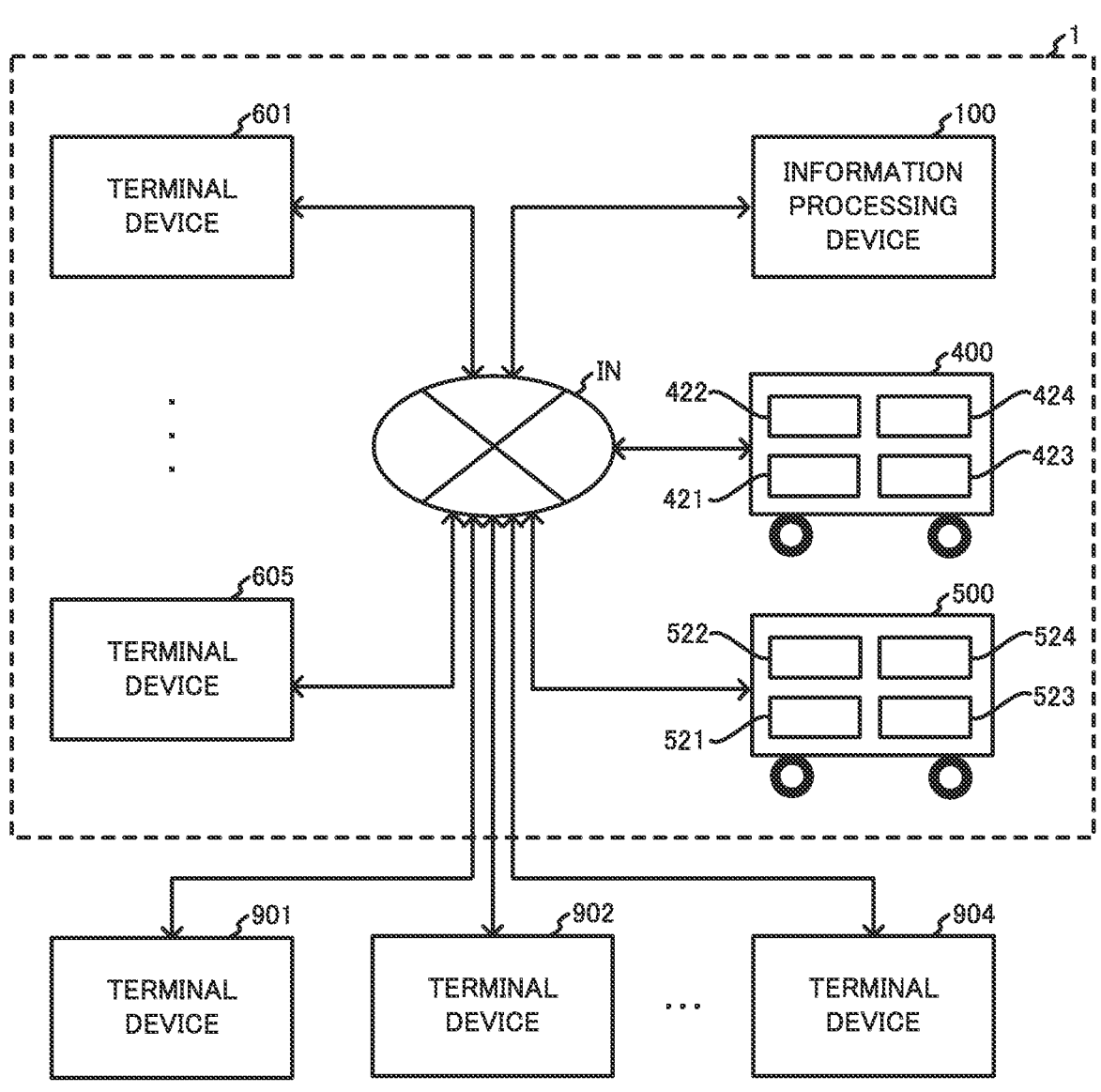
FIG. 1 is a system configuration diagram illustrating a configuration example of an information processing system according to an embodiment of the present disclosure.

An information processing system 1 according to the embodiment of the present disclosure includes an information processing device 100, as illustrated in FIG. 1, that accepts a delivery request requesting delivery of a transportable object. The information processing system 1 also includes delivery vehicles 400 and 500 that deliver a transportable object requested to be delivered. The delivery vehicle 400 includes storage boxes 421 to 424, each of which is capable of storing a transportable object, and the delivery vehicle 500 includes storage boxes 521 to 524.

Figure 2:
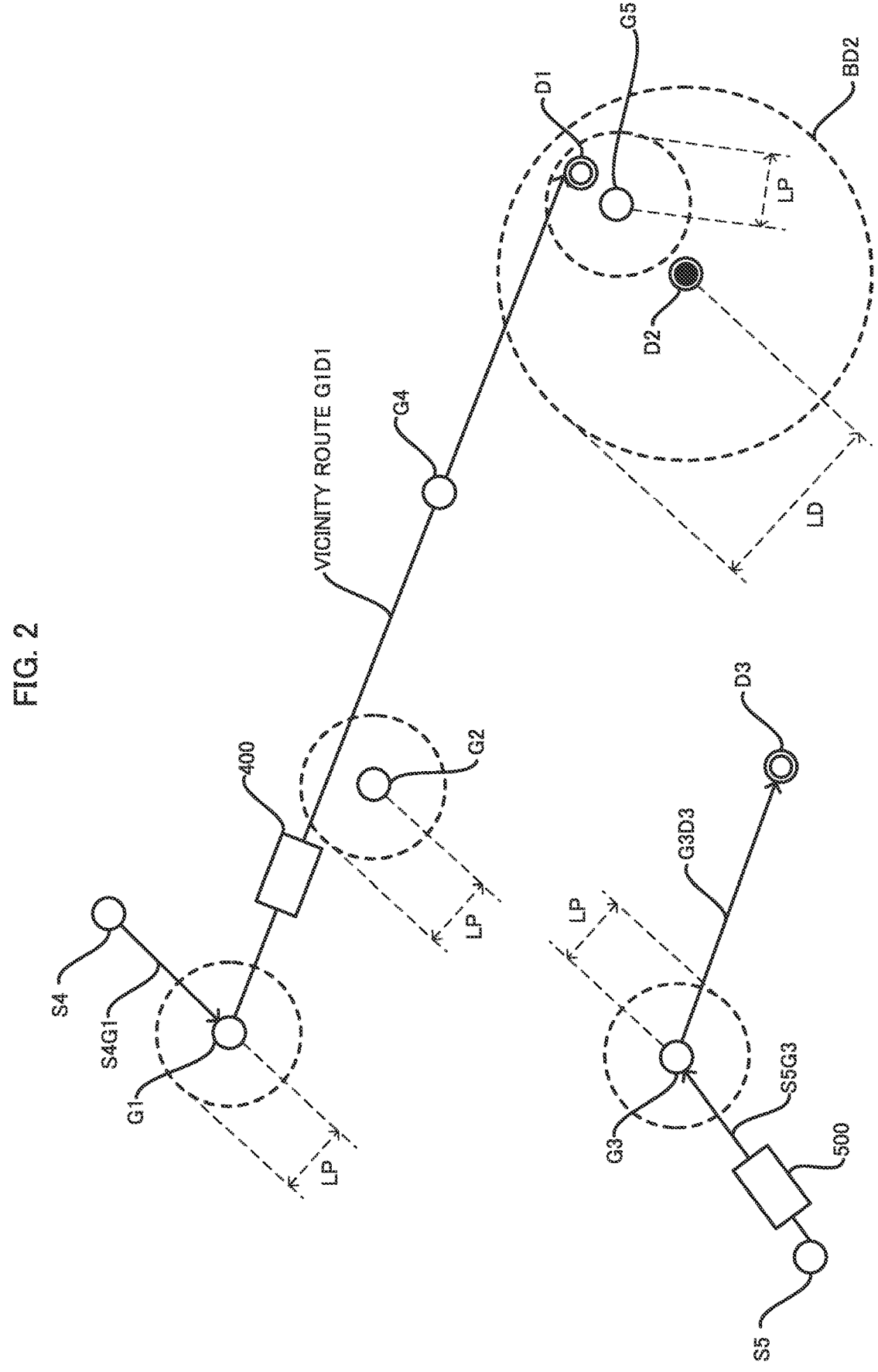
FIG. 2 is a diagram illustrating an example of a vicinity route.

The information processing system 1 further includes terminal devices 601 to 605 that are installed in not-illustrated stores S1 to S5, which have pickup points G1 to G5 of transportable objects as illustrated in FIG. 2, respectively, or that employees of the stores S1 to S5 carry, respectively. In addition, the information processing system 1 is connected to terminal devices 901 to 904 that are carried by first to forth users performing delivery requests, respectively, via the Internet IN.

Although, in the present embodiment, the following description is made using, as a specific example, a case where a transportable object is a commercial item (hereinafter, referred to as an item) in order to simplify description, the present embodiment is not limited thereto. In addition, in the present embodiment, the following description is made assuming that an order of an item includes a sales request requesting sale of the item and a delivery request requesting pickup and delivery of the sold item.

Figure 3:
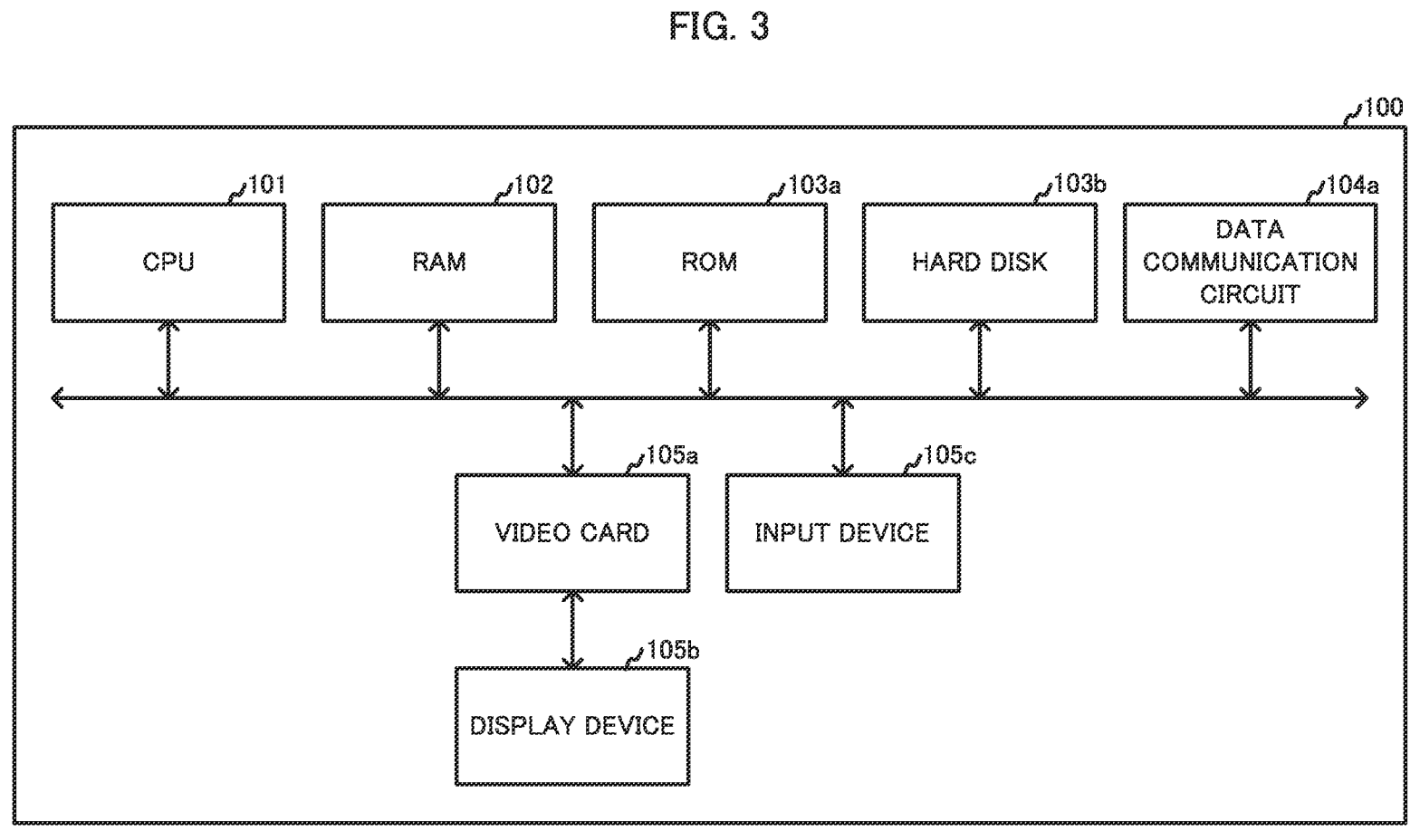

The information processing device 100 includes a central processing unit (CPU) 101, a random access memory (RAM) 102, a read only memory (ROM) 103a, a hard disk 103b, a data communication circuit 104a, a video card 105a, a display device 105b, and an input device 105c, which are hardware components, as illustrated in FIG. 3. The information processing device 100 may include a plurality of CPUs and may include a plurality of RAMs and flash memories.

The CPU 101 of the information processing device 100 performs overall control of the information processing device 100 by executing programs stored in the ROM 103a or the hard disk 103b. The RAM 102 temporarily stores data to be processed at the times of execution of the programs by the CPU 101. The ROM 103a and the hard disk 103b store various types of programs, various types of data used in execution of the various types of programs, and tables in which data are stored.

The data communication circuit 104a of the information processing device 100 is a network interface card (NIC) and, in accordance with a communication standard, including, for example, long term evolution (LTE) and 5th generation (5G), performs data communication with a not-illustrated base station that is connected to the Internet IN, using radio waves. Because of this configuration, the data communication circuit 104a of the information processing device 100 performs data communication with the delivery vehicles 400 and 500 and the terminal devices 601 to 605 and 901 to 904, which are connected to the Internet IN.

The video card 105a of the information processing device 100 renders images, based on digital signals output from the CPU 101 and also outputs image signals that represent the rendered images. The display device 105b is an electroluminescence (EL) display, a plasma display panel (PDP), or a liquid crystal display (LCD) and displays images in accordance with the image signals output from the video card 105a. The input device 105c is one or more of a keyboard, a mouse, a touch pad, and a button and inputs a signal corresponding to an operation by an employee of a broker.

When the data communication circuit 104a of the information processing device 100 receives a connection request requesting permission of connection to the information processing device 100 from any one of the terminal devices 901 to 904, the CPU 101 of the information processing device 100 executes sales brokerage processing, as illustrated in FIG. 4, that mediates a sale of an item. In the present embodiment, the following description is made using, as a specific example, a case where the information processing device 100 has received a connection request from the terminal device 902 of the second user.

Figure 5:
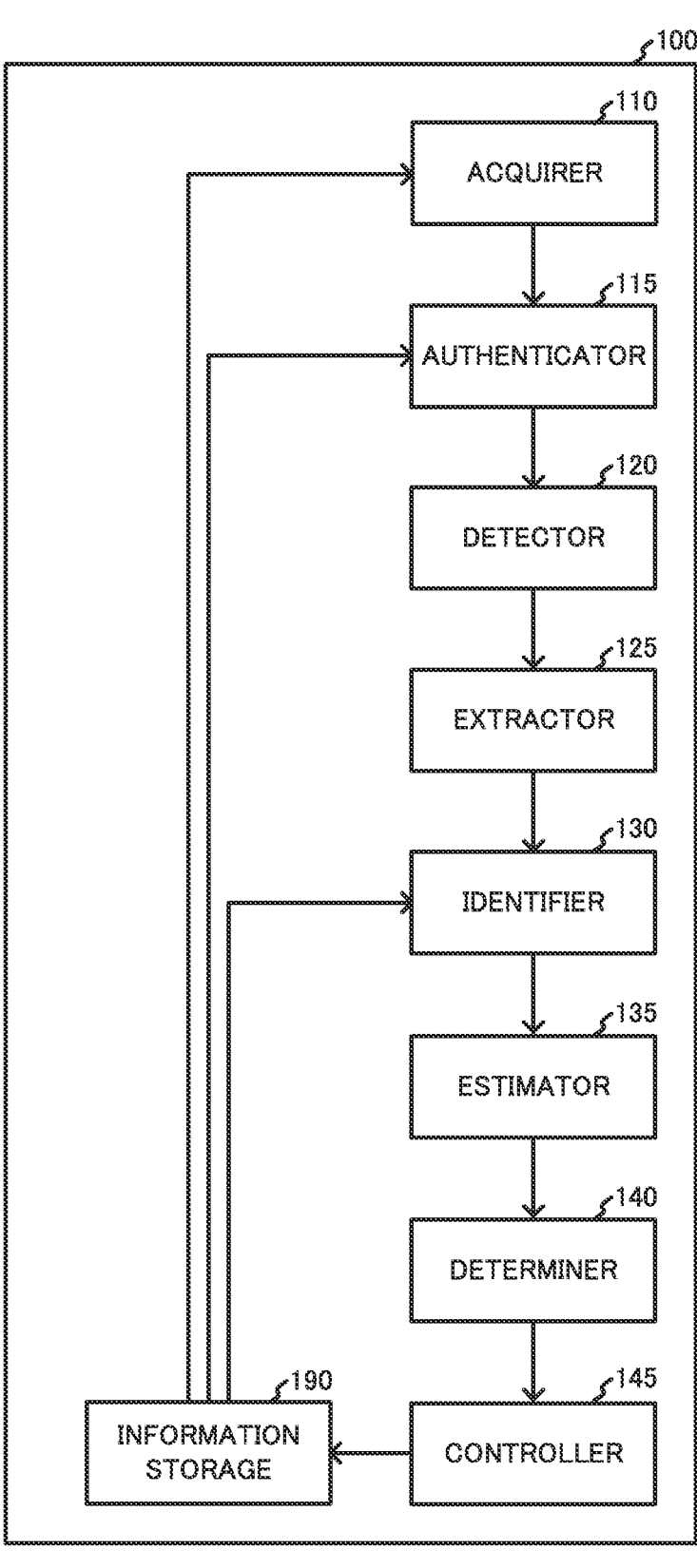
FIG. 5 is a functional block diagram illustrating an example of functions that the information processing device has.

The CPU 101 of the information processing device 100, by executing the sales brokerage processing, functions as an acquirer 110, as illustrated in FIG. 5, that acquires a connection request from the data communication circuit 104a. The CPU 101 also functions as an authenticator 115 that performs user authentication, based on authentication information of the second user, which is included in the acquired connection request, and, when the user authentication succeeds, approves the connection request and permits connection of the terminal device 902. The CPU 101 also functions as a detector 120 that, when the connection request is approved, detects that the terminal device 902 of the second user has accessed the information processing device 100.

The CPU 101 of the information processing device 100 further functions as an extractor 125 that extracts a vicinity route G1D1 of a delivery destination D2, which is set by the second user, from one or more of a delivery route of an item stored in the delivery vehicle 400 and a delivery route of an item stored in the delivery vehicle 500. A vicinity route of the delivery destination D2 means a delivery route the end point of which is located at the delivery destination D2 or within a vicinity of the delivery destination D2.

Although, in the present embodiment, the delivery destination D2 is an entrance to an apartment where the second user lives and delivery destinations D1 and D3, which is described later, are entrances to apartments where the first user and the third user live, respectively, the present embodiment is not limited thereto. In addition, in the present embodiment, a vicinity of the delivery destination D2 includes a boundary BD2 located a predetermined distance LD away from the delivery destination D2 and a region on the delivery destination D2 side of the boundary B2. In addition, in the present embodiment, the following description is made using, as a specific example, a case where a delivery route G1D1 of an item stored in the delivery vehicle 400 is extracted as a vicinity route, in order to simplify description.

The CPU 101 of the information processing device 100 functions as an identifier 130 that identifies pickup points G1, G2, and G4 at which the delivery vehicle 400 can pick up an item before the delivery vehicle 400 reaches the end point D1 of the extracted vicinity route G1D1. In the present embodiment, the following description is made assuming that the identifier 130 determines, from among the identified pickup points G1, G2, and G4, the pickup point G2 as a pickup point to be recommended to the second user (hereinafter, referred to as a recommended pickup point).

Further, the CPU 101 of the information processing device 100 functions as an estimator 135 that estimates movement time required for the delivery vehicle 400 to move to the recommended pickup point G2 and an arrival time at which the delivery vehicle 400 arrives at the recommended pickup point G2. The CPU 101 also functions as a determiner 140 that determines an acceptance time limit within which an order of an item that is to be picked up at the recommended pickup point G2 can be accepted, based on the estimated arrival time of the delivery vehicle 400.

In addition, the CPU 101 of the information processing device 100 functions as a controller 145 that performs, on the data communication circuit 104a, control to cause the data communication circuit 104a to send recommendation information indicating the identified recommended pickup point G2, an item to be picked up at the recommended pickup point G2, and the determined order time limit to the terminal device 902 of the second user.

The hard disk 103b of the information processing device 100 functions as an information storage 190 that stores information used in the execution of the sales brokerage processing. The information storage 190 stores in advance a user table, as illustrated in FIG. 6, in which information about users is stored in advance. A plurality of records is stored in the user table in advance, and, in each record of the user table, a user identification (ID) identifying a user is stored in advance. In addition, in each record of the user table, with respect to a user ID, information indicating a password set in advance by a user identified by the user ID, information indicating, in an address, and a delivery destination set in advance by the user are associated with the user ID in advance and stored.

The information storage 190 of the information processing device 100 also stores in advance a schedule table as illustrated in FIG. 7. In the schedule table, information relating to a schedule to cause the delivery vehicle 400 or 500 to pick up an item (hereinafter, referred to as a pickup schedule) and a schedule to cause the delivery vehicle 400 or 500 to deliver a picked-up item (hereinafter, referred to as a delivery schedule) is stored.

Eight records are stored in the schedule table in advance, and, in the first record, vehicle ID "400" identifying the delivery vehicle 400 and box ID "1" identifying the storage box 421 of the delivery vehicle 400 are stored in advance. In the second to fourth records, the vehicle ID "400" and box IDs "2" to "4" identifying the storage boxes 422 to 424, respectively, are stored in advance. In the fifth to eighth records, vehicle ID "500" of the delivery vehicle 500 and box IDs "1" to "4" identifying the storage boxes 521 to 524 of the delivery vehicle 500, respectively, are stored in advance, respectively.

In the present embodiment, the following description is made using, as a specific example, a case where an order that is an order of the first user and that requests pickup of a not-illustrated item I11 at the pickup point G1 and delivery of the item I11 to the delivery destination D1 has been accepted and the picked-up item I11 has already been stored in the storage box 421 of the delivery vehicle 400.

Thus, in the first record of the schedule table, state information indicating that a state of the storage box 421 is "storing state" in which the storage box stores an item is stored in association with the vehicle ID "400" and the box ID "1". In addition, in association with the vehicle ID "400" and the box ID "1", item ID "I11" identifying the item I11 stored in the storage box 421 of the delivery vehicle 400 and user ID "U1" of the first user, who has ordered the item I11, are associated with each other and stored in the first record of the schedule table.

In addition, in the first record, in association with the vehicle ID "400" and the box ID "1", a pickup schedule and a delivery schedule of the item I11 are associated with each other and stored. The pickup schedule of the item I11 includes location information of the pickup point G1 of the item I11 and information indicating a pickup route S4G1 reaching the pickup point G1, as illustrated in FIG. 2, and character string "NULL" indicating that no stage of a route sequence in which the delivery vehicle 400 is to move is assigned to the pickup route S4G1. The reason why no stage of a route sequence is assigned to the pickup route S4G1 reaching the pickup point G1 is that the pickup schedule has already been deleted because the delivery vehicle 400 has already moved to the pickup point G1 and picked up the item I11.

In the present embodiment, the location information of the pickup point G1 is information that indicates a location of the pickup point G1 in latitude, longitude, and altitude. In addition, in the information indicating the pickup route S4G1, location information indicating locations of a plurality of nodes included in the pickup route S4G1 in latitude, longitude, and altitude and information indicating a visiting sequence of the plurality of nodes are included.

The delivery schedule of the item I11 includes location information of the delivery destination D1 of the item I11, information indicating a delivery route G1D1 starting from the pickup point G1 and reaching the delivery destination D1, and information indicating that the stage of a route sequence of the delivery route G1D1 is the first stage. The stage of a route sequence of the delivery route G1D1 means a stage of a route sequence in which the delivery vehicle 400 moves along the delivery route G1D1 among pickup routes and delivery routes indicated by pieces of information stored in the schedule table.

In the present embodiment, the following description is made using, as a specific example, a case where states of the storage boxes 422 to 424 of the delivery vehicle 400 are respectively "vacant state". The storage box 422 being in the "vacant state" means a state where there exists no item scheduled to be stored in the storage box 422 and no item is stored in the storage box 422.

Thus, in the second record, state information indicating that the state of the storage box 422 is the "vacant state" is stored in association with the vehicle ID "400" and the box ID "2". In addition, in the second record, in association with the vehicle ID "400" and the box ID "2", character strings "NULL" indicating that no item scheduled to be stored in the storage box 422, no user who has ordered such an item, and neither pickup schedule nor delivery schedule of such an item exist are stored. Likewise, in each of the third and fourth records, in association with the vehicle ID "400" and one of the box IDs "3" and "4", state information indicating that the storage box is in the "vacant state" and the character strings "NULL" are associated with one another and stored.

In the present embodiment, the following description is made using, as a specific example, a case where an order that is an order of the third user and that requests pickup of a not-illustrated item I33 at the pickup point G3 and delivery of the item I33 to the delivery destination D3 has been accepted and storage of the item I33 in the storage box 521 of the delivery vehicle 500 has already been scheduled.

Thus, in the fifth record of the schedule table, in association with the vehicle ID "500" and the box ID "1", state information indicating that a state of the storage box 521 is "reserved state" is stored. The storage box 521 being in the "reserved state" means that the storage box 521 is in a state where, while there exists an item scheduled to be stored in the storage box 521, the item has not been stored yet in the storage box 521.

In addition, in the fifth record, in association with the vehicle ID "500" and the box ID "1", item ID "I33" of the item I33 and user ID "U3" of the third user, who has ordered the item I33, are associated with each other and stored.

Further, in the fifth record, in association with the vehicle ID "500" and the box ID "1", a pickup schedule and a delivery schedule of the item I33 are associated with each other and stored. The pickup schedule of the item I33 includes location information of the pickup point G3 of the item I33, information indicating a pickup route S5G3 reaching the pickup point G3, and information indicating that the stage of a route sequence of the pickup route S5G3 is the first stage.

The delivery schedule of the item I33 includes location information of the delivery destination D3 of the item I33, information indicating a delivery route G3D3 starting from the pickup point G3 and reaching the delivery destination D3, and information indicating that the stage of the route sequence of the delivery route G3D3 is the second stage.

In the present embodiment, the following description is made using, as a specific example, a case where states of the storage boxes 522 to 524 of the delivery vehicle 500 are respectively the "vacant state". Thus, in each of the sixth to eighth records, in association with the vehicle ID "500" and one of the box IDs "2" to "4", state information indicating that the storage box is in the "vacant state" and the character strings "NULL" are associated with one another and stored.

The information storage 190 of the information processing device 100 stores in advance a store table, as illustrated in FIG. 8, in which information about stores selling items is stored. A plurality of records is stored in the store table in advance, and, in the first record, store ID "S1" identifying a not-illustrated store S1, information indicating a name of the store S1, the location information of the pickup point G1, which is located at an entrance to the store S1, are associated with one another and stored. Likewise, in the second to fifth records, store IDs "S2" to "S5" identifying not-illustrated stores S2 to S5, respectively, information indicating respective names of the stores S2 to S5, location information of the pickup points G2 to G5, which are located at the entrances to the stores S2 to S5, respectively, are associated with one another and stored, respectively.

Furthermore, the information storage 190 of the information processing device 100 stores in advance an item table, as illustrated in FIG. 9, in which information about items is stored. A plurality of records is stored in the item table in advance, and, in each record, a store ID of a store, an item ID identifying an item sold by the store, and information indicating a name of the item are associated with one another and stored. In addition, in each record, with respect to a store ID and an item ID, information indicating preparation time required to prepare to make an item identified by the item ID ready for pickup in a store identified by the store ID is associated with the store ID and the item ID and stored in advance.

For example, in the item table, the store ID "S2" of the store S2, item ID "I21" of an item I21 sold in the store S2, name "steak" of the item I21, and information indicating a preparation time of 30 min of the item I21 are stored. In addition, in the item table, the store ID "S2", item ID "I22", name "hamburger", and information indicating a preparation time of 15 min are stored. Further, in the item table, the store ID "S2", item ID "I23", name "ramen noodles", and information indicating a preparation time of 15 min are stored.

In the present embodiment, an item becoming ready for pickup means that the state of the item changes to a state where the delivery vehicle 400 or 500 can pick up the item. In addition, in the present embodiment, the state of an item where the delivery vehicle 400 or 500 can pick up the item includes a state where the delivery vehicle 400 or 500 can start delivery of the item.

In the present embodiment, items are food and drink. Thus, the state of an item where delivery of the item can be started includes a state where the item has been cooked when the item needs to be cooked before start of delivery of the item. In addition, the state of an item where delivery of the item can be started includes a state where the item has been packaged when the item needs to be packaged before start of delivery of the item. Existence or nonexistence of necessity to be cooked and existence or nonexistence of necessity to be packaged are agreed explicitly or implicitly between an orderer and an employee of a store at the time of acceptance of an order of the item or are determined in advance in commercial practice. In addition, the state of an item where delivery of the item can be started includes a state where the item is located at a pickup point of the item.

Because of these conditions, in the case of an item that needs neither to be cooked nor packaged, preparation to make the item ready for pickup includes, for example, searching for the item from a shelf in a warehouse and transferring the found item to a pickup point of the item. Thus, the preparation time includes search time required to search for the item and transfer time required to transfer the found item to the pickup point of the item.

In addition, in the case of an item that, although not necessary to be cooked, needs to be packaged, the preparation of the item includes searching for the item, packaging the item, and transferring the item to a pickup point. Thus, the preparation time of the item includes the sum of search time required to search for the item, packaging time required to package the found item, and transfer time required to transfer the packaged item to the pickup point of the item.

Further, in the case of an item that needs to be cooked and packaged, the preparation of the item includes searching for the item or ingredients of the item, cooking the item, packaging the cooked item, and transferring the packaged item to a pickup point of the item. Thus, the preparation time of the item includes the sum of search time required to search for the item or ingredients of the item, cooking time required to cook the item, packaging time required to package the cooked item, and transfer time required to transfer the packaged item to the pickup point of the item.

In the present embodiment, items include steak, ramen noodles, a hamburger, tomatoes, and bread. In addition, in the present embodiment, although preparation to make tomatoes or bread ready for pickup does not include cooking, preparation to make steak, ramen noodles, or a hamburger ready for pickup includes cooking. Because of these conditions, preparation time of tomatoes or bread is set shorter than preparation time of steak, ramen noodles, or a hamburger in advance.

In addition, in the present embodiment, a property of an item includes a property that the state of the item changes as time passes. For example, the property of steak, ramen noodles, or a hamburger includes necessity of cooking to increase temperature of the item to a temperature higher than a predetermined temperature (hereinafter, referred to as necessity of heating cooking) and a property that the temperature of the item, which was increased to a higher temperature than the predetermined temperature by cooking, decreases to a temperature lower than or equal to the predetermined temperature as time passes (hereinafter, referred to as a cooling property). In contrast, for example, the property of tomatoes or bread includes neither the necessity of heating cooking nor the cooling property.

Further, in the present embodiment, the property of ramen noodles includes a property that noodles get soft as time passes (hereinafter, referred to as a property of noodles getting soft). Noodles getting soft means that the state of noodles changes from a state where the noodles contain an amount of water per unit length less than a predetermined amount of water per unit length to a state where the noodles contain an amount of water per unit length greater than or equal to the predetermined amount of water per unit length. In contrast, for example, the property of tomatoes, bread, a hamburger, or steak does not include the property of noodles getting soft.

An item and a property of the item are not limited to the above description, and the item may be soup served cold or ice cream. In addition, the property of an item may include necessity of cooking or storage to decrease temperature of the item to a temperature lower than a predetermined temperature (hereinafter, referred to as necessity of cooling cooking or storage) and a property that the temperature of the item, which was decreased to a lower temperature than the predetermined temperature, increases to a temperature higher than or equal to the predetermined temperature as time passes (hereinafter, referred to as a warming property).

When the execution of the sales brokerage processing in FIG. 4 is started, the acquirer 110 of the information processing device 100 acquires a connection request received from the terminal device 902 of the second user from the data communication circuit 104a (step S01). Next, the acquirer 110 acquires authentication information including user ID "U2" of the second user and information indicating a password of the second user from the connection request. Subsequently, the acquirer 110 acquires information indicating a password associated with the acquired user ID "U2" from the user table in FIG. 6.

Subsequently, the authenticator 115 of the information processing device 100 performs user authentication, based on the password indicated by the information acquired from the connection request and the password indicated by the information acquired from the user table. When the two passwords do not coincide with each other, the authenticator 115 determines that the user authentication has failed (step S02; No) and terminates the execution of the sales brokerage processing.

In contrast, when the two passwords coincide with each other, the authenticator 115 of the information processing device 100 determines that the user authentication has succeeded (step S02; Yes) and approves the connection request. Next, the controller 145 outputs a permission report announcing that a connection is permitted to the data communication circuit 104a with the terminal device 902 of the second user as the destination. Subsequently, the data communication circuit 104a of the information processing device 100 sends the permission report to the terminal device 902.

When the connection request received from the terminal device 902 of the second user is approved, the detector 120 of the information processing device 100 detects that the second user has accessed the information processing device 100 (step S03). Next, the information processing device 100 executes item recommendation processing of recommending an item to the second user, as illustrated in FIG. 10 (step S04).

When the execution of the item recommendation processing is started, the extractor 125 of the information processing device 100 determines whether or not one or more of the storage boxes 421 to 424 of the delivery vehicle 400 and the storage boxes 521 to 524 of the delivery vehicle 500 are vacant (step S31). For this purpose, the acquirer 110 acquires combinations of the vehicle ID "400" and the box IDs "2" to "4" and combinations of the vehicle ID "500" and the box IDs "2" to "4" that are associated with the state information indicating the "vacant state" from the schedule table in FIG. 7. Thus, the extractor 125 determines that the storage boxes 422 to 424 of the delivery vehicle 400 and the storage boxes 522 to 524 of the delivery vehicle 500 are vacant (hereinafter, referred to as "there is a vacancy in each of the delivery vehicles 400 and 500") (step S31; Yes).

Next, the extractor 125 of the information processing device 100 determines whether or not an item is stored in any one or more of the storage boxes 421 to 424 of the delivery vehicle 400, which is determined to have a vacancy, and the storage boxes 521 to 524 of the delivery vehicle 500, which is determined to have a vacancy (step S32). For this purpose, the acquirer 110 tries acquisition of a box ID associated with the state information indicating the "storing state" and the vehicle ID "400" and acquisition of a box ID associated with the state information indicating the "storing state" and the vehicle ID "500" from the schedule table in FIG. 7. Through this processing, the acquirer 110 acquires the box ID "1", which is associated with the state information indicating the "storing state" and the vehicle ID "400". Thus, the extractor 125 determines that an item is stored in the storage box 421 of the delivery vehicle 400, which is determined to have a vacancy (step S32; Yes).

Next, the acquirer 110 of the information processing device 100 acquires information indicating the delivery route G1D1 that is associated with the vehicle ID "400", the box ID "1", and the information indicating the first stage of a route sequence. Through this processing, information indicating the delivery route G1D1 that is a route along which the delivery vehicle 400 is moving and along which the delivery vehicle 400 moves to deliver the item I11 stored in the storage box 421 of the delivery vehicle 400 is acquired (step S33). The reason why the delivery route G1D1 along which the delivery vehicle 400 is moving is acquired is that the information processing device 100 can identify a pickup point of an item that enables the item to be delivered to the second user faster, based on a route along which the delivery vehicle 400 is moving than based on a route along which the delivery vehicle 400 is not moving.

Next, the acquirer 110 of the information processing device 100 acquires information that is information associated with the user ID "U2" of the second user, which was acquired in step S01 in FIG. 4, and that indicates, in an address, the delivery destination D2, which is set by the second user in advance, from the user table in FIG. 6. Next, the acquirer 110 acquires location information indicating latitude, longitude, and altitude of the delivery destination D2, which the information storage 190 associates in advance with the information indicating the delivery destination D2 in an address and stores (step S34).

Subsequently, the extractor 125 of the information processing device 100 tries extraction of a vicinity route the end point of which is located at the delivery destination D2 of the second user or within a vicinity of the delivery destination D2, based on the acquired information indicating the delivery route G1D1 and the acquired location information of the delivery destination D2 of the second user. Next, the extractor 125 determines whether or not a vicinity route is extracted (step S35).

For this purpose, the acquirer 110 of the information processing device 100 acquires information indicating the distance LD, which the information storage 190 stores in advance. Subsequently, the extractor 125 calculates a distance between the delivery destination D2 and the end point D1, based on location information of a node indicating the end point D1, which is included in the information indicating the delivery route G1D1, and the location information of the delivery destination D2 of the second user. Next, the extractor 125 determines whether or not the end point D1 of the delivery route G1D1 is located at the delivery destination D2 of the second user or within a vicinity of the delivery destination D2, based on whether or not the calculated distance between the delivery destination D2 and the end point D1 is less than or equal to the predetermined distance LD.

In the present embodiment, the following description is made using, as a specific example, a case where the end point D1 of the delivery route G1D1 is located at the delivery destination D2 or within a vicinity of the delivery destination D2. Thus, the extractor 125 of the information processing device 100 determines that the end point D1 of the delivery route G1D1 is located at the delivery destination D2 of the second user or within a vicinity of the delivery destination D2 because the calculated distance between the delivery destination D2 and the end point D1 is less than or equal to the predetermined distance LD. Next, the extractor 125 extracts the delivery route G1D1 as a vicinity route of the delivery destination D2 of the second user and subsequently determines that a vicinity route is extracted (step S35; Yes).

Subsequently, the acquirer 110 of the information processing device 100 tries acquisition of a record in which the vehicle ID "400" of the delivery vehicle 400 and information indicating the second stage of a route sequence are stored from the schedule table in FIG. 7. The identifier 130 determines whether or not a succeeding route along which the delivery vehicle 400 is scheduled to move immediately after the vicinity route G1D1 exists, based on whether or not such a record is acquired. That is, the identifier 130 determines whether or not a final route is the vicinity route G1D1 (step S36). The final route is a route along which the delivery vehicle 400 is scheduled to move last among routes along which the delivery vehicle 400 is scheduled to move. In this processing, since no record in which the vehicle ID "400" and the information indicating the second stage of a route sequence are stored is acquired, the identifier 130 determines that the vicinity route G1D1 is the final route (step S36; Yes).

Next, the identifier 130 of the information processing device 100 identifies, from among the pickup points G1 to G5, a pickup point at which the delivery vehicle 400 can pick up an item before the delivery vehicle 400 reaches the end point D1 of the vicinity route G1D1.

In the present embodiment, the identifier 130 of the information processing device 100 tries identification of, from among the pickup points G1 to G5, a pickup point that satisfies a first condition described below as the pickup point at which the delivery vehicle 400 can pick up an item before the delivery vehicle 400 reaches the end point D1 of the vicinity route G1D1. Next, the identifier 130 determines whether or not a pickup point satisfying the first condition is identified (step S37).

Figure 11:
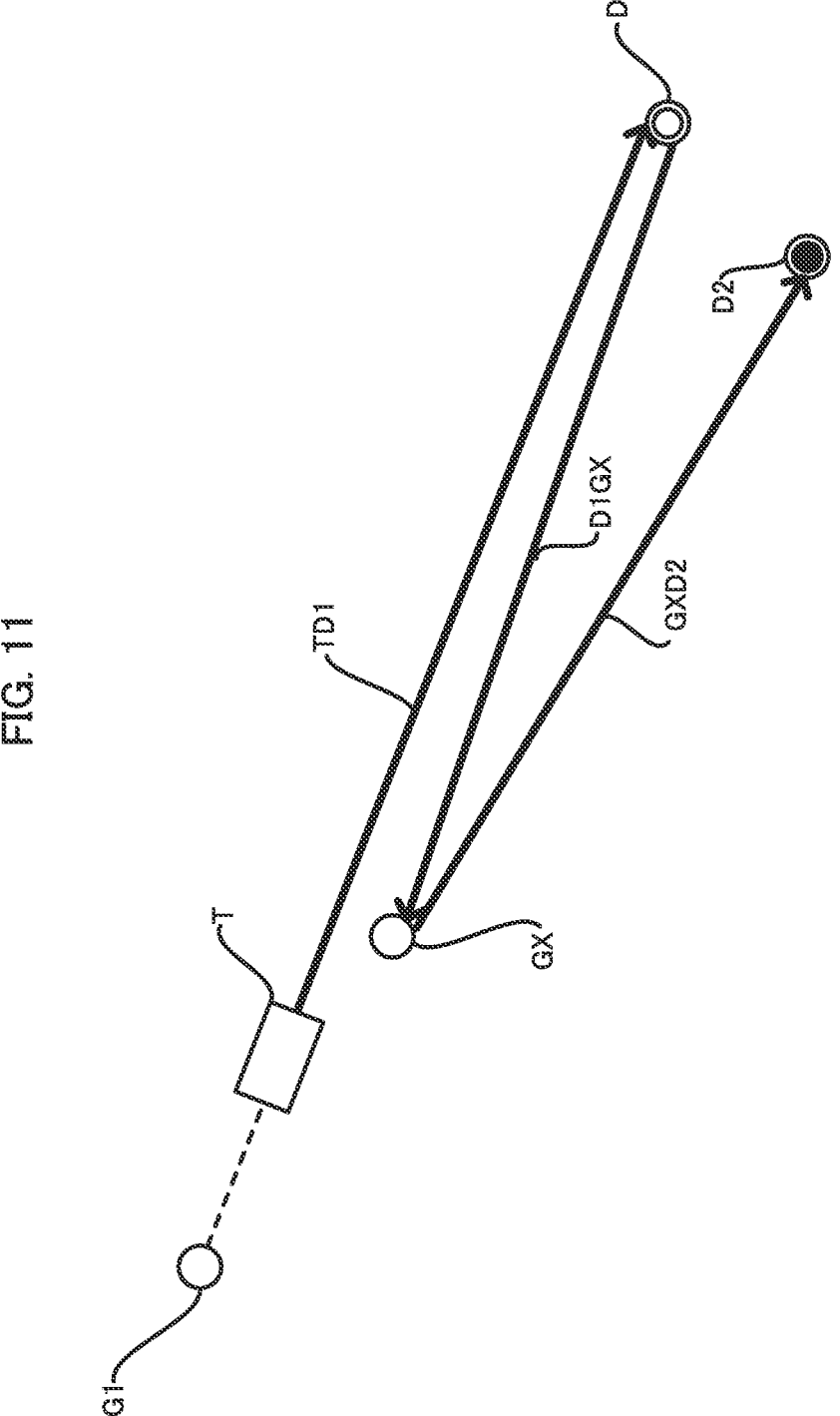
FIG. 11 is a diagram illustrating an example of an order sequence route in the case where the vicinity route is a final route.
Figure 12:
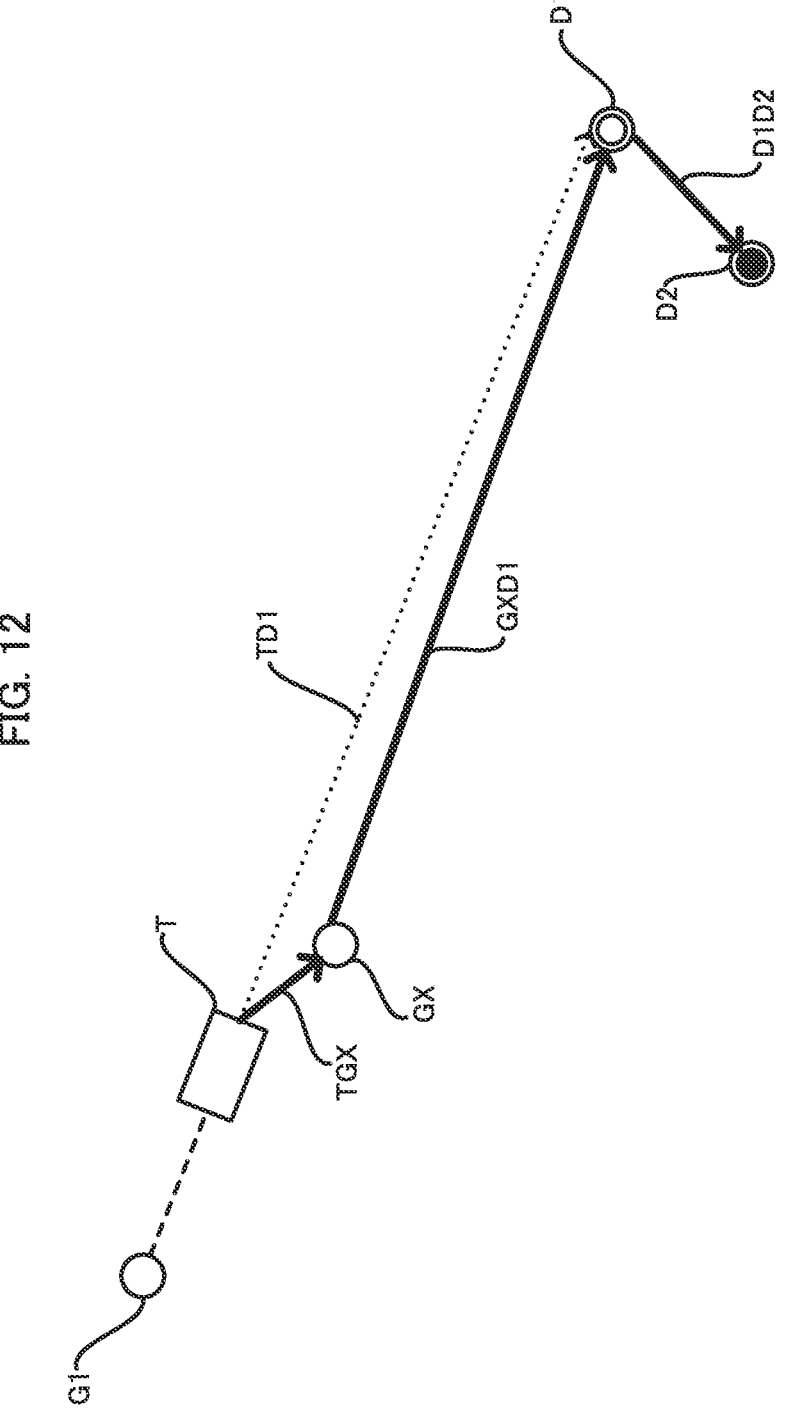
FIG. 12 is a diagram illustrating an example of a non-order sequence route in the case where the vicinity route is a final route.

The first condition is a condition requiring that both a first detail condition and a second detail condition in the first condition are satisfied. The first detail condition in the first condition is a condition requiring being a location on the vicinity route G1D1 or a location within a vicinity of the vicinity route G1D1. The second detail condition in the first condition is a condition requiring being located at a location at which, in the case where a delivery request of the second user is accepted, distance of a non-order sequence route as illustrated in FIG. 12 is shorter than distance of an order sequence route as illustrated in FIG. 11.

The order sequence route is a route for performing delivery to the end point D1 of the vicinity route G1D1 in accordance with an order of the first user that has already been accepted (hereinafter, referred to as a preceding request), pickup at a pickup location GX in accordance with an order of the second user to be accepted in the future (hereinafter, referred to as a succeeding request), and a delivery from the pickup location GX in accordance with the succeeding request in this order. That is, the order sequence route in FIG. 11 is a route including a delivery route TD1 starting from a location T of the delivery vehicle 400 and reaching the end point D1 of the vicinity route G1D1, which is the final route, a pickup route D1GX starting from the end point D1 of the final route G1D1 and reaching the pickup location GX at which pickup is performed in accordance with the succeeding request, and a delivery route GXD2 starting from the pickup location GX and reaching the delivery destination D2 of the second user in this order.

In contrast, the non-order sequence route is a route for performing pickup in accordance with the succeeding request, delivery in accordance with the preceding request, and delivery in accordance with the succeeding request in this order. That is, the non-order sequence route in FIG. 12 is a route including a pickup route TGX starting from the location T of the delivery vehicle 400 and reaching the pickup location GX, a delivery route GXD1 starting from the pickup location GX and reaching the end point D1 of the vicinity route G1D1, and a delivery route D1D2 starting from the end point D1 of the vicinity route G1D1 and reaching the delivery destination D2 of the second user in this order.

In order to identify a pickup point satisfying the first condition, the identifier 130 of the information processing device 100 determines whether or not the pickup point G1 satisfies the first detail condition in the first condition. For this purpose, the acquirer 110 acquires the location information of the pickup point G1 from the store table in FIG. 8 and acquires information indicating the vicinity route G1D1 from the schedule table in FIG. 7. Next, the identifier 130 calculates distance between the vicinity route G1D1 and the pickup point G1, based on the acquired location information of the pickup point G1 and pieces of location information of a plurality of nodes included in the information indicating the vicinity route G1D1. Although, in the present embodiment, the identifier 130 calculates a shortest distance between the vicinity route G1D1 and the pickup point G1, the present embodiment is not limited thereto.

Next, the acquirer 110 of the information processing device 100 acquires information indicating a distance LP, which the information storage 190 stores in advance. Subsequently, the identifier 130 determines whether or not the pickup point G1 is located on the vicinity route G1D1 or within a vicinity of the vicinity route G1D1, based on whether or not the calculated distance between the pickup point G1 and the vicinity route G1D1 is less than or equal to the distance LP. The distance LP may be the same distance as the distance LD, which defines a vicinity of the delivery destination D2, or shorter or longer than the distance LD, and a person skilled in the art can determine, by experiment, suitable values of the distance LD and the distance LP.

In the present embodiment, the following description is made using, as a specific example, a case where, as illustrated in FIG. 2, the pickup points G1, G2, and G5 are located within vicinities of the vicinity route G1D1, a pickup point G4 is located on the vicinity route G1D1, and the pickup point G3 is located neither on the vicinity route G1D1 nor within a vicinity of the vicinity route G1D1. Thus, the identifier 130 of the information processing device 100 determines that the calculated distance between the pickup point G1 and the vicinity route G1D1 is less than or equal to the distance LP. Next, the identifier 130 determines that the pickup point G1 satisfies the first detail condition in the first condition requiring being located on the vicinity route G1D1 or within a vicinity of the vicinity route G1D1.

Next, the identifier 130 of the information processing device 100 determines whether or not the pickup point G1 satisfies the second detail condition in the first condition requiring being located at a location at which the distance of the non-order sequence route in FIG. 12 is shorter than the distance of the order sequence route in FIG. 11. For this purpose, the identifier 130 calculates distance of the delivery route TD1 starting from the location T of the delivery vehicle 400 and reaching the end point D1 of the vicinity route G1D1.

For the calculation of distance of the delivery route TD1, the controller 145 of the information processing device 100 outputs a location send request to the data communication circuit 104a with the delivery vehicle 400 as the destination. The location send request is a request requesting sending of location information indicating the location T of the delivery vehicle 400 in latitude, longitude, and altitude. When the data communication circuit 104a of the information processing device 100, after having sent the location send request to the delivery vehicle 400, receives the location information from the delivery vehicle 400, the acquirer 110 acquires the location information of the delivery vehicle 400 from the data communication circuit 104a.

Subsequently, the identifier 130 of the information processing device 100 calculates distance of a partial route TD1 starting from the location T of the delivery vehicle 400 and reaching the end point D1 of the vicinity route G1D1, based on the acquired location information of the delivery vehicle 400 and pieces of location information of a plurality of nodes included in the information indicating the vicinity route G1D1.

Next, the identifier 130 of the information processing device 100 identifies a pickup route D1GX starting from the delivery destination D1, which is the end point of the vicinity route G1D1, and reaching the pickup location GX, which is the location of the pickup point G1, and calculates distance of the identified pickup route D1GX. In the present embodiment, since the vicinity route G1D1, which starts from the pickup point G1 and reaches the delivery destination D1, includes a one-way road, the pickup route D1GX and the vicinity route G1D1 are different routes from each other. The pickup route D1GX is a route starting from the delivery destination D1 and reaching the pickup location GX, which is the location of the pickup point G1. However, the present embodiment is not limited to the situation, and the pickup route D1GX and the vicinity route G1D1 may be the same route.

For the purpose of identification of the pickup route D1GX, the acquirer 110 of the information processing device 100 reads a plurality of records stored in a partial route table, which the information storage 190 stores in advance. In the partial route table, a plurality of records in each of which information relating to a partial route, such as a road and a sidewalk, on which the delivery vehicles 400 and 500 can move is stored are stored in advance. In each record of the partial route table, latitude, longitude, and altitude of the start node of an edge, which is a partial route, latitude, longitude, and altitude of the end node of the edge, and information indicating length of the edge are associated with one another and stored in advance.

Next, the identifier 130 of the information processing device 100 executes a well-known route search algorithm, such as Dijkstra's algorithm, using lengths of edges and latitudes, longitudes, and altitudes of the start nodes and the end nodes of the edges, which are stored in the respective read records in the partial route table, latitude, longitude, and altitude of the delivery destination D1, and latitude, longitude, and altitude of the pickup location GX, which is the location of the pickup point G1. Through this processing, the identifier 130, by combining partial routes, identifies a shortest pickup route D1GX and calculates distance of the pickup route D1GX.

In a similar manner, the identifier 130 of the information processing device 100 identifies a shortest delivery route GXD2 starting from the pickup location GX, which is the location of the pickup point G1, and reaching the delivery destination D2 of the second user and calculates distance of the delivery route GXD2. Subsequently, the identifier 130 calculates the sum of the distance of the identified delivery route TD1, the distance of the identified pickup route D1GX, and the distance of the identified delivery route GXD2 as the distance of the order sequence route.

Next, in order to calculate the distance of the non-order sequence route in FIG. 12, the identifier 130 of the information processing device 100 identifies a shortest pickup route TGX starting from the location T of the delivery vehicle 400 and reaching the pickup location GX, which is the location of the pickup point G1, and calculates distance of the pickup route TGX. In addition, the identifier 130 identifies a shortest delivery route GXD1 starting from the pickup location GX and reaching the end point D1 of the vicinity route G1D1 and calculates distance of the delivery route GXD1. Further, the identifier 130 identifies a shortest delivery route D1D2 starting from the end point D1 of the vicinity route G1D1 and reaching the delivery destination D2 of the second user and calculates distance of the delivery route D1D2. Subsequently, the identifier 130 calculates the sum of the distance of the identified pickup route TGX, the distance of the identified delivery route GXD1, and the distance of the identified delivery route D1D2 as the distance of the non-order sequence route.

Subsequently, the identifier 130 of the information processing device 100 determines whether or not the calculated distance of the non-order sequence route is shorter than the calculated distance of the order sequence route. In the present embodiment, the following description is made assuming that, when an order requesting pickup at any one of the pickup points G1, G2, and G4 is accepted, distance of a non-order sequence route is shorter than distance of an order sequence route. Thus, the identifier 130 determines that the distance of the non-order sequence route is shorter than the distance of the order sequence route, and determines that the pickup point G1 satisfies the second detail condition in the first condition. Accordingly, the identifier 130 determines that the pickup point G1 satisfies the first condition.

Subsequently, the identifier 130 of the information processing device 100 determines that the pickup points G2 and G4 satisfy the first condition. In contrast, the identifier 130 determines that the pickup point G3 does not satisfy the first detail condition in the first condition because the pickup point G3 is located neither on the vicinity route G1D1 nor within a vicinity of the vicinity route G1D1. Thus, the identifier 130 determines that the pickup point G3 does not satisfy the first condition without determining whether or not the pickup point G3 satisfies the second detail condition in the first condition.

Next, the identifier 130 of the information processing device 100 determines that the pickup point G5 satisfies the first detail condition in the first condition because the pickup point G5 is located within a vicinity of the vicinity route G1D1. Next, the identifier 130 determines that the location of the pickup point G5 does not satisfy the second detail condition in the first condition requiring being a location at which distance of a non-order sequence route is shorter than distance of an order sequence route.

Figure 13:
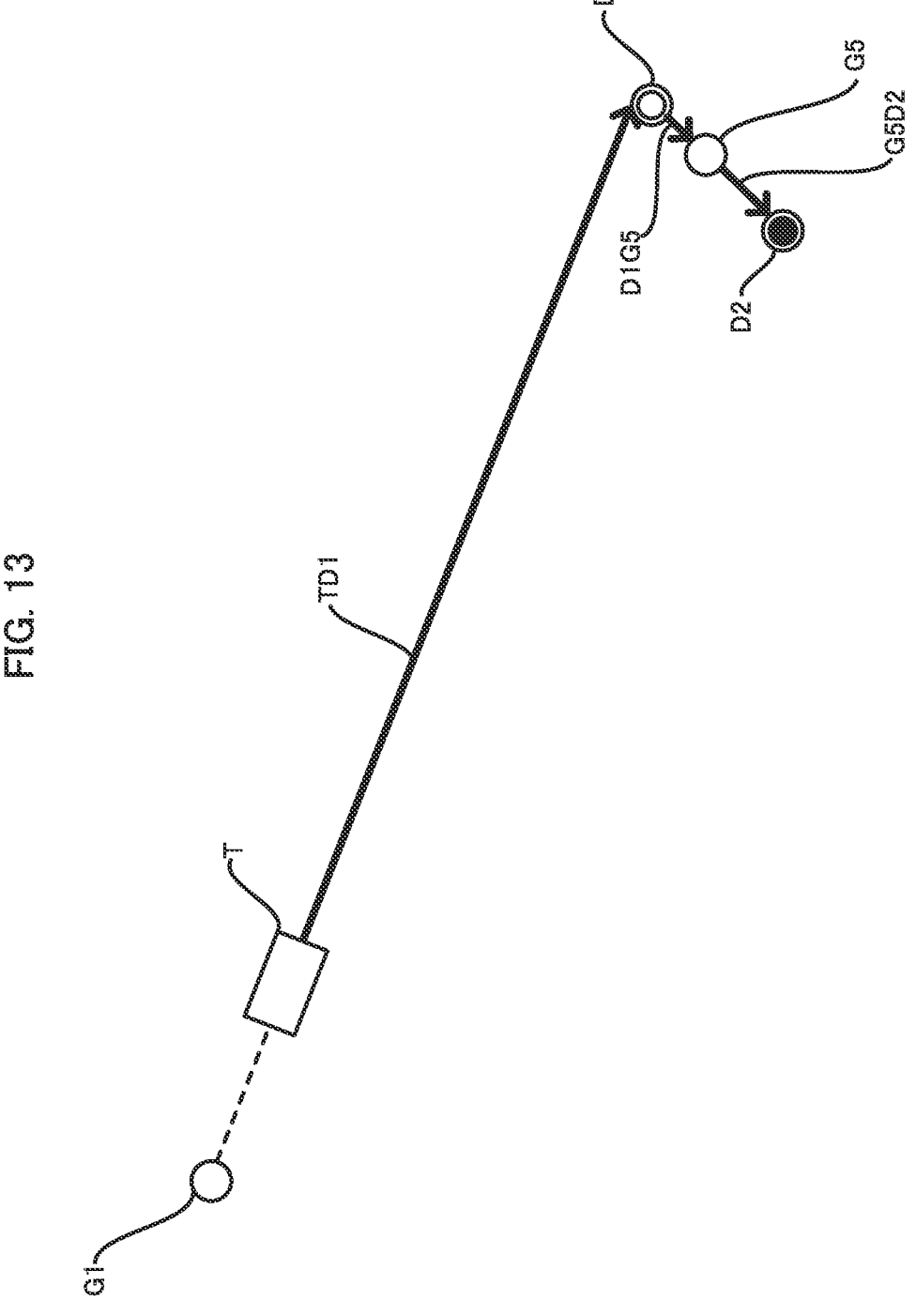
FIG. 13 is a diagram illustrating another example of the order sequence route in the case where the vicinity route is a final route.
Figure 14:
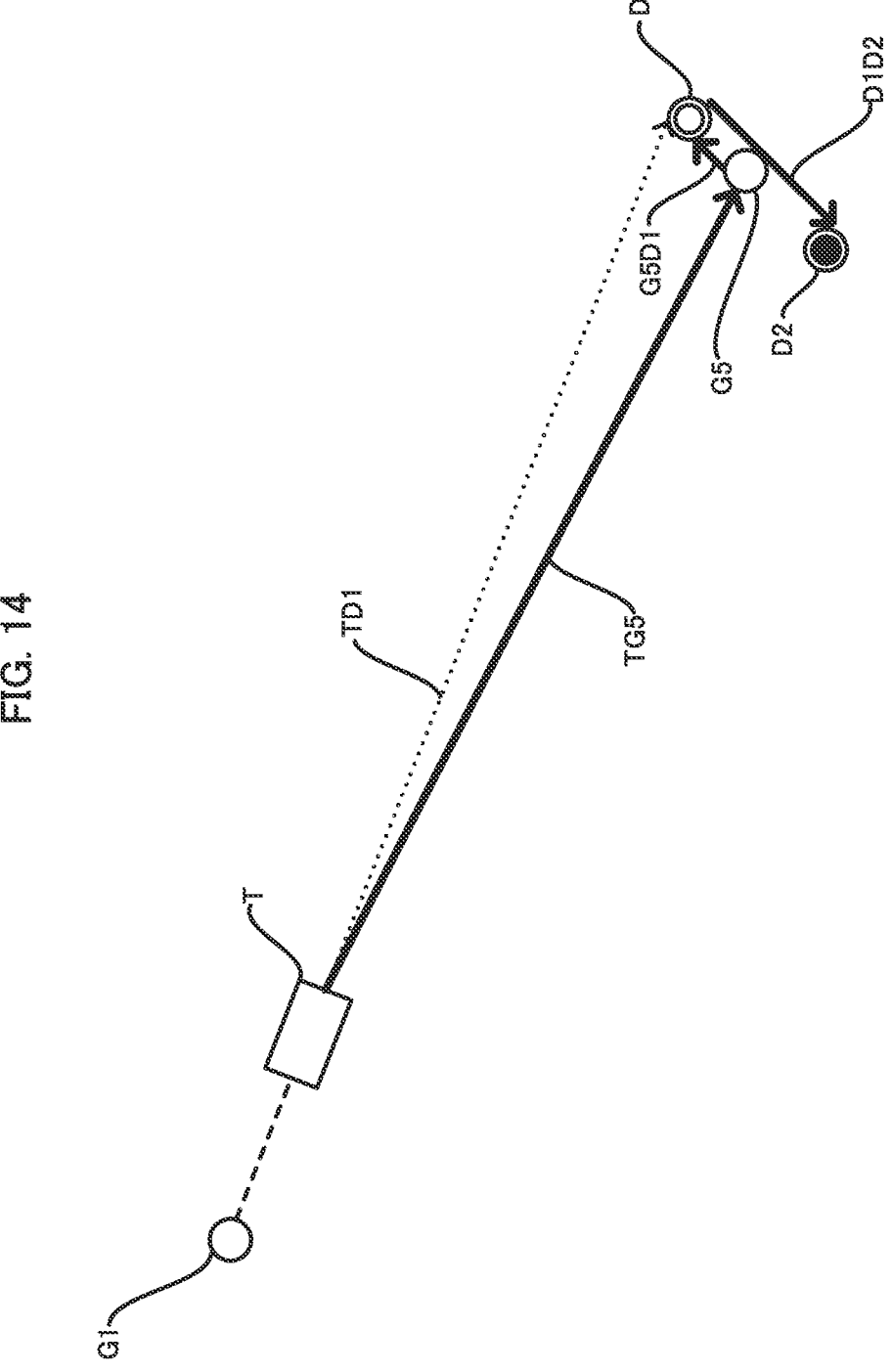
FIG. 14 is a diagram illustrating another example of the non-order sequence route in the case where the vicinity route is a final route.

The reason why such determination is performed is that, in the present embodiment, the pickup point G5 is located on the delivery route D1D2, which starts from the end point D1 of the vicinity route G1D1 and reaches the delivery destination D2 of the second user, as illustrated in FIG. 13. When the pickup point G5 is located on the delivery route D1D2 as described above, the sum of distance of a pickup route D1GS and distance of a delivery route G5D2 in an order sequence route as described in FIG. 13 is equal to distance of a delivery route D1D2 in a non-order sequence route as illustrated in FIG. 14. Note that the pickup route D1GS is a route starting from the end point D1 of the vicinity route G1D1 and reaching the pickup point G5 and the delivery route G5D2 is a route starting from the pickup point G5 and reaching the delivery destination D2 of the second user.

In addition, the distance of the delivery route TD1 in the order sequence route in FIG. 13 is shorter than the sum of distance of a pickup route TG5 and distance of a delivery route G5D1 in a non-order sequence route in FIG. 14. The reason why the distance of the delivery route TD1 is shorter than the sum of the distance of the pickup route TG5 and the distance of the delivery route G5D1 is that the delivery route TD1, the pickup route TG5, and the delivery route G5D1 form a triangle when each thereof is a straight line route. That is, the reason is that the distance of the delivery route TD1 in the order sequence route that corresponds to one side of a triangle is shorter than the sum of the distance of the pickup route TG5 and the distance of the delivery route G5D1 in the non-order sequence route that respectively correspond to the other two sides of the triangle. Note that the pickup route TG5 is a route starting from the location T of the delivery vehicle 400 and reaching the pickup point G5 and the delivery route G5D1 is a route starting from the pickup point G5 and reaching the delivery destination D1 of the first user. Since, because of the situation, the distance of the order sequence route in FIG. 13 is shorter than the distance of the non-order sequence route in FIG. 14, the identifier 130 determines that the pickup point G5 does not satisfy the second detail condition in the first condition.

In this way, the identifier 130 of the information processing device 100 identifies the pickup points G1, G2, and G4 that satisfy the first condition (hereinafter, referred to as suitable pickup points) and identifies the pickup points G3 and G5 that do not satisfy the first condition (hereinafter, referred to as regular pickup points). Thus, the identifier 130 determines that the suitable pickup points G1, G2, and G4 satisfying the first condition are identified (step S37 in FIG. 10; Yes).

Next, the identifier 130 of the information processing device 100 determines one or a plurality of pickup points to be recommended to the second user (hereinafter, referred to as recommended pickup points) from among the identified one or plurality of suitable pickup points, that is, the pickup points G1, G2, and G4, based on a predetermined rule or software-generated random numbers.

In the present embodiment, a case where the identifier 130 of the information processing device 100 determines the recommended pickup point G2 from among the plurality of suitable pickup points G1, G2, and G4, based on a purchase history of the second user is described. For this purpose, the information storage 190 stores in advance a plurality of pieces of information each of which associates the user ID "U2" of the second user, an item ID of an item having been purchased by the second user in the past, a store ID of a store at which the item was sold to the second user, and information indicating the number of purchases in which the item was purchased at the store with one another. The acquirer 110 acquires pieces of information indicating the numbers of purchases that are associated with the store ID "S1" of the store S1, which has the pickup point G1, and the user ID "U2" of the second user from the information storage 190, and the identifier 130 calculates the total number of purchases that is the sum of the numbers of purchases indicated by the acquired pieces of information. Likewise, the identifier 130 calculates the total number of purchases with respect to the pickup points G2 and G4. Subsequently, the identifier 130 determines the recommended pickup point G2 from among the pickup points G1, G2, and G4 in accordance with a predetermined rule that a pickup point located in a store where the calculated total number of purchases is the largest is chosen as a recommended pickup point (step S38).

Next, the acquirer 110 of the information processing device 100 acquires information indicating a movement velocity of the delivery vehicle 400, which the information storage 190 stores in advance. Although, in the present embodiment, the movement velocity of the delivery vehicle 400 is a set velocity that is set to the delivery vehicle 400 in advance, the present embodiment is not limited thereto. The movement velocity of the delivery vehicle 400 may be, for example, an average velocity, a maximum velocity, or a minimum velocity of measured velocities of the delivery vehicle 400 having been measured in the past, a maximum velocity that the delivery vehicle 400 can achieve, or a velocity limit that is prescribed by a law Subsequently, the estimator 135 of the information processing device 100 divides the distance of the pickup route TGX, which starts from the location T of the delivery vehicle 400 and reaches the recommended pickup point G2 located at the pickup location GX, by the movement velocity, which is indicated by the acquired information. Through this processing, the estimator 135 estimates movement time required for the delivery vehicle 400 to move from the location T of the delivery vehicle 400 to the recommended pickup point G2. In the present embodiment, the following description is made using, as a specific example, a case where the movement time to the recommended pickup point G2 is estimated as 25 min.

Next, the acquirer 110 of the information processing device 100 acquires a system time, which is managed by, for example, the operating system (OS), and the estimator 135, by adding the estimated movement time to the system time, estimates an arrival time of the delivery vehicle 400 at the recommended pickup point G2 (step S39).

Subsequently, the identifier 130 of the information processing device 100 tries identification of a preparable item the preparation of which can be completed before arrival of the delivery vehicle 400 at the recommended pickup point G2 and determines whether or not a preparable item is identified (step S40). For this purpose, the acquirer 110 acquires information indicating the item ID "I22" and item name "hamburger" and information indicating the item ID "I23" and item name "ramen noodles", which are associated with the store ID "S2" of the store S2 having the recommended pickup point G2 and information indicating a preparation time less than or equal to the movement time of 25 min, from the item table in FIG. 9. Next, the identifier 130 identifies that the item I22 "hamburger" identified by the item ID "I22" and the item I23 "ramen noodles" identified by the item ID "I23" are preparable items, the preparation of which can be completed before arrival of the delivery vehicle 400 at the recommended pickup point G2. Subsequently, the identifier 130 determines that a preparable item is identified (step S40; Yes).

Next, the identifier 130 of the information processing device 100 determines one or a plurality of items to be recommended to the second user (hereinafter, referred to as recommended items) from among the identified one or plurality of preparable items, based on a predetermined rule or software-generated random numbers (step S41).

In the present embodiment, a case where the identifier 130 of the information processing device 100 identifies the recommended item I22 "hamburger" from among the plurality of preparable items, based on the purchase history of the second user is described. For this purpose, the acquirer 110 acquires information indicating the number of purchases associated with the user ID "U2" of the second user, the store ID "S2" of the store S2, which has the recommended pickup point G2, and the item ID "I22" of the preparable item I22 "hamburger" from the information storage 190. Through this processing, information indicating the number of times that the second user purchased the preparable item I22 "hamburger" at the store S2 in the past is acquired.

Likewise, the acquirer 110 of the information processing device 100 acquires information indicating the number of purchases associated with the user ID "U2", the store ID "S2", and the item ID "I23" of the preparable item I23 "ramen noodles". Subsequently, the identifier 130 determines the item I22 "hamburger" as a recommended item to be recommended to the second user in accordance with a predetermined rule that an item with the largest number of purchases is chosen as a recommended item.

Subsequently, the determiner 140 of the information processing device 100 determines an acceptance time limit within which an order of the recommended item I22 can be accepted (step S42). For this purpose, the acquirer 110 acquires information indicating a preparation time of 15 min that is associated with the item ID "I22" of the recommended item I22 in the item table in FIG. 9. Next, the determiner 140 determines an acceptance time limit, based on an arrival time of the delivery vehicle 400 at the recommended pickup point G2 and a preparation time indicated by the acquired information. Although, in the present embodiment, the determiner 140 determines, as the acceptance time limit, a time that is the preparation time earlier than the arrival time, the present embodiment is not limited thereto.

In this way, the determiner 140 of the information processing device 100 determines, as an acceptance time limit for an order of the recommended item I22 that is sold at the store S2, which has the recommended pickup point G2, the latest time among order acceptance times that allow the store S2 to finish preparation of the recommended item I22 before the delivery vehicle 400 arrives at the recommended pickup point G2.

Subsequently, the acquirer 110 of the information processing device 100 acquires information indicating a name of the store S2 associated with the store ID "S2" from the store table in FIG. 8. Next, the controller 145 generates recommendation information including location information of the recommended pickup point G2, information indicating the store ID "S2" and the name of the store S2, which has the recommended pickup point G2, information indicating the item ID "I22" and the name of the recommended item I22, which is sold at the store S2, and information indicating an order time limit. The recommendation information is information recommending the recommended item I22, which is sold at the store S2, to be ordered within the order time limit. Next, the controller 145 outputs the generated recommendation information to the data communication circuit 104a with the terminal device 902 of the second user as the destination (step S43). Subsequently, when the data communication circuit 104a sends the recommendation information to the terminal device 902, the controller 145 terminates the execution of the item recommendation processing.

When the execution of the item recommendation processing is terminated, the acquirer 110 of the information processing device 100 tries acquisition of an order received from the terminal device 902 of the second user from the data communication circuit 104a and determines whether or not an order is acquired (step S05 in FIG. 4).

In the present embodiment, the following description is made using, as a specific example, a case where an order is acquired. In addition, the following description is made using, as a specific example, a case where the acquired order includes the store ID "S2" and the item ID "I22" and also includes a sales request requesting the store S2 to sell the recommended item I22. Further, the following description is made using, as a specific example, a case where the order includes the store ID "S2", the item ID "I22", and the user ID "U2" and also includes a delivery request requesting pickup of the sold recommended item I22 at the recommended pickup point G2 located in the store S2 and delivery of the item I22 to the delivery destination D2 of the second user.

When the acquirer 110 of the information processing device 100 determines that an order is acquired (step S05; Yes), the acquirer 110 acquires the store ID "S2" included in the order. Next, the controller 145 outputs the sales request to the data communication circuit 104a with the terminal device 602 of the store S2, which is identified by the store ID "S2", as the destination. Through this processing, the controller 145 performs, on the data communication circuit 104a, control to cause the data communication circuit 104a to transfer the sales request to the terminal device 602 (step S06).

When the controller 145 of the information processing device 100 outputs the sales request, the controller 145 starts timing, using a not-illustrated hardware timer or software timer. Subsequently, the acquirer 110 tries acquisition of an acceptance report received from the terminal device 602 of the store S2 from the data communication circuit 104a at a predetermined cycle. The acceptance report received from the terminal device 602 is a report that includes the store ID "S2" and the item ID "I22" and that announces that the sales request requesting sale of the recommended item I22 is accepted by the store S2.

When the acquirer 110 has not acquired an acceptance report even when a timed period, which is a timed period of time, exceeds a predetermined period (step S07; No), the controller 145 of the information processing device 100 determines that the sales request of the recommended item I22 is not accepted. Subsequently, since the recommended item I22 is not to be sold, the determiner 140 determines not to accept a delivery request requesting delivery of the recommended item I22. Next, the controller 145 outputs a report announcing that the order is not accepted to the data communication circuit 104a with the terminal device 902 of the second user as the destination, and subsequently terminates the execution of the sales brokerage processing.

In contrast, when the acquirer 110 acquires an acceptance report before the timed period reaches the predetermined period (step S07; Yes), the controller 145 of the information processing device 100 determines that the sales request of the recommended item I22 is accepted. Next, the determiner 140 determines to accept a delivery request requesting delivery of the recommended item I22 (step S08).

Subsequently, the acquirer 110 of the information processing device 100 acquires the store ID "S2" and the item ID "I22" included in the sales request. Next, the controller 145 determines whether or not a combination of the store ID "S2" and the item ID "I22" acquired from the sales request coincides with a combination of the store ID "S2" and the item ID "I22" included in the recommendation information output in step S43 in FIG. 10. On this occasion, since the combinations coincide with each other, the controller 145 determines that a delivery request requesting pickup of the recommended item I22 at the store S2, which has the recommended pickup point G2, and delivery of the item I22 is accepted (step S09; Yes). That is, the controller 145 determines that an order recommended by the recommendation information output in step S43 is accepted.

Subsequently, the controller 145 of the information processing device 100 changes a delivery schedule of the delivery vehicle 400 in association with the acceptance of the order. Prior to the processing, the controller 145 outputs a stop command commanding the delivery vehicle 400 to suspend movement and stop to the data communication circuit 104a with the delivery vehicle 400 as the destination (step S11). Next, the controller 145 changes a delivery schedule in which the delivery vehicle 400 moves along the vicinity route G1D1 illustrated in FIG. 2 in the first stage of a route sequence to a delivery schedule in which the delivery vehicle 400 moves along the delivery route GXD1 in the non-order sequence route illustrated in FIG. 12 in the second stage of the route sequence (step S12). Next, the controller

145 of the information processing device 100 adds a pickup schedule in which the delivery vehicle 400 moves along the pickup route TGX in the non-order sequence route in the first stage of the route sequence and a delivery schedule in which the delivery vehicle 400 moves along the delivery route D1D2 in the third stage of the route sequence (step S13).

In order to perform the change in the delivery schedule described in step S12 on the information processing device 100 itself, the controller 145 of the information processing device 100 changes the schedule table in FIG. 7, which the information storage 190 stores, to a schedule table as illustrated in FIG. 15. For this purpose, the controller 145 changes, in the schedule table in FIG. 7, the information indicating the vicinity route G1D1, which is stored in the first record in which the vehicle ID "400" of the delivery vehicle 400 and the information indicating the first stage of a route sequence are stored, to information indicating the delivery route GXD1. Next, the controller 145 changes the information indicating the first stage of a route sequence stored in the first record to the information indicating the second stage of the route sequence.

In addition, in order to perform the schedule change in step S12 on the delivery vehicle 400, the controller 145 of the information processing device 100 generates a schedule change command commanding change in a not-illustrated schedule table that the delivery vehicle 400 stores. Subsequently, the controller 145 outputs the generated schedule change command to the data communication circuit 104a with the delivery vehicle 400 as the destination.

In the present embodiment, in the not-illustrated schedule table that the delivery vehicle 400 stores, four records that are the same as the first to fourth records in the schedule table in FIG. 7 are stored. Thus, the schedule change command output in step S12 is a command commanding a change of the information stored in the first record in the schedule table of the delivery vehicle 400 to information stored in the first record in the schedule table after change illustrated in FIG. 15. Therefore, in the schedule change command, the first record in the schedule table in FIG. 15 is included.

In addition, in order to perform the addition of schedules described in step S13 on the information processing device 100 itself, the acquirer 110 of the information processing device 100 acquires the second to fourth records that are associated with the vehicle ID "400" and the "vacant state" in the schedule table in FIG. 7 and selects one record from among the acquired second to fourth records, based on a predetermined rule or software-generated random numbers. In the present embodiment, the following description is made using, as a specific example, a case where the second record is selected.

Next, the controller 145 of the information processing device 100 adds a schedule to cause the recommended item I22 ordered by the second user to be stored in the storage box 422 of the delivery vehicle 400, which is identified by the box ID "2" stored in the second record. For this purpose, the controller 145 changes, in the schedule table in FIG. 7, the character strings "NULL" in the second record, in which the vehicle ID "400" and the box ID "2" are stored, to information indicating the "reserved state", the user ID "U2" of the second user, and the item ID "I22" of the recommended item I22. In order to add a pickup schedule, the controller 145 also changes the character strings "NULL" that are stored in the second record and that indicate that there is no pickup schedule to information indicating the recommended pickup point G2, information indicating the pickup route TGX, and the information indicating the first stage of a route sequence. The controller 145 further changes the character strings "NULL" that are stored in the second record and that indicate that there is no delivery schedule to information indicating the delivery destination D2 of the second user, information indicating the delivery route D1D2, and information indicating the third stage of the route sequence.

In addition, the controller 145 of the information processing device 100 generates a schedule change command in order to perform the schedule addition in step S13 on the delivery vehicle 400. The schedule change command generated in step S13 is a command commanding a change of the information stored in the second record in the schedule table of the delivery vehicle 400 to information stored in the second record in the schedule table after change illustrated in FIG. 15. Therefore, in the schedule change command, the second record in the schedule table in FIG. 15 is included. Subsequently, the controller 145 outputs the generated schedule change command to the data communication circuit 104*a* with the delivery vehicle 400 as the destination.

Subsequently, the controller 145 of the information processing device 100 outputs a movement start command commanding starting movement along the pickup route TGX, to which the first stage of a route sequence is assigned, to the data communication circuit 104*a* with the delivery vehicle 400 as the destination (step S14). Through this processing, the controller 145 performs control to cause the delivery vehicle 400 to move along the non-order sequence route illustrated in FIG. 12. Subsequently, when the data communication circuit 104*a* of the information processing device 100 sends the movement start command to the delivery vehicle 400, the controller 145 terminates the execution of the sales brokerage processing.

Figure 16:
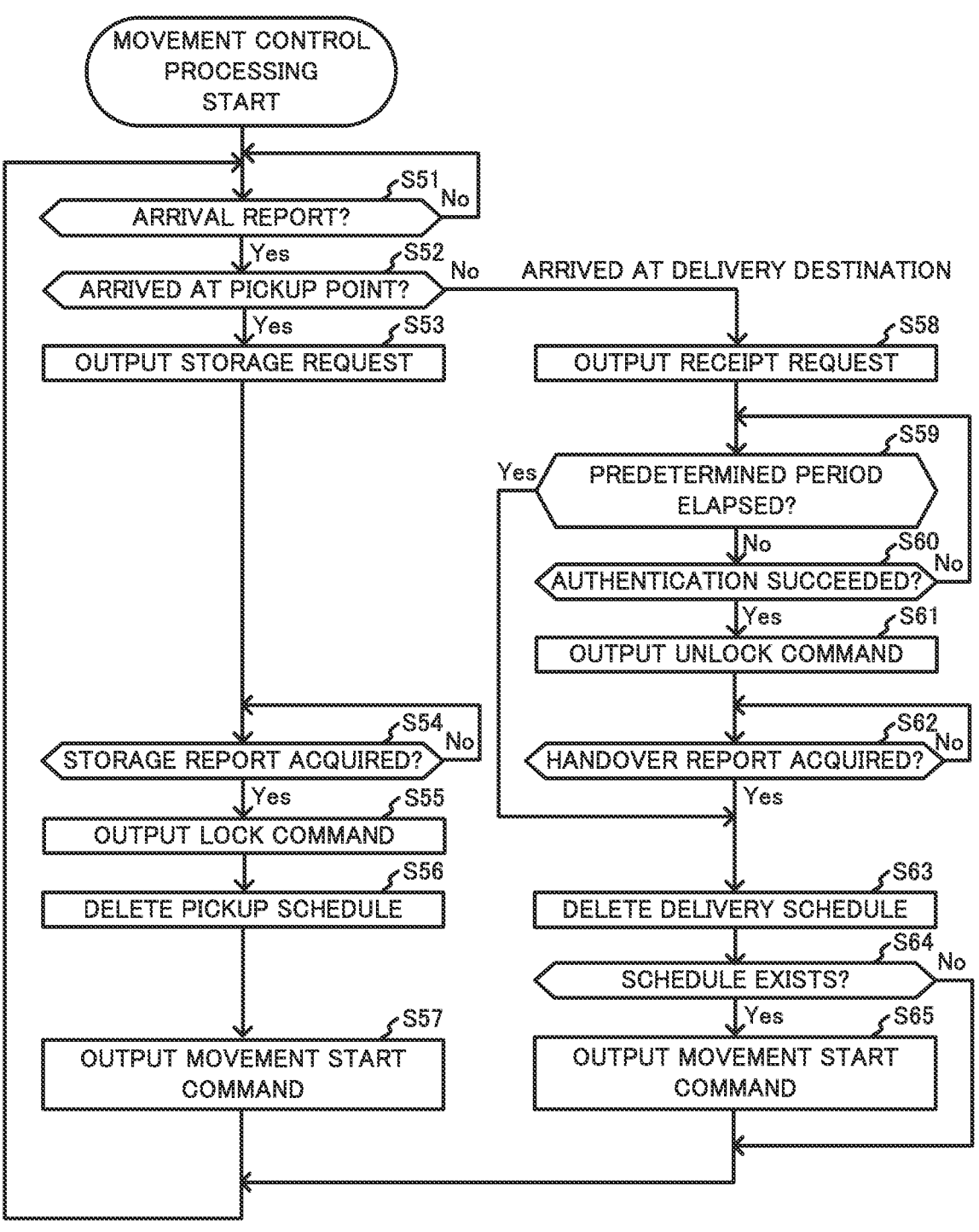
FIG. 16 is a flowchart illustrating an example of movement control processing that the information processing device executes.

When being started up, the CPU 101 of the information processing device 100 executes movement control processing as illustrated in FIG. 16 in order to control movement of the delivery vehicle 400. When the CPU 101 starts the execution of the movement control processing, the acquirer 110 tries acquisition of an arrival report of the delivery vehicle 400 from the data communication circuit 104*a* and determines whether or not an arrival report is acquired (step S51). The arrival report of the delivery vehicle 400 is a report announcing that the delivery vehicle 400 has arrived at any one of the pickup points G1 to G5 or either the delivery destination D1 or D2. On this occasion, when the acquirer 110 determines that no arrival report has been acquired (step S51; No), the acquirer 110 sleeps for a predetermined period of time and subsequently executes the processing in step S51.

In contrast, when the acquirer 110 of the information processing device 100 determines that an arrival report of the delivery vehicle 400 is acquired (step S51; Yes), the acquirer 110 acquires location information included in the arrival report. The location information included in an arrival report is information indicating a location at which the delivery vehicle 400 has arrived in latitude, longitude, and altitude. Next, the acquirer 110 tries acquisition of a store ID associated with the acquired location information from the store table in FIG. 8. Subsequently, the acquirer 110 determines whether or not the delivery vehicle 400 has arrived at any one of the pickup points G1 to G5 or whether or not the delivery vehicle 400 has arrived at either the delivery destination D1 or D2, based on whether or not a store ID is acquired (step S52).

In the present embodiment, the following description is made using, as a specific example, a case where, since the delivery vehicle 400 moving along the non-order sequence route illustrated in FIG. 12 has arrived at the recommended pickup point G2 located at the pickup location GX, the location information of the recommended pickup point G2 is included in the arrival report. Since the acquirer 110 of the information processing device 100 has thus acquired the store ID "S2" of the store S2, which has the recommended pickup point G2, the acquirer 110 determines that the delivery vehicle 400 has arrived at the recommended pickup point G2 (step S52; Yes).

Next, the acquirer 110 of the information processing device 100 acquires the box ID "2" and the item ID "I22" associated with the vehicle ID "400" of the delivery vehicle 400 and the location information of the recommended pickup point G2 from the schedule table in FIG. 15. Next, the controller 145 generates a storage request that includes the vehicle ID "400", the box ID "2", and the item ID "I22" and that requests an employee of the store S2 to store the recommended item I22 in the storage box 422 of the delivery vehicle 400. Next, the controller 145 outputs the generated storage request to the data communication circuit 104*a* with the terminal device 602 of the store S2 as the destination (step S53).

Subsequently, the acquirer 110 of the information processing device 100 tries acquisition of a storage report received from the terminal device 602 of the store S2 from the data communication circuit 104*a*. The storage report is a report that includes the vehicle ID "400" of the delivery vehicle 400 and the box ID "2" of the storage box 422 and that announces that the recommended item I22 is stored in the storage box 422 of the delivery vehicle 400.

Next, the acquirer 110 of the information processing device 100 determines whether or not a storage report is acquired (step S54) and, based on a result of the determination, determines whether or not pickup of the item I22 is finished. On this occasion, when the acquirer 110 determines that no storage report has been acquired (step S54; No), the acquirer 110 determines that the pickup has not been finished. Subsequently, the information processing device 100 sleeps for a predetermined period of time and subsequently repeats the above-described process from step S54.

In contrast, when the acquirer 110 of the information processing device 100 determines that a storage report is acquired (step S54; Yes), the acquirer 110 determines that the pickup of the item I22 is finished. Next, the acquirer 110 acquires the vehicle ID "400" and the box ID "2" included in the storage report. Subsequently, the controller 145 outputs a lock command that includes the box ID "2" and that commands locking of the storage box 422 to the data communication circuit 104*a* with the delivery vehicle 400, which is identified by the vehicle ID "400", as the destination (step S55). Next, the controller 145 changes state information associated with the vehicle ID "400" and the box ID "2" to the "storing state" in the schedule table in FIG. 15.

Subsequently, the controller 145 of the information processing device 100 deletes the pickup schedule of the item I22, which is stored in the storage box 422 of the delivery vehicle 400, from the information processing device 100 (step S56). For this purpose, the controller 145 changes the schedule table in FIG. 15 to a schedule table as illustrated in FIG. 17. In order to perform such a change, the controller 145 changes, in the schedule table in FIG. 15, the information that indicates the first stage of a route sequence and that is stored in the second record, in which the acquired vehicle ID "400" and box ID "2" are stored, to the character string "NULL" indicating that the pickup schedule has been deleted. The controller 145 also changes the information that indicates the second stage of the route sequence and that is stored in the first record in the schedule table in FIG. 15 to information that indicates the first stage of the route sequence, and changes the information that indicates the third stage of the route sequence, which is the last stage of the route sequence, and that is stored in the second record to information that indicates the second stage of the route sequence.

Next, the controller 145 of the information processing device 100 deletes the pickup schedule of the item I22 from the delivery vehicle 400. For this purpose, the controller 145 generates a first schedule change command commanding change of the information stored in the first record in the schedule table of the delivery vehicle 400 to the information stored in the first record in the schedule table in FIG. 17. The controller 145 also generates a second schedule change command commanding change of the information stored in the second record in the schedule table of the delivery vehicle 400 to the information stored in the second record in the schedule table in FIG. 17. Next, the controller 145 outputs the generated two schedule change commands to the data communication circuit 104a with the delivery vehicle 400 as the destination. Subsequently, the data communication circuit 104a of the information processing device 100 sends the schedule change commands to the delivery vehicle 400.

Next, the controller 145 of the information processing device 100 outputs a movement start command commanding starting movement along a delivery route G2D1 the stage of which of a route sequence is changed to the first stage, to the data communication circuit 104a with the delivery vehicle 400 as the destination (step S57). Subsequently, when the data communication circuit 104a of the information processing device 100 sends the movement start command to the delivery vehicle 400, the information processing device 100 repeats the above-described process from step S51.

Subsequently, the acquirer 110 of the information processing device 100, after having determined that an arrival report was acquired in step S51 (step S51; Yes), determines again whether or not the delivery vehicle 400 has arrived at any one of the pickup points G1 to G5 or either the delivery destination D1 or D2 (step S52).

In the present embodiment, the following description is made using, as a specific example, a case where the delivery vehicle 400 that is moving along the non-order sequence route in FIG. 12 has moved from the pickup location GX, at which the recommended pickup point G2 is located, along the delivery route GXD1 and has arrived at the delivery destination D1 of the first user. Thus, since the acquirer 110 of the information processing device 100 has not been able to acquire a store ID from the store table in FIG. 8, based on location information included in an arrival report, the acquirer 110 determines that the delivery vehicle 400 has arrived at the delivery destination D1 that is located at a location indicated by the location information (step S52; No).

Next, the controller 145 of the information processing device 100 starts timing, using a not-illustrated hardware timer or software timer. Next, the acquirer 110 acquires the box ID "1", the user ID "U1", and the item ID "I11" associated with the vehicle ID "400" of the delivery vehicle 400 and the location information of the delivery destination D1 from the schedule table in FIG. 17.

Next, the acquirer 110 of the information processing device 100 acquires information indicating item name "tomato" associated with the acquired item ID "I11" from the item table in FIG. 9. The acquirer 110 also acquires information indicating the location of the delivery destination D1 in an address, which the information storage 190 associates in advance with location information indicating the location of the delivery destination D1 in latitude, longitude, and altitude and stores. Next, the controller 145 generates a receipt request that includes the vehicle ID "400", the box ID "1", the information indicating the item name "tomato" of the item I11, and the information indicating the delivery destination D1 in an address. The receipt request generated in the present embodiment is a request requesting the first user to obtain authentication by inputting a password of the first user to the delivery vehicle 400 that arrived at the delivery destination D1 and, when succeeding in the authentication, receive the item I11 from the storage box 421. Subsequently, the controller 145 outputs the generated receipt request to the data communication circuit 104a with the terminal device 901, which the first user carries, as the destination (step S58).

Subsequently, the acquirer 110 of the information processing device 100 acquires information indicating a predetermined period from the information storage 190. Next, the controller 145 determines whether or not the predetermined period has elapsed since having output the receipt request, based on whether or not length of the timed period is greater than or equal to length of the predetermined period (step S59).

On this occasion, when the length of the timed period is greater than or equal to the length of the predetermined period, the controller 145 of the information processing device 100 determines that the predetermined period has elapsed (step S59; Yes). Next, the controller 145 determines that, although the first user has not received the item I11, the delivery of the item I11 is finished.

In contrast, when the length of the timed period is less than the length of the predetermined period, the controller 145 of the information processing device 100 determines that the predetermined period has not elapsed (step S59; No). Next, the acquirer 110 tries acquisition of an authentication request received from the delivery vehicle 400 from the data communication circuit 104a. The authentication request is a request that includes information indicating the password input to the delivery vehicle 400 by the first user and that requests performing password authentication.

On this occasion, when the acquirer 110 of the information processing device 100 acquires authentication information, the acquirer 110 acquires information indicating a password associated with the user ID "U1" of the first user in the user table in FIG. 6. Next, the authenticator 115 determines whether or not the password authentication has succeeded, based on whether or not the password indicated by the information acquired from the user table and the password indicated by the authentication information coincide with each other (step S60). On this occasion, when the authenticator 115 determines that the password authentication has not succeeded but has failed because the passwords do not coincide with each other (step S60; No), the controller 145 outputs an authentication failure report announcing that the password authentication has failed to the data communication circuit 104a with the delivery vehicle 400 as the destination. Subsequently, the information processing device 100 repeats the above-described process from step S59.

In contrast, when the authenticator 115 of the information processing device 100 determines that the authentication has succeeded because the two passwords coincide with each other (step S60; Yes), the controller 145 generates an unlock command that includes the box ID "1" and that commands unlocking of the storage box 421. Next, the controller 145 outputs the generated unlock command to the data communication circuit 104$a$ with the delivery vehicle 400 as the destination (step S61).

Subsequently, the acquirer 110 of the information processing device 100 tries acquisition of a handover report received from the delivery vehicle 400 from the data communication circuit 104$a$. The handover report is a report that includes the vehicle ID "400" of the delivery vehicle 400 and the box ID "1" of the storage box 421 and that announces that the item I11, which has been stored in the storage box 421 of the delivery vehicle 400, is handed over to the first user.

Next, the controller 145 of the information processing device 100 determines whether or not a handover report is acquired (step S62) and, based on a result of the determination, determines whether or not the delivery of the item I11 is finished. On this occasion, when the controller 145 determines that no handover report has been acquired (step S62; No), the controller 145 determines that the delivery has not been finished. Subsequently, the information processing device 100 sleeps for a predetermined period of time and subsequently repeats the above-described process from step S62.

In contrast, when the controller 145 of the information processing device 100 determines that a handover report is acquired (step S62; Yes), the controller 145 determines that the delivery is finished. When the controller 145 determines that the delivery is finished, the controller 145 deletes the delivery schedule and the like of the item I11, which have been stored in the storage box 421 of the delivery vehicle 400, from the information processing device 100 (step S63). For this purpose, the controller 145 changes the schedule table in FIG. 17 to a schedule table as illustrated in FIG. 18. In order to make such a change, the controller 145 changes, in the schedule table in FIG. 17, the state information, the item ID, the user ID, the pickup schedule, and the delivery schedule in the first record, in which the vehicle ID "400" and the box ID "1" are stored, to the state information indicating the "vacant state" and the character strings "NULL". In addition, the controller 145 changes the information that indicates the second stage of a route sequence and that is stored in the second record in the schedule table to information that indicates the first stage of the route sequence.

Next, the controller 145 of the information processing device 100 deletes the delivery schedule and the like of the item I11 from the delivery vehicle 400. For this purpose, the controller 145 generates a schedule change command commanding change of the information stored in the first record in the schedule table of the delivery vehicle 400 to information stored in the first record in the schedule table in FIG. 18. The controller 145 also generates a schedule change command commanding change of the information stored in the second record in the schedule table of the delivery vehicle 400 to information stored in the second record in the schedule table in FIG. 18. Next, the controller 145 outputs the generated two schedule change commands to the data communication circuit 104$a$ with the delivery vehicle 400 as the destination.

Subsequently, the acquirer 110 of the information processing device 100 tries acquisition of information indicating the first stage of a route sequence from the schedule table in FIG. 18. Next, the acquirer 110 determines whether or not a pickup schedule or a delivery schedule that has not been executed exists, based on whether or not such information is acquired (step S64). On this occasion, since information indicating the first stage pf a route sequence is acquired, the acquirer 110 determines that the delivery vehicle 400 has not moved along the delivery route D1D2 that is associated with the acquired information. Thus, the acquirer 110 determines that a delivery schedule that has not been executed exists (step S64; Yes).

Subsequently, the controller 145 of the information processing device 100 outputs a movement start command commanding starting movement along the delivery route D1D2 to the data communication circuit 104$a$ with the delivery vehicle 400 as the destination (step S65). Subsequently, when the data communication circuit 104$a$ of the information processing device 100 sends the movement start command to the delivery vehicle 400, the information processing device 100 repeats the above-described process from step S51.

Subsequently, the information processing device 100, by executing the processing in steps S51 and S52 in this order (steps S51 and S52), determines that the delivery vehicle 400 has arrived at the delivery destination D2 of the second user (step S52; No). Next, the information processing device 100, by executing the processing in steps S58 to S62 in this order (steps S58 to S62), determines that delivery of the item I22 that the second user ordered is finished, and subsequently deletes the delivery schedule of the item I22 (step S63). Subsequently, when the information processing device 100 determines that neither pickup schedule nor delivery schedule that has not been executed exists (step S64; No), the information processing device 100 repeats the above-described process from step S51.

When being started up, the CPU 101 of the information processing device 100 executes processing similar to the movement control processing illustrated in FIG. 16 in order to control movement of the delivery vehicle 500.

Figure 19:
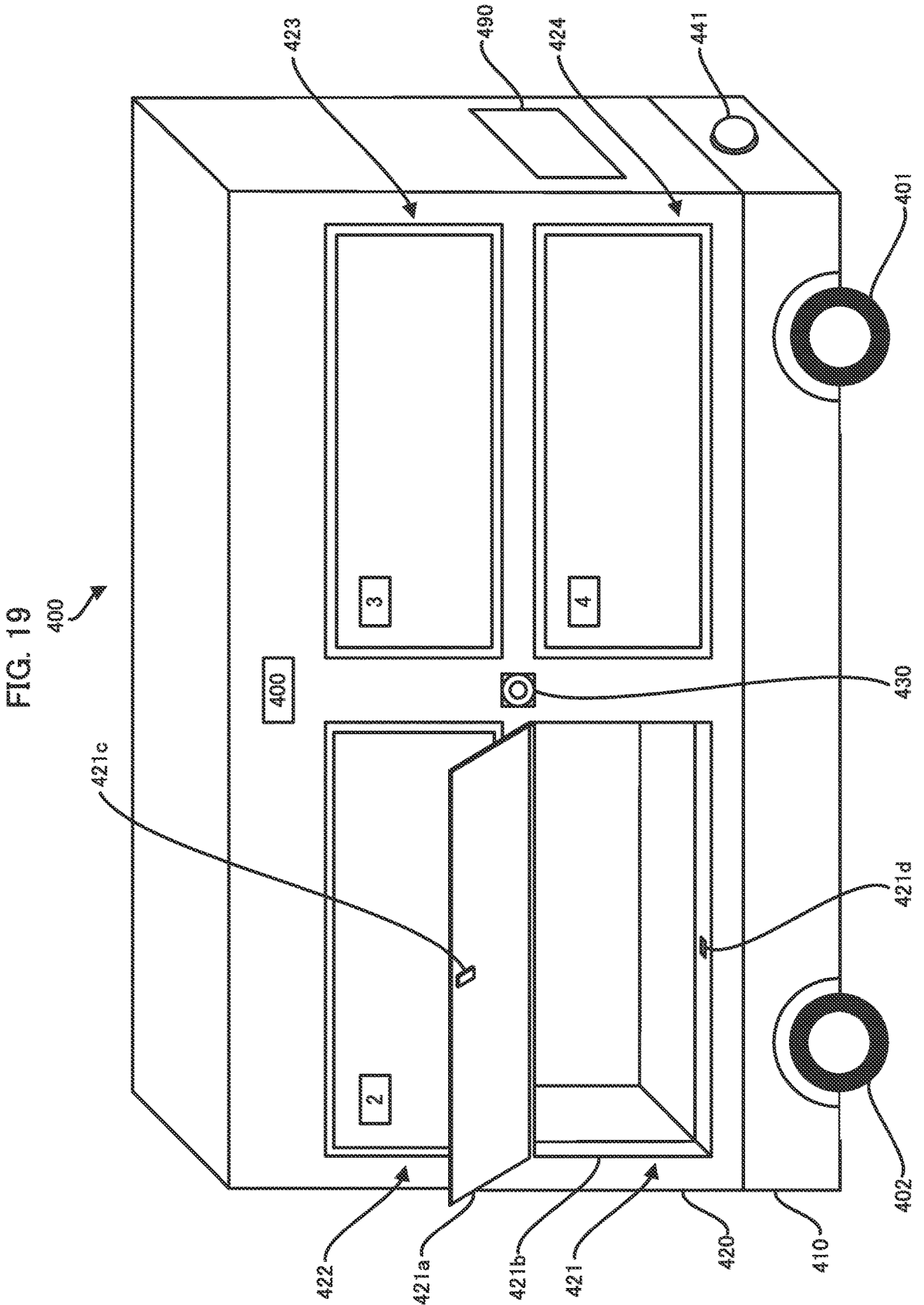
FIG. 19 is an appearance configuration diagram illustrating an appearance example of the delivery vehicle according to the embodiment.

The delivery vehicle 400 is, for example, an unmanned ground vehicle and is a traveling machine that can travel on the ground without human intervention. The delivery vehicle 400 includes a chassis 410 that is provided with a plurality of wheels including wheels 401 and 402, the storage cabinet 420 that is installed on the upper surface of the chassis 410, and an information processing device 490 that is built into the storage cabinet 420, as illustrated in FIG. 19.

On the storage cabinet 420 of the delivery vehicle 400, the vehicle ID "400" of the delivery vehicle 400 is printed, and the storage cabinet 420 includes four storage boxes 421 to 424 on which the box IDs "1" to "4" are printed, respectively. The storage box 421 includes a box body that is closed by plates and that forms a space the front of which is opened. The plates of the box body includes a not-illustrated bottom plate, ceiling plate, and back plate, and not-illustrated two side plates. A door frame 421$b$ that receives a door 421$a$ is installed on the opening of the box body. The door 421$a$ includes a deadbolt 421$c$ that is a bolt, and the door frame 421$b$ includes a strike 421$d$ that is a strike plate for the deadbolt 421$c$.

The door 421$a$ of the storage box 421 that delivery vehicle 400 includes further includes a not-illustrated motor that causes the deadbolt 421$c$ to be inserted into the strike 421$d$ in accordance with a signal output from the information processing device 490 of the delivery vehicle 400. The motor also causes the deadbolt 421$c$ to be pulled out from the strike 421$d$ in accordance with a signal output from the information processing device 490. When the deadbolt 421$c$ is inserted into the strike 421$d$, the door 421$a$ of the storage box 421 is locked. When the deadbolt 421$c$ is pulled out from the strike 421$d$, the door 421$a$ of the storage box 421 is unlocked. Configurations and functions that the storage boxes 422 to 424 have are the same as the configuration and the functions that the storage box 421 has.

The storage cabinet 420 of the delivery vehicle 400 includes an image capturing device 430, which is, for example, a digital camera, on a surface on which the doors of the storage boxes 421 to 424 are installed. The optical axis and an angle of view of the image capturing device 430 are adjusted in such a way that a user who receives an item stored in one of the storage boxes 421 to 424 is included in an imaging range. The image capturing device 430 captures images at a predetermined cycle and outputs signals representing images acquired through the image capturing to the information processing device 490.

The delivery vehicle 400 further includes a light detection and ranging (LiDAR) sensor 441 that is installed on the front surface of the chassis 410 and a not-illustrated LiDAR sensor that is installed on the back surface of the chassis 410.

The LiDAR sensor 441 on the front surface that the delivery vehicle 400 includes emits laser light in a plurality of directions that, when the front direction of the delivery vehicle 400 is used as a reference azimuthal direction, is included in a range of azimuth angle formed with the reference azimuthal direction from −90 degrees to +90 degrees and elevation angle formed with the front direction of the delivery vehicle 400 from −90 degrees to +90 degrees. The LiDAR sensor 441 on the front surface receives reflected light of the emitted laser light and, based on a period from the emission of the laser light to the reception of the reflected light, measures distances to a plurality of reflection points at which the laser light is reflected. Next, the LiDAR sensor 441 on the front surface calculates coordinate values of the plurality of reflection points in a three-dimensional coordinate system of the delivery vehicle 400 with the center point of the delivery vehicle 400 taken as the origin, based on the emission directions of the laser light and the measured distances. Subsequently, the LiDAR sensor 441 on the front surface outputs the calculated coordinate values of the plurality of reflection points to the information processing device 490 of the delivery vehicle 400.

The LiDAR sensor on the back surface that the delivery vehicle 400 includes emits infrared laser light in a plurality of directions that, when the rearward direction of the delivery vehicle 400 is used as a reference azimuthal direction, is included in a range of azimuth angle formed with the reference azimuthal direction from −90 degrees to +90 degrees and elevation angle formed with the rearward direction of the delivery vehicle 400 from −90 degrees to +90 degrees. In addition, the LiDAR sensor on the back surface calculates coordinate values of a plurality of reflection points of the emitted laser light in the three-dimensional coordinate system of the delivery vehicle 400 and outputs the calculated coordinate values of the plurality of reflection points to the information processing device 490 of the delivery vehicle 400.

The reason why the LiDAR sensor 441 on the front surface and the LiDAR sensor on the back surface that the delivery vehicle 400 includes output the coordinate values of a plurality of reflection points to the information processing device 490 is that, in order to travel avoiding objects, such as an obstacle, the information processing device 490 of the delivery vehicle 400 identifies the coordinate values in the three-dimensional space and sizes of objects existing in all directions with the delivery vehicle 400 used as a reference.

Figure 20:
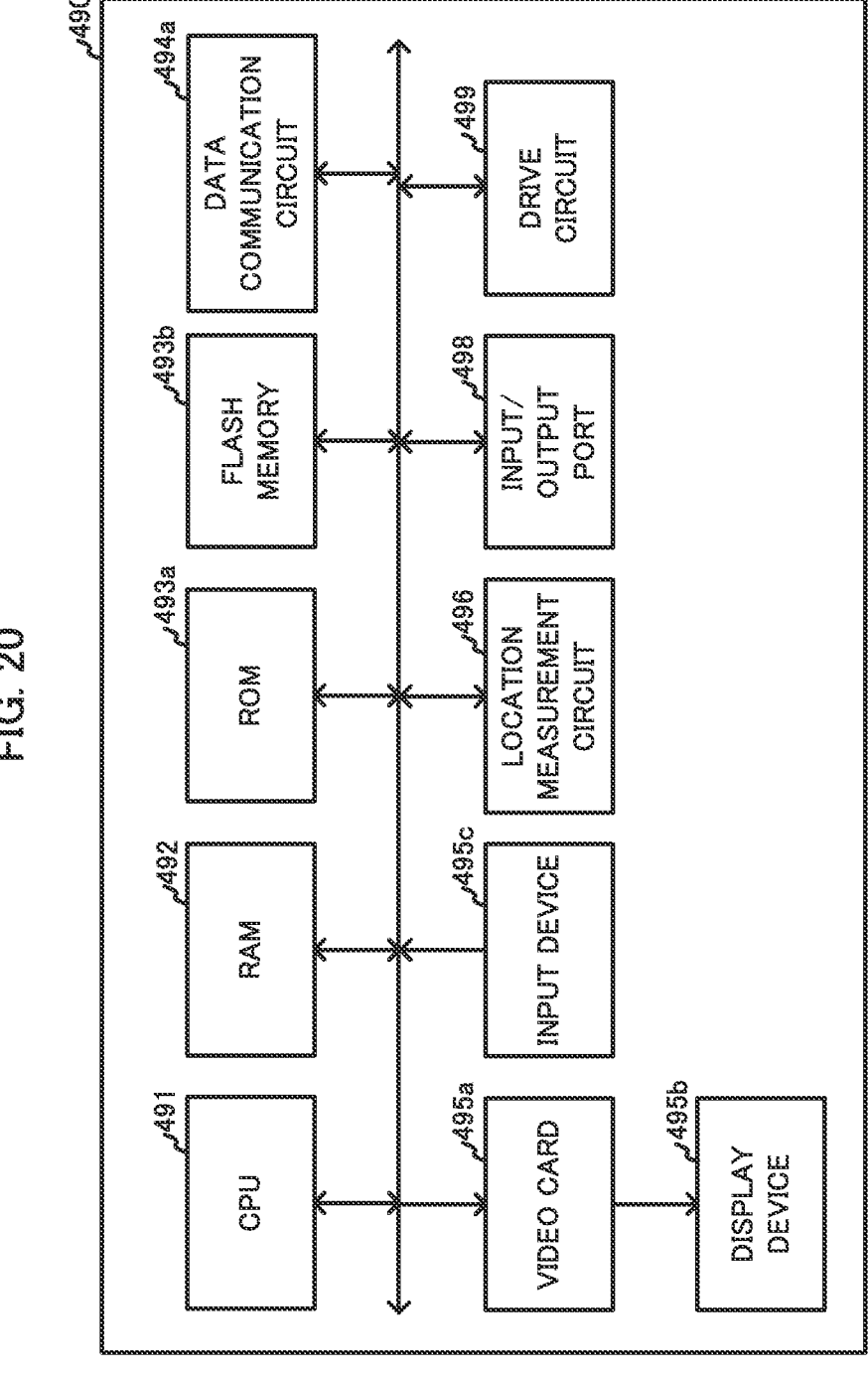
FIG. 20 is a hardware configuration diagram illustrating a configuration example of an information processing device that the delivery vehicle includes.

The information processing device 490 of the delivery vehicle 400 includes a CPU 491, a RAM 492, a ROM 493a, a flash memory 493b, a data communication circuit 494a, a video card 495a, a display device 495b, an input device 495c, a location measurement circuit 496, an input/output port 498, and a drive circuit 499, which are hardware components, as illustrated in FIG. 20. Although, in the present embodiment, the delivery vehicle 400 includes one CPU 491, the delivery vehicle 400 may include a plurality of CPUs. In addition, the delivery vehicle 400 may include a plurality of RAMs and may include a plurality of flash memories.

Configurations and functions of the CPU 491, the RAM 492, the ROM 493a, the data communication circuit 494a, the video card 495a, the display device 495b, and the input device 495c that the delivery vehicle 400 includes are the same as the configurations and functions of the CPU 101, the RAM 102, the ROM 103a, the data communication circuit 104a, the video card 105a, the display device 105b, and the input device 105c that the information processing device 100 includes, respectively.

The flash memory 493b of the delivery vehicle 400 stores various types of programs, various types of data used in execution of the programs, and tables in which data are stored. The flash memory 493b stores the not-illustrated schedule table in advance. In the schedule table that the flash memory 493b stores, four records are stored. The four records in the schedule table that the delivery vehicle 400 stores are the same as the first to fourth records in the schedule table in FIG. 7 that the information processing device 100 stores.

The location measurement circuit 496 of the delivery vehicle 400 is a quasi-zenith satellite system (QZSS) circuit. The location measurement circuit 496 receives signals emitted from quasi-zenith satellites, measures latitude, longitude, and altitude indicating a location of the delivery vehicle 400, based on the received signals, and outputs a signal indicating the measured latitude, longitude, and altitude. The location measurement circuit 496 may be, instead of the QZSS circuit, a global positioning system (GPS) circuit that receives GPS signals emitted by GPS satellites and measures latitude, longitude, and altitude indicating a location of the delivery vehicle 400, based on the received GPS signals.

The input/output port 498 of the delivery vehicle 400 is connected to a not-illustrated cable that is connected to the image capturing device 430, and inputs a signal that the image capturing device 430 outputs to the CPU 491. The input/output port 498 of the delivery vehicle 400 is also connected to not-illustrated cables that are respectively connected to the LiDAR sensor 441 on the front surface and the LiDAR sensor on the back surface. The input/output port 498 inputs signals representing coordinate values that the LiDAR sensor 441 on the front surface and the LiDAR sensor on the back surface respectively output, to the CPU 491.

The drive circuit 499 of the delivery vehicle 400 is connected to not-illustrated cables that are respectively connected to not-illustrated motors that rotate the plurality of wheels. The drive circuit 499 rotates the plurality of wheels by driving the motors in accordance with a control signal output by the CPU 491.

In addition, the drive circuit 499 of the delivery vehicle 400 is connected to a cable that is connected to the not-illustrated motor that the door 421a includes, and drives the motor in accordance with a signal output by the CPU 491. Driven by the motor that the door 421a includes, the deadbolt 421c is pulled out from the strike 421d or inserted into the strike 421d.

When the data communication circuit 494*a* of the delivery vehicle 400 receives a location send request output in step S37 in FIG. 10 from the information processing device 100, the CPU 491 of the delivery vehicle 400 identifies latitude, longitude, and altitude of the delivery vehicle 400, based on a signal output from the location measurement circuit 496. Next, the CPU 491 generates location information indicating the location of the delivery vehicle 400 in latitude, longitude, and altitude and outputs the generated location information to the data communication circuit 494*a* with the information processing device 100 as the destination. Subsequently, the data communication circuit 494*a* of the delivery vehicle 400 sends the location information of the delivery vehicle 400 to the information processing device 100.

Subsequently, when the data communication circuit 494*a* of the delivery vehicle 400 receives a schedule change command output in step S12 or S13 in FIG. 4, the CPU 491 of the delivery vehicle 400 acquires the schedule change command from the data communication circuit 494*a*. Next, the CPU 491 acquires a record included in the schedule change command and acquires a box ID stored in the acquired record. Subsequently, the CPU 491 identifies a record in which the acquired box ID is stored from among the four records stored in the not-illustrated schedule table that the flash memory 493*b* stores. Next, the CPU 491 of the delivery vehicle 400 changes state information, an item ID, a user ID, a pickup schedule, and a delivery schedule stored in the identified record in the flash memory 493*b* to state information, an item ID, a user ID, a pickup schedule, and a delivery schedule stored in the record acquired from the schedule change command, respectively.

When the data communication circuit 494*a* of the delivery vehicle 400 receives a movement start command from the information processing device 100, the CPU 491 of the delivery vehicle 400 executes movement processing as illustrated in FIG. 21 in order to move in accordance with the movement start command. When the CPU 491 of the delivery vehicle 400 starts the execution of the movement processing, the CPU 491 acquires information indicating the pickup route TGX that is associated with information indicating the first stage of a route sequence from the not-illustrated schedule table, which the flash memory 493*b* stores (step S71).

Next, the CPU 491 of the delivery vehicle 400 acquires information indicating the set velocity of the delivery vehicle 400, which the flash memory 493*b* stores in advance. Subsequently, the CPU 491 identifies latitude, longitude, and altitude of the delivery vehicle 400, based on a signal output from the location measurement circuit 496. Next, the CPU 491 generates a control signal for moving at the set velocity in such a way as to reduce a difference between the identified latitude, longitude, and altitude and latitude, longitude, and altitude of a node at the top of a visiting sequence of a plurality of nodes included in a movement route that have not been visited and outputs the generated control signal to the drive circuit 499 (step S72). Through this processing, the delivery vehicle 400, by rotating the plurality of wheels, moves at the set velocity toward the node at the top of the visiting sequence of the nodes that have not been visited.

Subsequently, the CPU 491 of the delivery vehicle 400 tries acquisition of a stop command from the data communication circuit 494*a* and determines whether or not a stop command is acquired (step S73). On this occasion, when the CPU 491 acquires a stop command (step S73; Yes), the CPU 491 outputs a control signal to stop the rotation of the plurality of wheels to the drive circuit 499 and subsequently terminates the execution of the movement processing. Through this processing, the delivery vehicle 400 suspends movement and stops.

In contrast, when the CPU 491 of the delivery vehicle 400 determines that no stop command has been acquired (step S73; No), the CPU 491 determines whether or not the delivery vehicle 400 has reached the end point GX of the pickup route TGX, based on whether or not the delivery vehicle 400 has visited all of a plurality of nodes included in the pickup route TGX (step S74). On this occasion, when the CPU 491 determines that, since the delivery vehicle 400 has not visited all of the plurality of nodes, the delivery vehicle 400 has not reached the end point GX of the pickup route TGX (step S74; No), the CPU 491 repeats the above-described process from step S72.

In contrast, when the CPU 491 of the delivery vehicle 400 determines that, since the delivery vehicle 400 has visited all of the plurality of nodes, the delivery vehicle 400 has reached the end point GX of the pickup route TGX (step S74; Yes), the CPU 491 outputs a control signal to stop the rotation of the plurality of wheels to the drive circuit 499. Through this processing, the delivery vehicle 400 parks or comes to a stop at the end point GX of the pickup route TGX. Subsequently, the CPU 491 acquires location information of a node corresponding to the end point GX from the information indicating the pickup route TGX and generates an arrival report that includes the acquired location information and that announces that the delivery vehicle 400 has arrived at the end point GX of the pickup route TGX. Next, the CPU 491 outputs the generated arrival report to the data communication circuit 494*a* with the information processing device 100 as the destination (step S75) and subsequently terminates the execution of the movement processing.

After the delivery vehicle 400 arrived at the pickup location GX at which the pickup point G2 of the store S2 is located and the item I22 was stored in the storage box 422 by an employee of the store S2, the data communication circuit 494*a* of the delivery vehicle 400 receives a lock command. Next, the CPU 491 of the delivery vehicle 400 acquires the lock command from the data communication circuit 494*a* and acquires the box ID "2" included in the acquired lock command. Subsequently, the CPU 491 outputs a control signal to cause the drive circuit 499 to lock the storage box 422, which is identified by the acquired box ID "2", to the drive circuit 499. In this way, the delivery vehicle 400 locks the storage box 422.

Subsequently, when the delivery vehicle 400 receives a movement start command, the delivery vehicle 400, by executing the movement processing illustrated in FIG. 21 again, moves along the delivery route GXD1 and arrives at the delivery destination D1 of the first user. Next, when the first user arrives at the delivery destination D1 and performs an operation for inputting the password of the first user to the input device 495*c* of the delivery vehicle 400, the input device 495*c* of the delivery vehicle 400 outputs a signal corresponding to the operation. Next, the CPU 491 of the delivery vehicle 400 executes processing of identifying the input password, based on the signal. Next, the CPU 491 outputs an authentication request that includes information indicating the input password and that requests password authentication to the data communication circuit 494*a* with the information processing device 100 as the destination. The data communication circuit 494*a* sends the authentication request to the information processing device 100.

Subsequently, when the data communication circuit 494*a* of the delivery vehicle 400 receives an authentication failure report, the CPU 491 of the delivery vehicle 400 determines that the password authentication has failed. Next, the CPU 491 causes the display device 495*b* to display a message indicating that the authentication has failed and a message prompting a password to be input again. Subsequently, the CPU 491 repeats the above-described process from the processing of acquiring the input password.

In contrast, when the data communication circuit 494*a* of the delivery vehicle 400 receives an unlock command, the CPU 491 of the delivery vehicle 400 acquires the unlock command from the data communication circuit 494*a* and determines that the password authentication has succeeded. Next, the CPU 491 acquires the box ID "1" included in the unlock command and outputs a control signal to cause the drive circuit 499 to unlock the storage box 421, which is identified by the acquired box ID "1", to the drive circuit 499.

Subsequently, the CPU 491 of the delivery vehicle 400 acquires a signal output from the image capturing device 430 and, based on an image represented by the acquired signal (hereinafter, referred to as a captured image), determines whether or not the item I11 is received from the unlocked storage box 421, at a predetermined cycle. For this purpose, the CPU 491 is required to acquire information indicating a template image of the item, which is stored in the flash memory 493*b* in advance, and, based on a template image represented by the acquired information and a captured image represented by the acquired signal, perform template matching. Subsequently, when an image region corresponding to the item is detected from the captured image by the template matching, the CPU 491 determines that the item I11 was received. Next, the CPU 491 generates a handover report that includes the vehicle ID "400" of the delivery vehicle 400 and the box ID "1" of the storage box 421 and that announces that handover of the item I11, which has been stored in the storage box 421 of the delivery vehicle 400, is completed. Subsequently, the CPU 491 outputs the handover report to the data communication circuit 494*a* with the information processing device 100 as the destination. Next, the data communication circuit 494*a* sends the handover report to the information processing device 100.

Subsequently, when the delivery vehicle 400 receives a movement start command, the delivery vehicle 400, by executing the movement processing in FIG. 21 again, moves along the delivery route D1D2 and arrives at the delivery destination D2 of the second user. Next, when the second user arrives at the delivery destination D2 and performs an operation for inputting the password of the second user to the delivery vehicle 400, the delivery vehicle 400 sends an authentication request including the input password to the information processing device 100. Subsequently, when the delivery vehicle 400 receives an unlock command from the information processing device 100, the delivery vehicle 400 unlocks the storage box 422 in which the item I22 is stored. Next, when the delivery vehicle 400 determines that the item I22 is received, the delivery vehicle 400 sends a handover report that includes the vehicle ID "400" and the box ID "2" and that announces that handover of the item I22, which has been stored in the storage box 422 of the delivery vehicle 400, is completed to the information processing device 100.

A configuration and functions of the delivery vehicle 500 are the same as the configuration and functions of the delivery vehicle 400.

The terminal devices 601 to 605 that employees of the stores S1 to S5 carry, respectively, are, for example, smartphones or tablet-type or laptop-type personal computers and respectively have the same configuration and functions.

Thus, the terminal device 602 that an employee of the store S2, which has the recommended pickup point G2, carries is mainly described.

Figure 22:
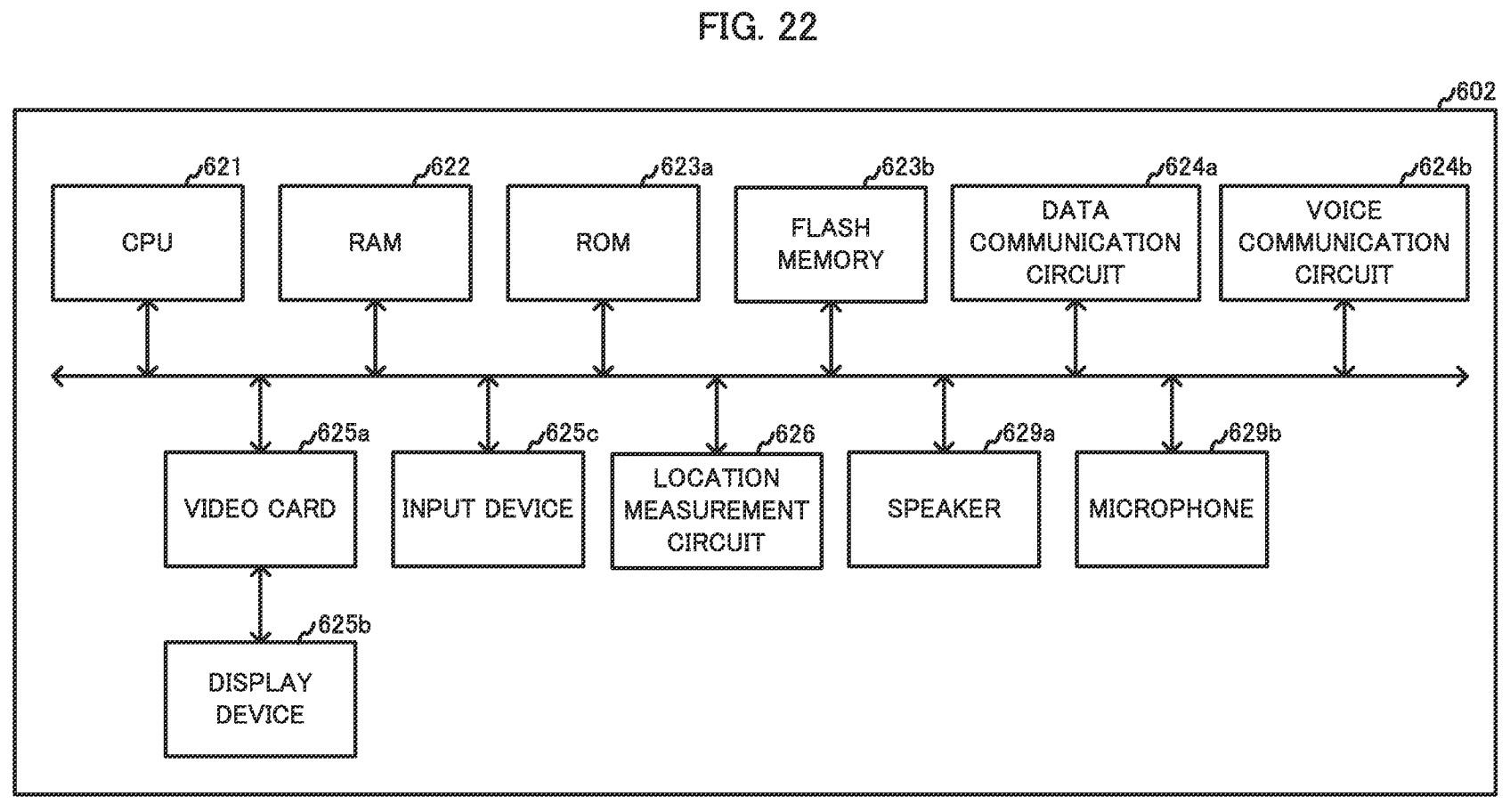

The terminal device 602 includes a CPU 621, a RAM 622, a ROM 623*a*, a flash memory 623*b*, a data communication circuit 624*a*, a voice communication circuit 624*b*, a video card 625*a*, a display device 625*b*, an input device 625*c*, a location measurement circuit 626, a speaker 629*a*, and a microphone 629*b*, which are hardware components, as illustrated in FIG. 22. The terminal device 602 may include a plurality of CPUs and may include a plurality of RAMs and flash memories.

Configurations and functions of the CPU 621, the RAM 622, the ROM 623*a*, the data communication circuit 624*a*, the video card 625*a*, the display device 625*b*, and the input device 625*c* of the terminal device 602 are the same as the configurations and functions of the CPU 101, the RAM 102, the ROM 103*a*, the data communication circuit 104*a*, the video card 105*a*, the display device 105*b*, and the input device 105*c* of the information processing device 100, respectively.

Configurations and functions of the flash memory 623*b* and the location measurement circuit 626 of the terminal device 602 are the same as the configurations and functions of the flash memory 493*b* and the location measurement circuit 496 of the delivery vehicle 400, respectively.

The voice communication circuit 624*b* of the terminal device 602 performs voice communication with a not-illustrated base station, using radio waves. The speaker 629*a* outputs sound in accordance with a signal output by the CPU 621, and the microphone 629*b* outputs a signal representing ambient sound around the terminal device 602.

When the data communication circuit 624*a* of the terminal device 602 receives a sales request transferred in step S06 in FIG. 4, the CPU 621 of the terminal device 602 acquires the sales request from the data communication circuit 624*a* and causes the display device 625*b* to display the acquired sales request. When the employee of the store S2 visually recognizes the displayed sales request, the employee determines whether or not to accept the sales request. When the employee determines not to accept the sales request, the employee does not accept the sales request, does not perform an operation for causing an acceptance report to be sent on the terminal device 602, and does not perform preparation of the item I22 the sale of which is requested.

In contrast, when the employee of the store S2 determines to accept the sales request, the employee accepts the sales request and subsequently performs, on the input device 625*c* of the terminal device 602, an operation for causing an acceptance report announcing that the sales request is accepted to be sent. When the input device 625*c* of the terminal device 602 outputs a signal corresponding to the operation, the CPU 621 of the terminal device 602 generates an acceptance report including the store ID "S2" and the item ID "I22" included in the sales request, based on the signal and outputs the generated acceptance report to the data communication circuit 624*a* with the information processing device 100 as the destination. Subsequently, the data communication circuit 624*a* of the terminal device 602 sends the acceptance report to the information processing device 100. Next, the employee starts preparation of the item I22, which is identified by the item ID "I22".

Subsequently, when the data communication circuit 624*a* of the terminal device 602 receives a storage request output in step S53 in FIG. 16, the CPU 621 of the terminal device 602 acquires the storage request from the data communication circuit 624a and causes the display device 625b to display the acquired storage request. The employee of the store S2 visually recognizes the vehicle ID "400", the box ID "2", and the item ID "I22" included in the displayed storage request. Next, the employee searches for the delivery vehicle 400 on which the visually-recognized vehicle ID "400" is printed among one or a plurality of delivery vehicles that has arrived at the recommended pickup point G2 of the store S2. Subsequently, the employee stores the recommended item I22, which is an item that is identified by the visually-recognized item ID "I22" and the preparation of which has been completed, into the storage box 422, on which the visually-recognized box ID "2" is printed.

Subsequently, the employee performs, on the input device 625c of the terminal device 602, an operation for causing a storage report announcing that the recommended item I22 is stored in the storage box 422 of the delivery vehicle 400 to be sent. When the input device 625c of the terminal device 602 outputs a signal corresponding to the operation, the CPU 621 of the terminal device 602 generates the storage report including the vehicle ID "400" and the box ID "2" included in the storage request, based on the signal and outputs the generated storage report to the data communication circuit 624a with the information processing device 100 as the destination. Subsequently, the data communication circuit 624a of the terminal device 602 sends the storage report to the information processing device 100.

The terminal devices 901 to 904 that the first to fourth users carry, respectively, are, for example, smartphones or tablet-type or laptop-type personal computers and respectively have the same configuration and functions. Thus, the terminal device 902 that the second user carries is mainly described.

Figure 23:
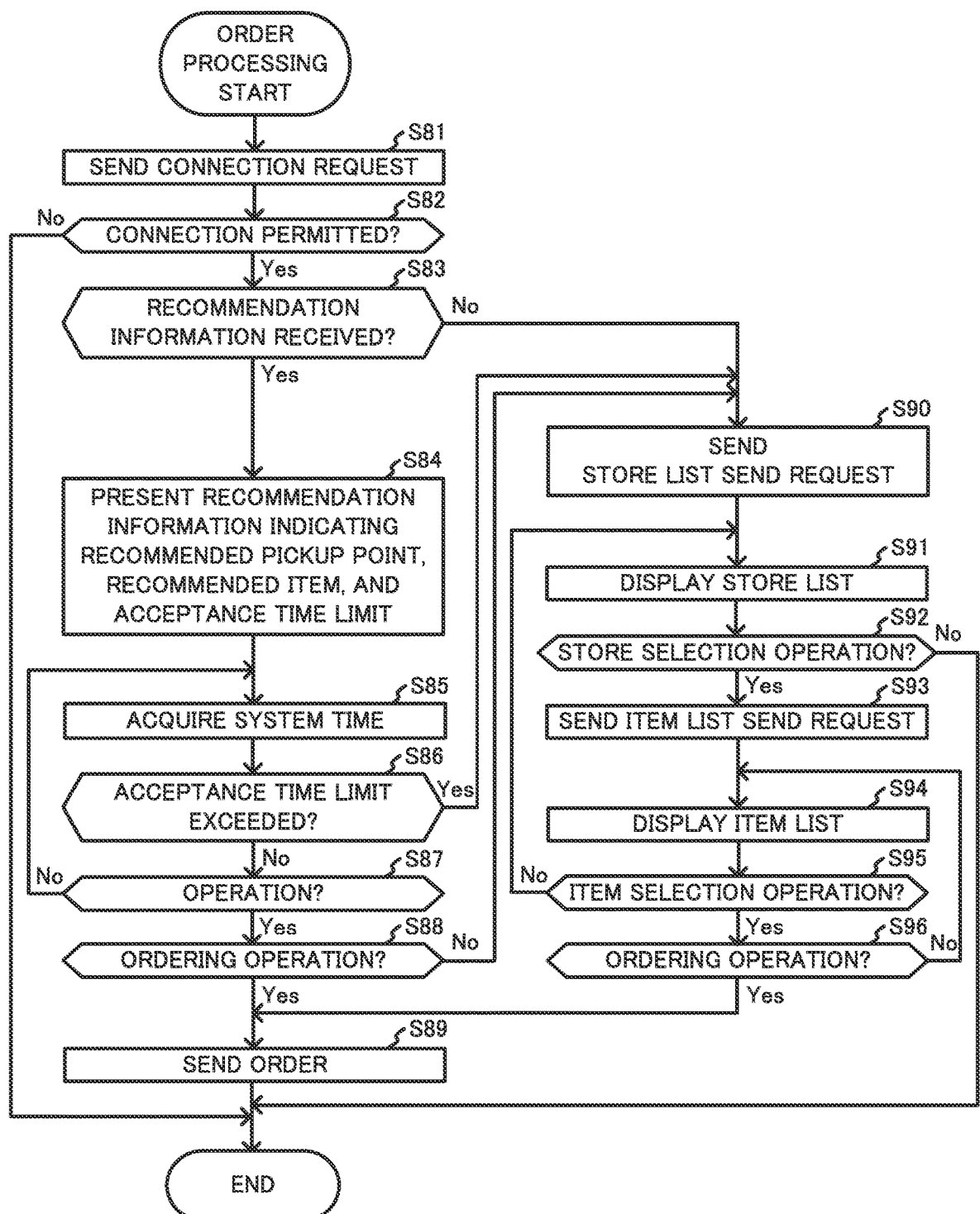
FIG. 23 is a flowchart illustrating an example of order processing that the terminal device executes.

The terminal device 902 includes hardware components having the same configuration and functions as the hardware components of the terminal device 602 illustrated in FIG. 22. The terminal device 902 stores in advance an application (hereinafter, referred to as an app) that is used for ordering an item. When the second user carrying the terminal device 902 performs an operation to start the app on the terminal device 902, the terminal device 902 starts execution of order processing, as illustrated in FIG. 23, that is defined by the app.

When the execution of the order processing is started, the terminal device 902 displays a message prompting input of authentication information including the user ID and password of the second user. When the second user who has visually recognized the message operates the terminal device 902, the terminal device 902 acquires the authentication information of the second user in response to the operation. Subsequently, the terminal device 902 sends a connection request including the acquired authentication information to the information processing device 100 (step S81).

When the terminal device 902 has not received a permission report even when a predetermined period has elapsed since having sent the connection request to the information processing device 100 (step S82; No), the terminal device 902 determines that connection is not permitted because the authentication has failed. Subsequently, the terminal device 902 displays a message announcing that the authentication has failed and subsequently terminates the execution of the order processing.

In contrast, when the terminal device 902 receives a permission report before the predetermined period has elapsed since having sent the connection request (step S82; Yes), the terminal device 902 determines that connection is permitted because the authentication has succeeded. Next, the terminal device 902 receives recommendation information output in step S43 in FIG. 10 before a predetermined period has elapsed since having received the permission report (step S83; Yes). The recommendation information to be received is information recommending the recommended item I22, which is sold at the store S2, to be ordered within an order time limit. The recommendation information includes the location information of the recommended pickup point G2, the store ID "S2" and the information indicating the name of the store S2, at which the recommended pickup point G2 is located, the item ID "I22" and the information indicating the name of the recommended item I22, which is sold at the store S2, and the information indicating the order time limit.

Figure 24:
FIG. 24 is a diagram illustrating an example of a recommendation screen that the terminal device displays.

Subsequently, the terminal device 902 causes a not-illustrated display device to display a recommendation screen, as illustrated in FIG. 24, in which the recommendation information is displayed. Through this processing, the terminal device 902 presents, to the second user, the recommended pickup point G2, the recommended item I22, and the acceptance time limit within which an order of the recommended item I22, which is to be picked up at the recommended pickup point G2, can be accepted (step S84).

Next, the terminal device 902 acquires a system time, which is managed by, for example, the OS, (step S85) and determines whether or not the acceptance time limit is exceeded, based on whether or not the acquired system time is a time later than the acceptance time limit (step S86).

In the present embodiment, the following description is made using, as a specific example, a case where an operation for making an order (hereinafter, referred to as an ordering operation) recommended by the recommendation information is performed on the terminal device 902 before the acceptance time limit is exceeded. Thus, the terminal device 902 determines that the acceptance time limit is not exceeded because the acquired system time is a time earlier than or equal to the acceptance time limit (step S86; No).

Next, the terminal device 902 determines whether or not some operation is performed by the second user, based on a signal output from a not-illustrated input device (step S87). On this occasion, when the terminal device 902 determines that no operation has been performed (step S87; No), the terminal device 902 repeats the above-described process from step S85.

In contrast, when the terminal device 902 determines that some operation is performed (step S87; Yes), the terminal device 902 determines whether or not the performed operation is an ordering operation, based on a signal output from the input device (step S88). In the present embodiment, the terminal device 902 determines that the performed operation is an ordering operation (step S88; Yes) and sends an order recommended by the recommendation information to the information processing device 100 (step S89). Subsequently, the terminal device 902 terminates the execution of the order processing. In the order to be sent to the information processing device 100, a sales request is included. The sales request is a request that includes the store ID "S2" and the item ID "I22", which are included in the recommendation information, and that requests the store S2 to sell the recommended item I22. In addition, in the order, a delivery request is included. The delivery request is a request that includes the store ID "S2" and the item ID "I22", which are included in the recommendation information, and the user ID "U2" of the second user, who made the order, and that requests pickup of the recommended item I22, which is to be sold, at the recommended pickup point G2, which is located in the store S2, and delivery of the item I22 to the delivery destination D2 of the second user.

According to the above-described configuration, when the information processing system 1 accepts a delivery request of an item, which is a transportable object, the information processing system 1 performs control to cause the delivery vehicle 400, which has a plurality of storage boxes 421 to 424, to deliver the item. In addition, the information processing system 1 includes the acquirer 110 that, when it is detected that the second user has accessed the information processing system 1, acquires the delivery destination D2 that is set with respect to the second user. Further, the information processing system 1 includes the extractor 125 that, when one or more of the plurality of storage boxes 421 to 424 are vacant, extracts the vicinity route G1D1 that has the end point D1 located at the acquired delivery destination D2 of the second user or within a vicinity of the delivery destination D2 from among the delivery routes G1D1 and G3D3 of items that are stored in one or more of the plurality of storage boxes 421 to 424. Further, the information processing system 1 includes the identifier 130 that identifies the pickup points G1, G2, and G4 at which the delivery vehicle 400 can pick up an item before the delivery vehicle 400 reaches the end point D1 of the extracted vicinity route G1D1. Thus, the information processing system 1 is capable of identifying the pickup points G1, G2, and G4 that enable delivery efficiency of items, which are transportable objects, to be improved. In the present embodiment, the delivery efficiency of items delivered by the delivery vehicle 400 is represented by the total number of items that the delivery vehicle 400 delivers per unit time or per unit length movement by the delivery vehicle 400. Likewise, delivery efficiency of items delivered by the delivery vehicle 500 is represented by the total number of items that the delivery vehicle 500 delivers per unit time or per unit length movement by the delivery vehicle 500. However, the delivery efficiency of items delivered by the delivery vehicle 400 and the delivery efficiency of items delivered by the delivery vehicle 500 are not limited to the definitions.

In addition, according to the above-described configuration, the vicinity route G1D1 is a route along which the delivery vehicle 400 is moving. Thus, the information processing system 1 identifies the pickup points G1, G2, and G4 at which the delivery vehicle 400 can pick up an item before the delivery vehicle 400 reaches the end point D1 of the vicinity route G1D1, along which the delivery vehicle 400 is moving. Thus, the information processing system 1 is capable of identifying the pickup points G1, G2, and G4 of an item that enable the delivery vehicle 400 to deliver the item to the delivery destination D2 of the second user faster than a pickup point at which the delivery vehicle 400 can pick up the item before the delivery vehicle 400 reaches the end point of a route along which the delivery vehicle 400 is not moving. Thus, when a property of an item that can be picked up at the pickup point G1, G2, or G4 includes a property that the state of the item changes as time passes, it is possible to prevent the state of the item from changing during delivery of the item from pickup at the pickup point G1, G2, or G4 until arrival at the delivery destination D2. The property that the state of an item changes as time passes includes one or more of, for example, a property of noodles getting soft, a cooling property, and a warming property.

Further, according to the above-described configuration, the information processing system 1 further includes the estimator 135 that estimates a movement time of 25 min required for the delivery vehicle 400 to move to the identified pickup point G2. The identifier 130 of the information processing system 1 also identifies the preparable items I22 and I23 that are items the preparation time of which required for preparation for being made ready for pickup at the identified pickup point G2 is less than or equal to the estimated movement time of 25 min. Thus, the information processing device 100 is capable of identifying the preparable items I22 and I23 that are estimated to be ready for pickup before the delivery vehicle 400 arrives at the pickup point G2.

Furthermore, according to the above-described configuration, the estimator 135 of the information processing system 1 further estimates an arrival time at which the delivery vehicle 400 arrives at the identified pickup point G2. In addition, the information processing system 1 includes the determiner 140 that determines an acceptance time limit within which a delivery request of the preparable item I22 can be accepted, based on the estimated arrival time and a preparation time of 15 min. Further, the information processing system 1 includes the data communication circuit 104a that sends recommendation information indicating the identified recommended pickup point G2, the identified preparable item I22, and the determined acceptance time limit to the terminal device 902 of the second user. Thus, the information processing system 1 is capable of sending, to the terminal device 902 of the second user, an acceptance time limit of an item that is determined based on an arrival time of the delivery vehicle 400 at the pickup point G2 and the preparation time of the preparable item I22. Accordingly, the second user, by confirming the acceptance time limit received by the terminal device 902, is able to know by when the second user has to make an order in order to cause preparation of the preparable item I22 to be finished before the delivery vehicle 400 arrives at the pickup point G2. Thus, the second user making an order of the preparable item I22, which is to be picked up at the pickup point G2, within the order time limit enables waiting time from arrival of the delivery vehicle 400 at the pickup point G2 to completion of preparation of the preparable item I22 to be eliminated or made shorter than heretofore, as a result of which it is possible to improve the delivery efficiency compared with conventional technologies.

In addition, according to the above-described configuration, the data communication circuit 104a of the information processing system 1 receives a delivery request requesting pickup of the preparable item I22 at the identified pickup point G2 and delivery of the item I22. In addition, when the received delivery request is accepted, the identifier 130 of the information processing system 1 identifies the pickup point G2 which is a pickup location GX at which the preparable item I22 is picked up and is located at a location at which, compared with distance of an order sequence route, distance of a non-order sequence route is shorter. The order sequence route is a route for performing delivery to the end point D1 of the vicinity route G1D1 in accordance with a preceding request having been accepted before the received delivery request, pickup at the pickup location GX in accordance with a succeeding request that is the received delivery request, and delivery from the pickup location GX in accordance with the succeeding request in this order. The non-order sequence route is a route for performing the pickup in accordance with the succeeding request, the delivery in accordance with the preceding request, and the delivery in accordance with the succeeding request in this order. Thus, the information processing system 1 is capable of identifying the pickup point G2 that, in the case where the delivery vehicle 400 moves along the non-order sequence route, enables the delivery efficiency to be improved compared with the case where the delivery vehicle 400 moves along the order sequence route.

In addition, according to the above-described configuration, when a succeeding request is accepted, the controller 145 that the information processing device 100 of the information processing system 1 includes performs control to cause the delivery vehicle 400 to move along a non-order sequence route. Thus, the information processing system 1 is capable of improving the delivery efficiency compared with the case where the delivery vehicle 400 moves along an order sequence route.

Modified Example 1 of Embodiment

In the embodiment, it was described that the acquirer 110 of the information processing device 100 acquired location information of the delivery destination D2, which was set with respect to the second user. However, the embodiment is not limited to the above description, and the delivery destination D2 according to the present modified example is a delivery destination that is estimated with respect to the second user and the acquirer 110 according to the present modified example acquires location information of the delivery destination D2 that is estimated with respect to the second user.

For this purpose, the information storage 190 according to the present modified example stores a not-illustrated user table. A plurality of records is stored in advance in the user table according to the present modified example, and, in each record, a user ID of a user, information indicating a password of the user, and information indicating, in an address, a location of a delivery destination that is estimated with respect to the user in advance are associated with one another in advance and stored. Thus, the acquirer 110 according to the present modified example acquires information that is information associated with the user ID "U2" of the second user and that indicates, in an address, the location of the delivery destination D2, which is estimated with respect to the second user, from the not-illustrated user table, in step S34 in FIG. 10. Subsequently, the acquirer 110 acquires location information that is information that the information storage 190 associates in advance with the information indicating the location of the estimated delivery destination D2 in an address and stores and that indicates the location of the estimated delivery destination D2 in latitude, longitude, and altitude.

Although, in the present modified example, the information indicating, in an address, the location of a delivery destination estimated with respect to a user is information indicating an address or a temporary address of the user, which the information storage 190 stores in advance, the present modified example is not limited thereto. The information indicating, in an address, the location of a delivery destination estimated with respect to a user may be information indicating a location of an office of the user in an address. In addition, the information indicating, in an address, the location of a delivery destination estimated with respect to a user may be information that is information that the information storage 190 stores in advance and that indicates, in an address, a location where the number of times that the location has been specified as a delivery destination in orders that have been made in the past by the user is the largest. Estimation processing of estimating a delivery destination with respect to a user and storing information indicating, in an address, a location of the estimated delivery destination in the not-illustrated user table in association with the user ID of the user is required to be executed by the CPU 101 of the information processing device 100 at a predetermined time, such as 2 AM.

Modified Example 2 of Embodiment

In Modified Example 1 of the embodiment, it was described that the acquirer 110 of the information processing device 100 acquired, from the not-illustrated user table, information indicating, in an address, the location of the delivery destination D2 estimated with respect to the second user. It was also described that the acquirer 110 acquired location information that was information that the information storage 190 stored in association with the acquired information and that indicated the location of the estimated delivery destination D2 in latitude, longitude, and altitude. However, the embodiment is not limited to the above description, and the acquirer 110 may acquire the location information of the terminal device 902, which the second user carries, as the location information of the delivery destination D2 that is estimated with respect to the second user.

For this purpose, the acquirer 110 of the information processing device 100 outputs a location send request to the data communication circuit 104a with the terminal device 902 as the destination. The location send request is a request requesting sending of location information indicating the location of the terminal device 902 in latitude, longitude, and altitude. When the terminal device 902 receives the location send request from the information processing device 100, the terminal device 902 identifies latitude, longitude, and altitude of the terminal device 902, based on a signal output from a not-illustrated location measurement circuit. Next, the terminal device 902 generates location information indicating the location of the terminal device 902 by the identified latitude, longitude, and altitude and returns the generated location information to the information processing device 100. When the data communication circuit 104a of the information processing device 100 receives the location information from the terminal device 902, the acquirer 110 acquires the location information of the terminal device 902 from the data communication circuit 104a as location information of the delivery destination D2 estimated with respect to the second user.

Modified Example 3 of Embodiment

Although, in the embodiment, it was described that the information processing device 100 performed, on the delivery vehicle 400, control to cause the delivery vehicle 400 to deliver the item I22 to the delivery destination D2 that was set by the second user in advance, the embodiment is not limited thereto. The information processing device 100 according to the present modified example performs, on the delivery vehicle 400, control to cause the delivery vehicle 400 to deliver the item I22 to a not-illustrated delivery destination DD that is specified by the second user and that is located at a location different from the delivery destination D2, which is set by the second user in advance.

For this purpose, when the terminal device 902, which the second user carries, determines that an ordering operation is performed, in step S88 in FIG. 23 (step S88; Yes), the terminal device 902 sends a delivery destination send request that includes the user ID "U2" of the second user and that requests sending of information indicating, in an address, the location of the delivery destination D2, which is set by the second user, to the information processing device 100.

When the data communication circuit 104a of the information processing device 100 receives the delivery destination send request, the acquirer 110 of the information processing device 100 acquires the delivery destination send request from the data communication circuit 104a and acquires the user ID "U2" of the second user from the acquired delivery destination send request. Next, the acquirer 110 acquires information that is associated with the user ID "U2" and indicates the location of the delivery destination D2 in an address in the user table in FIG. 6, and outputs the acquired information to the data communication circuit 104a with the terminal device 902 as the destination.

When the terminal device 902 of the second user receives the information indicating the location of the delivery destination D2 in an address, the terminal device 902 displays the address of the delivery destination D2 that is indicated by the received information. Subsequently, when the second user who has visually recognized the displayed address performs an operation on the terminal device 902, the terminal device 902 determines whether or not an approval operation for approving the delivery destination D2 located at the displayed address is performed, based on a signal corresponding to the operation output from a not-illustrated input device. On this occasion, when the terminal device 902 determines that the approval operation is performed, the terminal device 902 includes, in an order, an approval report announcing that the delivery destination D2 is approved, and sends the order to the information processing device 100 (step S89).

In contrast, when the terminal device 902 determines that no approval operation has been performed, the terminal device 902 determines that an operation to specify the delivery destination DD, which is located at an address different from the displayed address, is performed by the second user. Next, the terminal device 902 acquires information indicating the address of the delivery destination DD, which is specified by the second user, based on a signal output from the input device. Subsequently, the terminal device 902 includes, in an order, a specification report that includes the acquired information and that announces that the delivery destination DD different from the delivery destination D2 is specified, and sends the order to the information processing device 100 (step S89).

When the information processing device 100 determines that an order is acquired (step S05 in FIG. 4; Yes), the information processing device 100 executes the processing in steps S06 to S12 (steps S06 to S12). Subsequently, the controller 145 of the information processing device 100 adds a pickup schedule described in the embodiment and subsequently determines whether an approval report is included or a specification report is included in the acquired order. On this occasion, when the controller 145 determines that an approval report is included in the order, the controller 145 adds a delivery schedule in which the delivery vehicle 400 moves along the delivery route D1D2 starting from the end point D1 of the vicinity route G1D1 and reaching the delivery destination D2 approved by the second user.

In contrast, when the controller 145 of the information processing device 100 determines that a specification report is included in the order, the controller 145 acquires the information indicating the address of the delivery destination DD included in the specification report. Next, the acquirer 110 acquires location information indicating, in latitude, longitude, and altitude, the location of the delivery destination DD, which the information storage 190 stores in advance in association with the information indicating the address of the delivery destination DD. Subsequently, the controller 145 adds a delivery schedule in which the delivery vehicle 400 moves along a delivery route D1DD starting from the end point D1 of the vicinity route G1D1 and reaching the delivery destination DD specified by the second user, based on the acquired location information of the delivery destination DD (step S13). Next, the controller 145, by performing the movement control processing illustrated in FIG. 16, performs control to cause the delivery vehicle 400 to move along the delivery route D1DD, based on the added delivery schedule.

In the present modified example, it was described that the information processing device 100 performed, on the delivery vehicle 400, control to cause the delivery vehicle 400 to deliver the item I22 to the delivery destination DD that was specified by the second user and was located at a location different from the delivery destination D2, which was set in advance by the second user. However, the embodiment is not limited to the above description. The information processing device 100 may perform, on the delivery vehicle 400, control to cause the delivery vehicle 400 to deliver the item I22 to the delivery destination DD that is specified by the second user and is located at a location different from the delivery destination D2, which is estimated with respect to the second user.

Modified Example 4 of Embodiment

In the embodiment, it was described that the determiner 140 of the information processing device 100 determined a time earlier than an arrival time of the delivery vehicle 400 at the recommended pickup point G2 by preparation time of the recommended item I22 at the recommended pickup point G2 as an acceptance time limit within which an order of the recommended item I22, which was to be picked up at the recommended pickup point G2, could be accepted. However, the embodiment is not limited to the above description, and the determiner 140 may determine, as the acceptance time limit, a time earlier than the arrival time by the total time of the preparation time and a predetermined time allowance. A person skilled in the art can determine, by experiment, a suitable length of the time allowance.

In addition, the determiner 140 of the information processing device 100 may determine, as the acceptance time limit, a time earlier than the arrival time by a period of time obtained by subtracting a predetermined allowable time from the preparation time. The allowable time is a predetermined longest period of time that is allowed as a waiting time from arrival of the delivery vehicle 400 at the recommended pickup point G2 to completion of preparation of the recommended item I22 at the recommended pickup point G2. A person skilled in the art can determine, by experiment, a suitable length of the allowable time.

Modified Example 5 of Embodiment

When a succeeding request of the second user is accepted, the controller 145 of the information processing device 100 according to the present modified example outputs, to the data communication circuit 104a with the terminal device 901 of the first user who made a preceding request as the destination, an inquiry inquiring whether or not it is allowed to cause the delivery vehicle 400 to move along a non-order sequence route in order to perform delivery in accordance with the preceding request after pickup in accordance with the succeeding request.

When, after the data communication circuit 104a of the information processing device 100 has sent the inquiry to the terminal device 901, the data communication circuit 104*a* receives, from the terminal device 901, an answer replying that it is not allowed to cause the delivery vehicle 400 to move along the non-order sequence route, the controller 145 causes the delivery vehicle 400 to move along, instead of the non-order sequence route, an order sequence route.

In contrast, when the data communication circuit 104*a* of the information processing device 100 receives, from the terminal device 901, an answer replying that it is allowed to cause the delivery vehicle 400 to move along the non-order sequence route, the controller 145 causes the delivery vehicle 400 to move along the non-order sequence route.

Modified Example 6 of Embodiment

In the embodiment, it was described that the first condition was a condition requiring that both the first detail condition and the second detail condition in the first condition are satisfied. In the embodiment, it was also described that the first detail condition in the first condition was a condition requiring being a location on the vicinity route G1D1 or a location within a vicinity of the vicinity route G1D1. In the embodiment, it was further described that the second detail condition in the first condition was a condition requiring being located at a location at which, in the case where a delivery request of the second user is accepted, distance of a non-order sequence route as illustrated in FIG. 12 is shorter than distance of an order sequence route as illustrated in FIG. 11.

However, the embodiment is not limited to the above descriptions, and the first condition may be a condition requiring that the second detail condition is satisfied. In addition, the embodiment is not limited to the above descriptions, and the first condition may be a condition requiring that the first detail condition is satisfied.

Further, the first condition may be a condition requiring being a location that is different from the end point D1 and is on the partial route TD1 of the vicinity route G1D1 starting from the location T of the delivery vehicle 400 different from the starting point G1 of the vicinity route G1D1 as illustrated in FIG. 11 and reaching the end point D1 of the vicinity route G1D1. This is because, when a delivery request requesting pickup of an item at the pickup location GX satisfying the first condition as described above and delivery of the item to the delivery destination D2 is accepted, the distance of the non-order sequence route illustrated in FIG. 12 becomes shorter than the distance of the order sequence route illustrated in FIG. 11.

In other words, the reason is that, when the pickup location GX is located on the partial route TD1, the sum of the distance of the pickup route TGX and the distance of the delivery route GXD1 in the non-order sequence route is equal to the distance of the delivery route TD1 in the order sequence route. In addition, when the pickup location GX is different from the location of the end point D1 of the partial route TD1, the delivery route D1D2 in the non-order sequence route and the pickup route D1GX and the delivery route GXD2 in the order sequence route forms a triangle when the three routes are respectively straight line routes. Thus, the distance of the delivery route D1D2, which corresponds to one side of the triangle, in the non-order sequence route is shorter than the sum of the distance of the pickup route D1GX and the distance of the delivery route GXD2, which respectively correspond to the other two sides of the triangle, in the order sequence route.

In contrast, when a delivery request requesting pickup of an item at the pickup location GX that does not satisfy the first condition and delivery of the item to the delivery destination D2 is accepted, the distance of the non-order sequence route sometimes becomes shorter than the distance of the order sequence route and sometimes becomes longer than or equal to the distance of the order sequence route.

Because of the situations described above, in the present modified example, the identifier 130 of the information processing device 100 tries identification of, from among the pickup points G1 to G5, a pickup point that satisfies the first condition requiring being a location that is on the partial route TD1 and that is different from the end point D1, and determines whether or not such a pickup point is identified, in step S37 in FIG. 10 (step S37). In the present modified example, the identifier 130 determines that the pickup point G4 satisfies the first condition. Next, the identifier 130 identifies that the pickup point G4 is a suitable pickup point that enables the delivery efficiency to be improved without determining, with respect to the pickup point G4, whether or not the distance of the non-order sequence route is shorter than the distance of the order sequence route.

In contrast, in the present modified example, the identifier 130 of the information processing device 100 determines that none of the pickup points G1 to G3 and G5 satisfies the first condition. Next, the identifier 130 does not determine, with respect to each of the pickup points G1 to G3 and G5, whether or not the distance of the non-order sequence route is shorter than the distance of the order sequence route. Since the identifier 130 is thus not able to identify whether or not the pickup points G1 to G3 and G5 are located at a location that enables the delivery efficiency to be improved, the identifier 130 does not identify whether or not the pickup points G1 to G3 and G5 are suitable pickup points.

Subsequently, the identifier 130 of the information processing device 100 determines that the suitable pickup point G4 is identified (step S37; Yes) and determines the identified suitable pickup point G4 as a recommended pickup point to be recommended to the second user (step S38).

According to the configuration as described above, the identifier 130 of the information processing device 100 is capable of determining that the pickup point G4 is located at a location that enables the delivery efficiency to be improved when the identifier 130 determines that the pickup point G4 is located at a location that is on the partial route TD1 and that is different from the end point D1 of the partial route TD1. Thus, the identifier 130 is capable of determining that the pickup point G4 is located at a location that enables the delivery efficiency to be improved without determining whether or not, when a delivery request requesting pickup of an item at the pickup point G4 and delivery of the item is accepted, the distance of the non-order sequence route is shorter than the distance of the order sequence route. Accordingly, it is possible to reduce the amount of calculation required to determine that the pickup point G4 is located at a location that enables the delivery efficiency to be improved, compared with the case of determining that the distance of the non-order sequence route is shorter than the distance of the order sequence route.

Modified Example 7 of Embodiment

In the embodiment, it was described that the second detail condition in the first condition was a condition requiring being located at a location at which, in the case where a delivery request of the second user is accepted, distance of a non-order sequence route as illustrated in FIG. 12 is shorter than distance of an order sequence route as illustrated in FIG. 11.

However, the embodiment is not limited to the above description. A second detail condition according to the present modified example is a condition requiring being located at a location at which, in the case where a delivery request of the second user is accepted, movement time required for the delivery vehicle 400 to move along a non-order sequence route is shorter than movement time required for the delivery vehicle 400 to move along an order sequence route.

In order to calculate movement time along the order sequence route, the acquirer 110 of the information processing system 1 acquires information indicating a movement velocity of the delivery vehicle 400, which the information storage 190 stores. Next, the identifier 130 is required to identify the movement time along the order sequence route by dividing the distance of the order sequence route identified in step S37 in FIG. 10 by a movement velocity of the delivery vehicle 400 indicated by the acquired information. Likewise, the identifier 130 is required to identify movement time along the non-order sequence route by dividing the distance of the non-order sequence route by the movement velocity of the delivery vehicle 400.

In the present modified example, it was described that the identifier 130 of the information processing system 1 identified movement time required for the delivery vehicle 400 to move along the order sequence route, based on the movement velocity of the delivery vehicle 400 and the distance of the order sequence route. However, the embodiment is not limited to the description, and the identifier 130 may identify movement time required for the delivery vehicle 400 to move along the order sequence route, based on traffic conditions of the order sequence route.

For this purpose, the identifier 130 of the information processing system 1, by executing the processing in step S37 in FIG. 10, identifies an order sequence route. Next, the controller 145 generates a reply request requesting returning information that includes pieces of information respectively indicating a plurality of edges included in the order sequence route and that indicates traffic conditions of each of the plurality of edges. The information indicating an edge includes location information of the start node and location information of the end node of the edge.

Subsequently, the controller 145 of the information processing system 1 outputs the generated reply request to the data communication circuit 104a with a not-illustrated traffic server as the destination. In addition, the traffic conditions of an edge include passage time required to pass through the edge. Although the passage time of an edge is an average value of times that a plurality of delivery vehicles or vehicles having passed through the edge per unit time has required to pass the edge, the passage time may be a maximum value or a minimum value.

The traffic server stores a plurality of pieces of information indicating edges and a plurality of pieces of information indicating traffic conditions of the edges in association with each other. When the traffic server receives a reply request, the traffic server acquires pieces of information indicating traffic conditions associated with pieces of information respectively indicating a plurality of edges included in the reply request. Subsequently, the traffic server returns the acquired pieces of information respectively indicating the traffic conditions of the plurality of edges to the information processing device 100.

When the data communication circuit 104a of the information processing device 100 receives the pieces of information respectively indicating the traffic conditions of the plurality of edges from the traffic server, the acquirer 110 acquires the pieces of information from the data communication circuit 104a. Next, the identifier 130 identifies movement time along the order sequence route including the plurality of edges by calculating the sum of passage times of the plurality of edges indicated by the acquired pieces of information. Likewise, the identifier 130 identifies movement time along the non-order sequence route, based on traffic conditions of the non-order sequence route.

Modified Example 8 of Embodiment

Although, in the embodiment, the description was made using, as a specific example, a case where the vicinity route G1D1 is a final route, the embodiment is not limited thereto. In the present modified example, the following description is made using, as a specific example, a case where the vicinity route G1D1 is not a final route.

Figure 25:
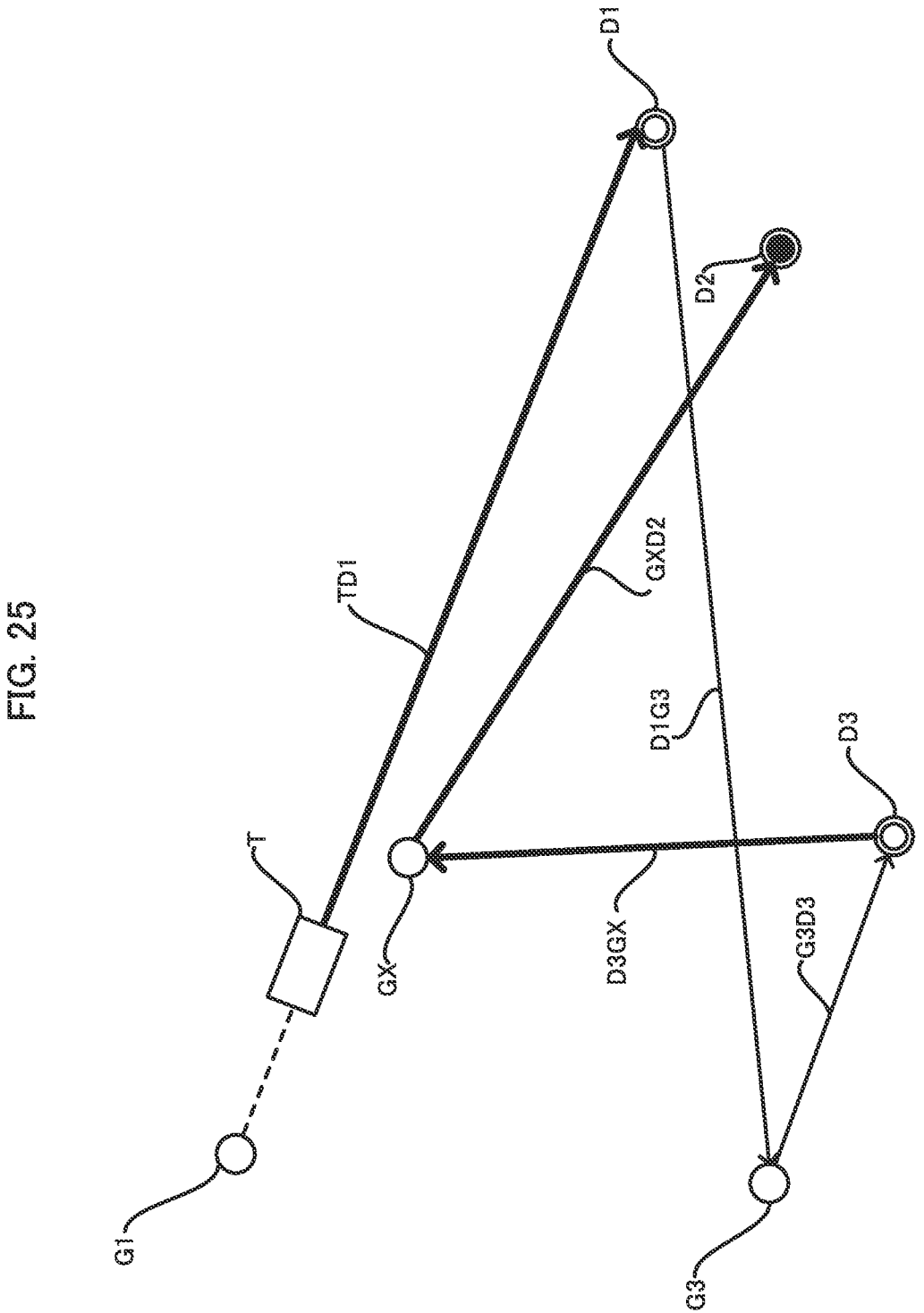
FIG. 25 is a diagram illustrating an example of an order sequence route in the case where the vicinity route is not a final route.

In the present modified example, after a delivery request of the first user is accepted, a delivery request of the third user is accepted. The delivery request of the first user is a request requesting pickup of the item I11 at the pickup point G1 and delivery of the item I11 to the delivery destination D1, and the delivery request of the third user is a request requesting pickup of the item I33 at the pickup point G3 and delivery of the item I33 to the delivery destination D3. Thus, the delivery vehicle 400 is scheduled to move along a pickup route D1G3 starting from the delivery destination D1 and reaching the pickup point G3 as illustrated in FIG. 25 in a stage of a route sequence immediately after the stage of the route sequence of the vicinity route G1D1 reaching the delivery destination D1 of the first user. In addition, the delivery vehicle 400 is scheduled to move along the delivery route G3D3 starting from the pickup point G3 and reaching the delivery destination D3 of the third user in a stage of the route sequence immediately after the stage of the route sequence of the pickup route D1G3.

Thus, the identifier 130 of the information processing device 100 determines that the vicinity route G1D1 is not the final route in step S36 in FIG. 10 (step S36; No), tries identification of a pickup point that satisfies a second condition described below, and determines whether or not a pickup point is identified (step S44).

The second condition is a condition requiring that both a first detail condition and a second detail condition in the second condition are satisfied. The first detail condition in the second condition is the same as the first detail condition in the first condition. That is, the first detail condition in the second condition is a condition requiring being a location on the vicinity route G1D1 or a location within a vicinity of the vicinity route G1D1.

Figure 26:
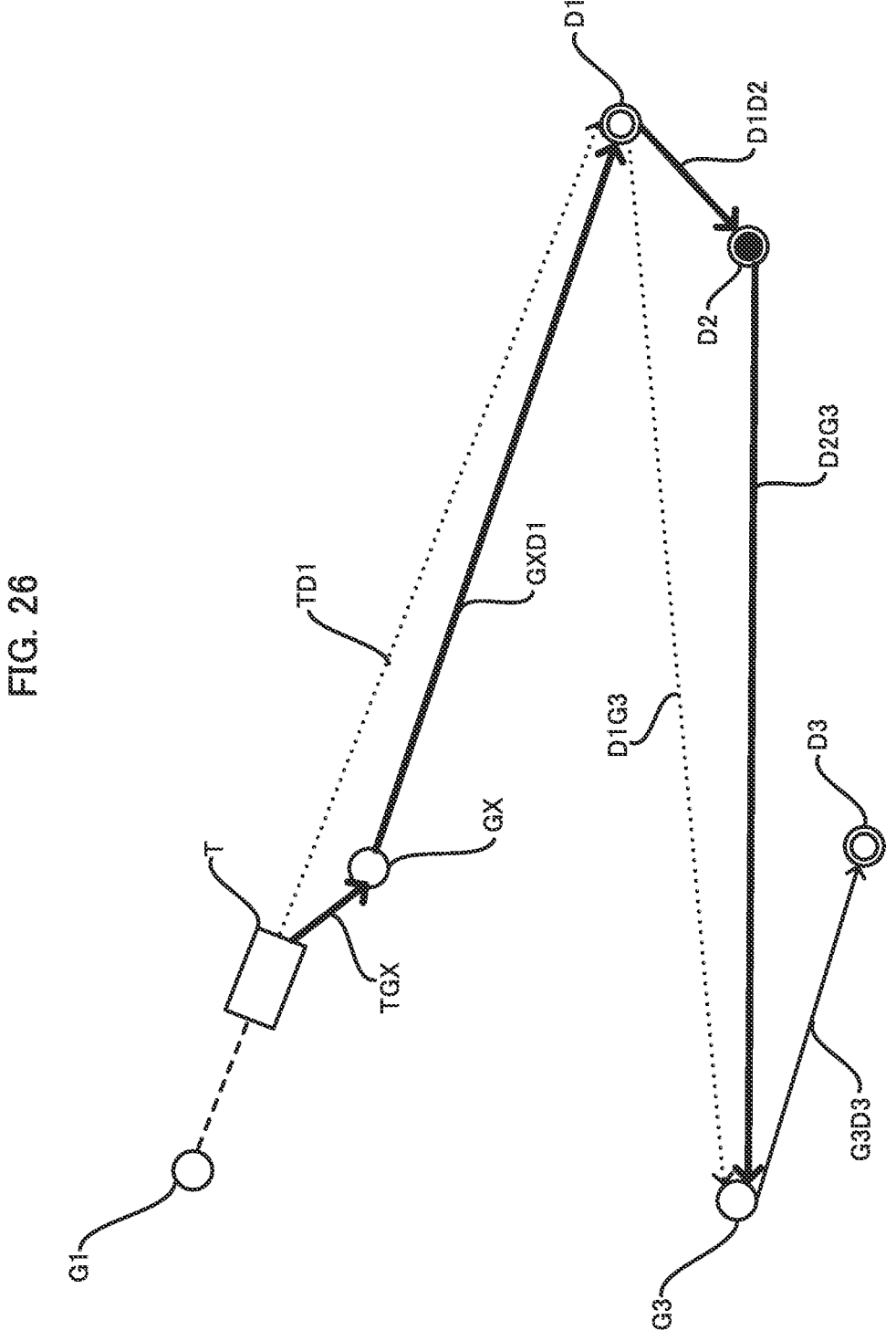
FIG. 26 is a diagram illustrating an example of a non-order sequence route in the case where the vicinity route is not a final route.

The second detail condition in the second condition is a condition requiring being located at a location at which, in the case where a delivery request of the second user is accepted, distance of a non-order sequence route as illustrated in FIG. 26 is shorter than distance of an order sequence route as illustrated in FIG. 25.

The order sequence route in FIG. 25 is a route that includes the delivery route TD1 starting from the location T of the delivery vehicle 400 and reaching the end point D1 of the vicinity route G1D1, a succeeding route D1G3 that is a pickup route in a stage of a route sequence immediately after the stage of the route sequence of the vicinity route G1D1, and the delivery route G3D3 that is the final route and is a route in a stage of the route sequence immediately after the stage of the route sequence of the succeeding route D1G3, in this order. In addition, the order sequence route is a route that includes, after the final route G3D3, a pickup route D3GX starting from an end point D3 of the final route G3D3 and reaching the pickup location GX at which pickup is performed in accordance with a delivery request of the second user, which is a succeeding request, and the delivery route GXD2 starting from the pickup location GX and reaching the delivery destination D2 of the second user in this order.

In contrast, the non-order sequence route in FIG. 26 is a route that includes the pickup route TGX starting from the location T of the delivery vehicle 400 and reaching the pickup location GX, the delivery route GXD1 starting from the pickup location GX and reaching the end point D1 of the vicinity route G1D1, and the delivery route D1D2 starting from the end point D1 of the vicinity route G1D1 and reaching the delivery destination D2 of the second user in this order. In addition, the non-order sequence route is a route that includes, after the delivery route D1D2, a pickup route D2G3 starting from the delivery destination D2 and reaching the pickup point G3 at which the item I33 is picked up in accordance with the delivery request of the third user, which was accepted before the delivery request of the second user, and the final route G3D3 starting from the pickup point G3 and reaching the delivery destination D3 of the third user in this order.

When the identifier 130 of the information processing device 100 determines that, from among the pickup points G1 to G5, a pickup point that is located at a location satisfying the first detail condition and the second detail condition in the second condition is identified (step S44 in FIG. 10; Yes), the identifier 130 continues the above-described process from step S38. In contrast, when the identifier 130 determines that no pickup point located at a location satisfying the second condition has been identified (step S44; No), the identifier 130 terminates the execution of the item recommendation processing.

Modified Example 9 of Embodiment

Although, in the embodiment, it was described that the extractor 125 of the information processing device 100 extracted the vicinity route G1D1 from among a delivery route along which the delivery vehicle 400 was moving and a delivery route along which the delivery vehicle 500 was moving, the embodiment is not limited thereto. The extractor 125 may extract a vicinity route from among a delivery route along which the delivery vehicle 400 is moving, a delivery route along which the delivery vehicle 500 is moving, a delivery route along which the delivery vehicle 400 has not started to move, and a delivery route along which the delivery vehicle 500 has not started to move. That is, the extractor 125 may extract a vicinity route from among delivery routes of items that are stored or are scheduled to be stored in one or more of the storage boxes 421 to 424 of the delivery vehicle 400 and the storage boxes 521 to 524 of the delivery vehicle 500.

The extractor 125 of the information processing device 100 may also extract a vicinity route from among a delivery route along which the delivery vehicle 400 has not started to move and a delivery route along which the delivery vehicle 500 has not started to move. That is, the extractor 125 may extract a vicinity route from among delivery routes of items that are scheduled to be stored in one or more of the storage boxes 421 to 424 of the delivery vehicle 400 and the storage boxes 521 to 524 of the delivery vehicle 500.

Modified Example 10 of Embodiment

Figure 27:
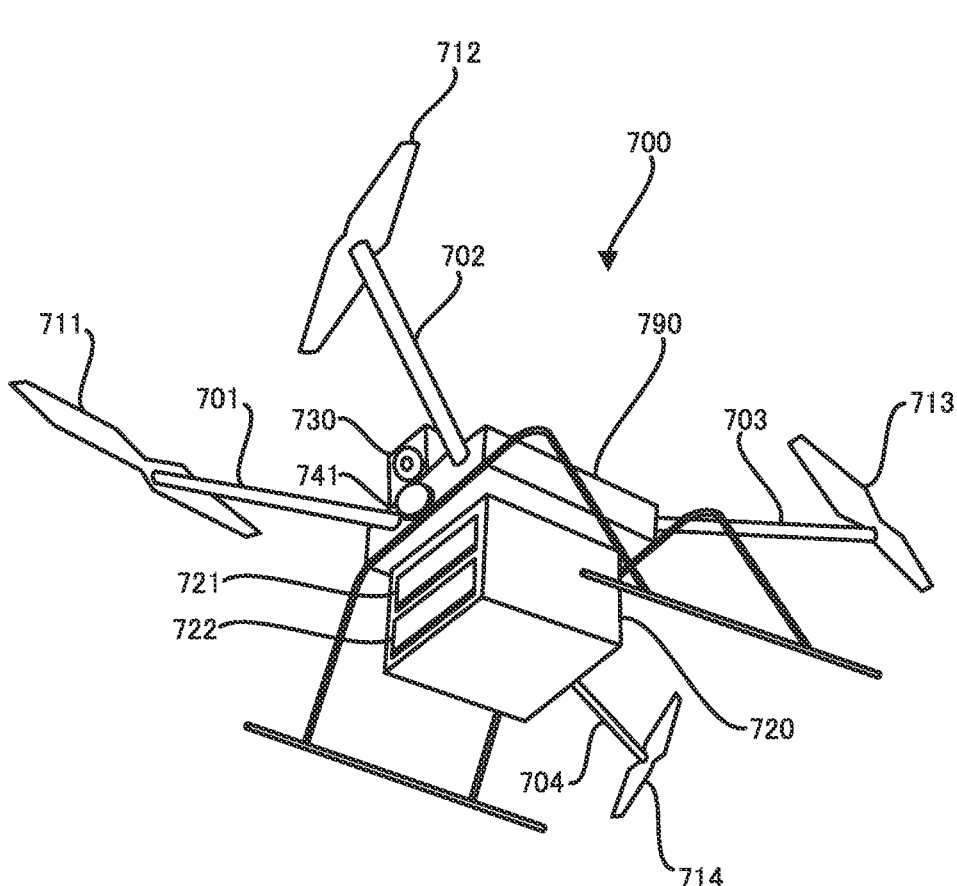
FIG. 27 is an appearance configuration diagram illustrating an appearance example of a delivery vehicle according to Modified Example 10 of the embodiment.

In the embodiment, it was described that the information processing system 1 included the delivery vehicles 400 and 500 that are unmanned ground vehicles. However, the embodiment is not limited to the configuration, and the information processing system 1 according to the present modified example includes a delivery vehicle 700, as illustrated in FIG. 27, that is an unmanned aircraft, such as a drone, and the delivery vehicle 500, which is an unmanned ground vehicle.

The delivery vehicle 700 according to the present modified example includes an information processing device 790 that controls an attitude and flight of the delivery vehicle 700 and propeller arms 701 and 702 and propeller arms 703 and 704 that protrude right forward and left forward from the front surface of the information processing device 790 and left rearward and right rearward from the back surface of the information processing device 790, respectively. In addition, the delivery vehicle 700 includes propellers 711 to 714 that are installed on the tips of the propeller arms 701 to 704, respectively and not-illustrated motors that rotate the propellers 711 to 714 in accordance with control by the information processing device 790.

Further, on the under surface of the information processing device 790 of the delivery vehicle 700, a storage cabinet 720 that includes a plurality of storage boxes 721 and 722 for storing items is installed. A configuration and functions of the storage cabinet 720 that the delivery vehicle 700 includes are the same as the configuration and functions of the storage cabinet 420 that the delivery vehicle 400 includes.

The delivery vehicle 700 also includes a LiDAR sensor 741 that is installed on the front surface of the information processing device 790 and a not-illustrated LiDAR sensor that is installed on the back surface of the information processing device 790. Configurations and functions of the LiDAR sensor 741 on the front surface and the LiDAR sensor on the back surface that the delivery vehicle 700 includes are the same as the configurations and functions of the LiDAR sensor 441 on the front surface and the LiDAR sensor on the back surface that the delivery vehicle 400 includes.

Configurations and functions of the hardware components that the information processing device 790 of the delivery vehicle 700 includes are the same as the configurations and functions of the hardware components that the information processing device 490 of the delivery vehicle 400 includes.

A not-illustrated drive circuit of the delivery vehicle 700 is connected to not-illustrated cables that are respectively connected to the not-illustrated motors that rotate the propellers 711 to 714. The drive circuit drives, in accordance with signals output by a CPU, the not-illustrated motors that rotate the propellers 711 to 714.

The not-illustrated CPU of the delivery vehicle 700 executes processing similar to the movement processing illustrated in FIG. 21. On this occasion, when the CPU of the delivery vehicle 700 receives a stop command, the CPU, by outputting, to the not-illustrated driver circuit, a control signal to cause the delivery vehicle 700 to perform hovering flight, back-and-forth flight, or circular flight at an altitude within a predetermined range or a control signal to cause the delivery vehicle 700 to land, stops movement of the delivery vehicle 700. Next, the CPU terminates the execution of the processing similar to the movement processing.

Subsequently, when a not-illustrated data communication circuit of the delivery vehicle 700 receives a movement start command, the CPU of the delivery vehicle 700 executes processing similar to the movement processing again. Through this processing, the delivery vehicle 700 resumes movement. Subsequently, when the CPU of the delivery vehicle 700 determines that the delivery vehicle 700 has arrived at the end point of a movement route, the CPU outputs, to the drive circuit, a control signal for landing at the end point and subsequently terminates the execution of the processing similar to the movement processing.

Although, in the embodiment and the present modified example, it was described that delivery vehicle 500 was a ground traveling vehicle, the embodiment and the present modified example are not limited thereto. The delivery vehicle 500 may be an unmanned aircraft that has the same configuration and functions as the configuration and functions of the delivery vehicle 700.

In addition, although, in the present modified example, it was described that the delivery vehicle 700 was an unmanned aircraft, the embodiment is not limited thereto, and the delivery vehicle 700 may be an unmanned flying object. Further, although, in the present modified example, it was described that the delivery vehicle 700 was a drone that gains lift and thrust from the propellers 711 to 714, the embodiment is not limited thereto. The delivery vehicle 700 may include wings and gain lift from the wings or may include a gasbag filled with gas the specific gravity of which is lower than air and gain lift from the gasbag. In addition, the delivery vehicle 700 may include a jet engine or a rocket engine and gain thrust from the jet engine or the rocket engine.

Modified Example 11 of Embodiment

Although, in the embodiment, it was described that the delivery destinations D1 to D3 were entrances to apartments where the first to third users lived, respectively, the embodiment is not limited thereto. The delivery destinations D1 to D3 may be any location, provided that the location is a location at which the delivery vehicles 400 and 500 can come to a stop or park or a location at which the delivery vehicle 700 can land.

Although, in the embodiment, it was described that the pickup points G1 to G5 were located at locations of entrances to the stores S1 to S5, respectively, the embodiment is not limited thereto. The pickup points G1 to G5 may be any location, provided that the location is located at a location at which the delivery vehicles 400 and 500 can come to a stop or park or a location at which the delivery vehicle 700 can land and is a point at which pickup of an item is performed. The pickup points G1 to G5 may, for example, be located at interior locations of the stores S1 to S5, respectively, may be located at locations in parking lots of the stores S1 to S5, respectively, may be located at locations in warehouses in which ordered items are stored, or may be located at locations at shipping doors of the warehouses.

The location at which the delivery vehicles 400 and 500 can come to a stop or park may be, for example, an entrance of an apartment complex, an office building, a hotel, a commercial facility, or a public facility or an entranceway of a house. The location at which the delivery vehicles 400 and 500 can come to a stop or park may also be a lobby of an apartment complex, an office building, a hotel, a commercial facility, or a public facility, a yard of a house, an apartment complex, an office building, a hotel, a commercial facility, or a public facility, a parking lot, a river beach, or a park.

The location at which the delivery vehicle 700 can land may be, in addition to the location at which the delivery vehicles 400 and 500 can come to a stop or park, a veranda or a rooftop of a house, an apartment complex, an office building, a hotel, a commercial facility, or a public facility.

Modified Example 12 of Embodiment

Although, in the embodiment, it was described that a target of an order was a commercial item, the embodiment is not limited thereto. The target of an order may be any object, provided that the object is a transportable object, and may be, for example, an object that does not serve as a target of a commercial transaction. In addition, the target of an order may be, instead of an object, a living thing.

Although, in the embodiment, it was described that an item was food and drink, the embodiment is not limited thereto, and an item may be an object different from food and drink, such as a book and an electric appliance.

Modified Example 13 of Embodiment

Although, in the embodiment, it was described that the information processing system 1 included two delivery vehicles, namely the delivery vehicles 400 and 500, the embodiment is not limited thereto. Although the information processing system 1 includes the delivery vehicle 400, the information processing system 1 does not have to include the delivery vehicle 500 or may include K (where K is an integer of 3 or more) delivery vehicles.

Although, in the embodiment, it was described that the delivery vehicle 400 included four storage boxes, namely the storage boxes 421 to 424, the embodiment is not limited thereto. The delivery vehicle 400 may include two, three, or I (where I is an integer of 5 or more) storage boxes. The delivery vehicle 500 may likewise include two, three, or I (where I is an integer of 5 or more) storage boxes.

Modified Example 14 of Embodiment

In the embodiment, it was described that the identifier 130 of the information processing device 100 determined a recommended pickup point G2 to be recommended to the second user from among the plurality of suitable pickup points G1, G2, and G4, which satisfied the first condition, in step S38 in FIG. 10. However, the embodiment is not limited to the above description. The identifier 130 may determine a plurality of recommended pickup points from among the suitable pickup points G1, G2, and G4 or may determine all of the suitable pickup points G1, G2, and G4 as recommended pickup points.

In addition, in the embodiment, it was described that the identifier 130 of the information processing device 100 determined a recommended item I22 to be recommended to the second user from among preparable items I22 and I23, in step S41 in FIG. 10. However, the embodiment is not limited to the above description. The identifier 130 may determine a plurality of or all items as recommended items from among the preparable items I22 and I23.

Modified Example 15 of Embodiment

Although, in the embodiment, the description was made using, as a specific example, a case where recommendation information is output in step S43 in FIG. 10, the embodiment is not limited thereto. In the present modified example, the following description is made using, as a specific example, a case where no recommendation information is output.

In step S31 in FIG. 10, when the acquirer 110 of the information processing device 100 cannot acquire a combination of a vehicle ID and a box ID associated with state information indicating the "vacant state" from the schedule table in FIG. 7, the extractor 125 determines that none of the storage boxes 421 to 424 of the delivery vehicle 400 and the storage boxes 521 to 524 of the delivery vehicle 500 is vacant (step S31; No). Thus, the controller 145 of the information processing device 100 determines that, even when an order recommended in recommendation information is accepted, an ordered transportable object can be stored in neither the delivery vehicle 400 nor 500 and terminates the execution of the item recommendation processing without outputting recommendation information.

In step S32 in FIG. 10, the acquirer 110 of the information processing device 100 tries acquisition of a box ID associated with the state information indicating the "storing state" and the vehicle ID "400" and acquisition of a box ID associated with the state information indicating the "storing state" and the vehicle ID "500" from the schedule table. On this occasion, when the acquirer 110 cannot acquire a box ID, the extractor 125 determines that no item is stored in any of the storage boxes 421 to 424 of the delivery vehicle 400, which is determined to have a vacancy, and the storage boxes 521 to 524 of the delivery vehicle 500, which is determined to have a vacancy (step S32; No). Since the controller 145 of the information processing device 100 thus cannot identify a pickup point that enables the delivery efficiency to be improved, the controller 145 determines that neither pickup point nor item can be recommended to the second user. Subsequently, the controller 145 terminates the execution of the item recommendation processing without outputting recommendation information.

In step S35 in FIG. 10, when distance between the delivery destination D2 and the end point D1 of the delivery route G1D1 illustrated in FIG. 2 is longer than the predetermined distance LD, the extractor 125 of the information processing device 100 determines that the end point D1 of the delivery route G1D1 is located neither at the delivery destination D2 of the second user nor within a vicinity of the delivery destination D2. Thus, the extractor 125 determines that, since the delivery route G1D1 is not a vicinity route, no vicinity route is extracted (step S35; No). Next, the controller 145 determines that no pickup point that enables the delivery efficiency to be improved can be identified and terminates the execution of the item recommendation processing.

In step S37 in FIG. 10, when the identifier 130 of the information processing device 100 determines that no suitable pickup point satisfying the first condition has been identified (step S37; No), the identifier 130 terminates the execution of the item recommendation processing.

In step S40 in FIG. 10, when the identifier 130 of the information processing device 100 determines that no preparable item has been identified (step S40; No), the identifier 130 terminates the execution of the item recommendation processing.

In step S83 in FIG. 23, when the terminal device 902 of the second user has not received recommendation information described in step S43 in FIG. 10 even when a predetermined period has elapsed since having received a permission report announcing that connection to the information processing device 100 was permitted (step S83; No), the terminal device 902 sends a store list send request to the information processing device 100 (step S90). The store list send request is a request requesting sending of a list of store IDs and names of the stores S1 to S5, which have the pickup points G1 to G5, respectively (hereinafter, referred to as a store list).

When the terminal device 902 receives information indicating a store list from the information processing device 100, the terminal device 902 displays the store list indicated by the received information (step S91). Subsequently, when the terminal device 902 determines, based on a signal output from the not-illustrated input device, that an operation to terminate execution of the app is performed without an operation of selecting one of the stores S1 to S5 (referred to as a store selection operation) being performed (step S92; No), the terminal device 902 terminates the execution of the order processing.

In contrast, when the terminal device 902 determines that the store selection operation is performed (step S92; Yes), the terminal device 902 acquires a store ID of the selected store, based on a signal output from the input device. Next, the terminal device 902 sends, to the information processing device 100, an item list send request that includes the acquired store ID and that requests sending of a list of item IDs and names of items sold at a store identified by the store ID (hereinafter, referred to as an item list) (step S93).

When the terminal device 902 receives information indicating an item list from the information processing device 100, the terminal device 902 displays the item list indicated by the received information (step S94). Subsequently, when the terminal device 902 determines, based on a signal output from the input device, that an operation for selecting a store again is performed without an operation of selecting an item (referred to as an item selection operation) being performed (step S95; No), the terminal device 902 repeats the above-described process from step S91.

In contrast, when the terminal device 902 determines that the item selection operation is performed (step S95; Yes), the terminal device 902 displays a message prompting ordering the selected item. Subsequently, when the terminal device 902 determines, based on a signal output from the input device, that an operation for selecting an item again is performed without an ordering operation being performed (step S96; No), the terminal device 902 repeats the above-described process from step S94.

In contrast, when the terminal device 902 determines that an ordering operation is performed (step S96; Yes), the terminal device 902 sends the order to the information processing device 100 (step S89) and subsequently terminates the execution of the order processing. In an order to be sent in the present modified example, a sales request is included. The sales request is a request that includes the store ID of a selected store and the item ID of a selected item and that requests the store to sell the item. In addition, in the order, a delivery request is included. The delivery request is a request that includes the store ID of the selected store and the user ID "U2" of the second user, who made the order, and that requests pickup of a sold item at a pickup point located in the selected store and delivery of the item to the delivery destination D2 of the second user.

When, in step S05 in FIG. 4, the acquirer 110 of the information processing device 100 determines that no order has been acquired from the data communication circuit 104a (step S05; No), the acquirer 110 tries acquisition of a store list send request from the data communication circuit 104a (step S15). On this occasion, when the acquirer 110 determines that a store list send request is acquired (step S15; Yes), the acquirer 110 acquires information indicating a store list, which is a list of store IDs and names of stores, from the store table in FIG. 8. Next, the controller 145 outputs the acquired information indicating the store list to the data communication circuit 104a with the terminal device 902, which sent the store list send request, as the destination (step S16). Subsequently, the information processing device 100 repeats the above-described process from step S05.

In step S15, when the acquirer 110 of the information processing device 100 determines that no store list send request has been acquired (step S15; No), the acquirer 110 tries acquisition of an item list send request from the data communication circuit 104a (step S17). On this occasion, when the acquirer 110 determines that no item list send request has been received (step S17; No), the acquirer 110 repeats the above-described process from step S05. In contrast, when the acquirer 110 determines that an item list send request is acquired (step S17; Yes), the acquirer 110 acquires the store ID included in the item list send request. Next, the acquirer 110 acquires information indicating an item list, which is a list of item IDs and item names associated with the acquired store ID, from the item table in FIG. 9. Subsequently, the controller 145 outputs the acquired information indicating the item list to the data communication circuit 104a with the terminal device 902, which sent the item list send request, as the destination (step S18). Subsequently, the information processing device 100 repeats the above-described process from step S05.

In step S09, the controller 145 of the information processing device 100 determines whether or not a combination of the store ID and the item ID acquired from the sales request that is accepted in step S08 coincides with a combination of the store ID "S2" and the item ID "I22" included in the recommendation information output in step S43 in FIG. 10. On this occasion, when the controller 145 determines that the combinations do not coincide with each other, the controller 145 determines that the request is not a delivery request requesting pickup of the recommended item I22 at the store S2, which has the recommended pickup point G2, and delivery of the item I22. That is, the controller 145 determines that, instead of a delivery request included in an order that is recommended by the recommendation information output in step S43, a delivery request requesting pickup of an item selected from the item list at a store selected from the store list and delivery of the item is accepted (step S09; No). Next, the controller 145 selects a delivery vehicle to be caused to deliver the item from among the delivery vehicles 400 and 500, based on a predetermined rule or software-generated random numbers.

Subsequently, the controller 145 of the information processing device 100 outputs a stop command to the data communication circuit 104a with the selected delivery vehicle as the destination (step S19). Next, the information processing device 100, by executing the processing in steps S13 and S14 (steps S13 and S14), adds a pickup schedule in which the selected delivery vehicle moves along a pickup route reaching a pickup point that the selected store has. The information processing device 100 also adds a delivery schedule in which the selected delivery vehicle moves along a delivery route starting from the pickup point and reaching the delivery destination D2 of the second user. In this way, the information processing device 100, after having added a schedule to cause the selected delivery vehicle to move along an order sequence route, terminates the execution of the sales brokerage processing. Next, the controller 145, by performing the movement control processing illustrated in FIG. 16, performs control to cause the selected delivery vehicle to move along the order sequence route, based on the added pickup schedule and delivery schedule.

Modified Example 16 of Embodiment

In the embodiment, the description was made using, as a specific example, a case where an ordering operation to make an order recommended by the recommendation information is performed on the terminal device 902 before the acceptance time limit is exceeded. However, the embodiment is not limited to the above description, and, in the present modified example, the following description is made using, as a specific example, a case where no ordering operation is made even when the acceptance time limit is exceeded.

Thus, when the terminal device 902 determines that the acceptance time limit is exceeded because the system time is a time later than the acceptance time limit, in step S86 in FIG. 23 (step S86; Yes), the terminal device 902 executes the above-described process from step S90. Through this processing, the terminal device 902 sends an order of an item that is to be picked up at a store selected from the store list and that is selected from the item list, in accordance with operation of the second user.

Note that, when, in step S88, the terminal device 902 determines that an operation performed by the second user is not an ordering operation, but an operation to cause the store list to be displayed (step S88; No), the terminal device 902 executes the above-described process from step S90.

Modified Example 17 of Embodiment

In the embodiment, it was described that the delivery vehicles 400 and 500 were unmanned ground vehicles. In addition, in Modified Example 10 of the embodiment, it was described that the delivery vehicle 700 was an unmanned aircraft. However, each of the delivery vehicles 400, 500, and 700 is not necessarily unmanned, and provided that, with the exception of control by the information processing device 100, the vehicle is an object that autonomously moves, a person may be on board the vehicle.

Modified Example 18 of Embodiment

Although, in the embodiment, it was described that the information processing system 100 included the information storage 190, the embodiment is not limited thereto. The information processing device 100 according to the present modified example does not include the information storage 190. The information processing device 100 according to the present modified example is connected to a not-illustrated information storage device that is, for example, a network attached storage (NAS) and that has the same functions as the functions of the information storage 190, via the Internet IN, and performs the sales brokerage processing illustrated in FIG. 4, the item recommendation processing illustrated in FIG. 10, and the movement control processing illustrated in FIG. 16, using information stored in the information storage device. The information processing system 1 according to the present modified example may include an information storage device or does not have to include an information storage device.

Modified Example 19 of Embodiment

Figure 28:
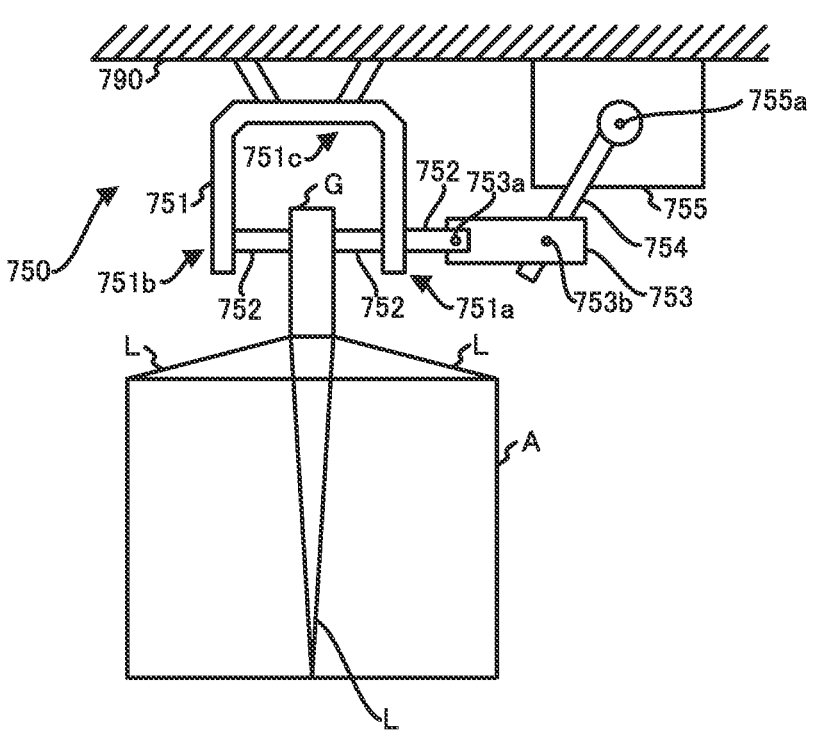
FIG. 28 is a diagram illustrating an example of a hook in a locked state that the delivery vehicle includes.

Although, in Modified Example 10 of the embodiment, it was described that the delivery vehicle 700 included the storage boxes 721 and 722 used for storage of items, the embodiment is not limited thereto. The delivery vehicle 700 according to the present modified example includes a plurality of hooks 750, as illustrated in FIG. 28, that is used to hang and load articles, in place of the storage boxes 721 and 722.

Each of the hooks 750 is, for example, a shackle and includes a body 751 that is, for example, a U-shaped fitting. The body 751 includes ends 751*a* and 751*b* that face each other and a crown 751*c* that is located on the side opposed to the ends 751*a* and 751*b* and that curves or bends. The crown 751*c* of the body 751 is fixed to the under surface of the information processing device 790 of the delivery vehicle 700 by, for example, a fixing fitting in such a way as to be located on the upper side of the ends 751*a* and 751*b*.

In the end 751*a* of the body 751, a not-illustrated through-hole is formed, a pin 752, which is, for example, a rod-shaped fitting, is inserted through the through-hole, and, on a face that is a surface of the end 751*b* and that faces the through-hole, a not-illustrated stopping hole that stops the tip of the pin 752 at the bottom thereof is formed.

Thus, in a state where the tip of the pin 752 inserted through the through-hole of the body 751 is stopped by the stopping hole of the body 751 (hereinafter, referred to as a locked state), the body 751 and the pin 752 of the hook 750 form a ring shape. On this occasion, when, for example, the pin 752 is inserted through a ring G, which is a ring-shaped fitting, and the ring G is coupled, by, for example, a string L, to an item A packaged with packaging material, the hook 750 is capable of hanging the item A coupled to the ring G.

Among two ends that the pin 752 has, the end on the opposite side to the end stopped by the body 751 is connected to a coupling member 753, which is, for example, a plate-shaped fitting or a rod-shaped fitting. The coupling member 753 is coupled to a swing member 754, which is fixed to a shaft 755*a* that a motor 755 has, at the end on the opposite side to a coupling point 753*a* to the pin 752. The coupling member 753 is swingably coupled about the coupling point 753*a* to the pin 752 and is swingably coupled about a coupling point 753*b* to the swing member 754.

The swing member 754 is, for example, a plate-shaped fitting or a rod-shaped fitting and is fixed to the shaft 755*a* of the motor 755 at a fixing point different from the coupling point 753*b* to the coupling member 753. The motor 755 is, for example, a stepping motor, is connected to the drive circuit of the information processing device 790 via a not-illustrated cable, and causes the shaft 755*a* to rotate in a predetermined direction (hereinafter, referred to as an unlocking direction) by a predetermined angle in accordance with a signal output from the drive circuit. Because of this configuration, when the swing member 754 is swung about the fixing point to the shaft 755*a* in a predetermined direction, the coupling point 753*b* to the coupling member 753 is moved in a direction in which the pin 752 is pulled out, as illustrated in FIG. 29. Since this motion causes the pin 752 coupled to the coupling member 753 to be moved in the pulled-out direction, the tip of the pin 752 is separated away from the stopping hole, which is formed on the end 751*b* of the body 751, and brought close to the end 751*a*.

In the present modified example, since the pin 752 is moved in the pulled-out direction by a distance equal to distance DB between the end 751*a* and end 751*b* of the body 751, the pin 752 is moved in the pulled-out direction to a location to which the tip of the pin 752 projects from the through-hole formed in the end 751*a* by a distance equal to depth DH of the stopping hole. In the present modified example, the depth DH of the stopping hole is designed to be sufficiently smaller than width TR in the pulled-out direction of the ring G, which is coupled to the item A. Thus, when the pin 752 is moved in the pulled-out direction by the distance DB, the pin 752 is pulled out from the ring G.

As described above, in a state where the tip of the pin 752 is separated away from the stopping hole of the body 751

(hereinafter, referred to as an unlocked state), the body 751 and pin 752 of the hook 750 do not form a ring shape. Further, the crown 751*c* of the body 751 is fixed to the under surface of the information processing device 790 of the delivery vehicle 700 in such a way that the ends 751*a* and 751*b* are located on the lower side of the crown 751*c*. Because of this configuration, when the hook 750 is brought from the locked state to the unlocked state and the pin 752 is pulled out from the ring G, the ring G falls freely in conjunction with the item A from an opening of the U-shaped body 751.

When the delivery vehicle 700 has landed, distance over which the item A falls freely is equal to a distance obtained by subtracting length in the vertical direction of the packaged item A from length in the vertical direction of each of the support legs, which the delivery vehicle 700 includes. Thus, the length of each of the support legs is designed, in advance, to be longer than the length in the vertical direction of the packaged item A by a length that enables damage to the item A due to free fall to be suppressed.

Note that the motor 755, by rotating the shaft 755*a* in the locking direction, which is the opposite direction to the unlocking direction, by an angle indicated by a signal output from the information processing device 790, changes the state of the hook 750 from the unlocked state to the locked state.

Although, in the present modified example, it was described that the hook 750 was a shackle, the embodiment is not limited thereto. The hook 750 may be any type of hook, provided that the hook is capable of hooking the ring G coupled to the item A and may be, for example, a carabiner or an eyehook. In addition, the shape of the body 751 of the hook 750 is not limited to a U-shape, and may be, for example, a V-shape, a C-shape, an S-shape, or a J-shape. Further, the body 751, pin 752, coupling member 753, and swing member 754 of the hook 750 are not limited to metal fittings, and may be, for example, fittings made of fiber reinforced plastic or wood.

In addition, although, in the present modified example, it was described that the pin 752 was moved in the pulled-out direction and the insertion direction by a distance equal to the distance DB between the end 751*a* and end 751*b* of the body 751, the embodiment is not limited thereto, and the pin 752 may be moved in the pulled-out direction and the insertion direction by a distance shorter or longer than the distance DB.

Further, although, in the present modified example, it was described that the packaging material was a cardboard box, the embodiment is not limited thereto, and the packaging material may be any material, provided that it is possible to package an item with the material, and the packaging material may be a plastic bag or a cloth bag.

Although, in the present modified example, it was described that the delivery vehicle 700, which is an unmanned aircraft, included the plurality of hooks 750 in place of the storage boxes 721 and 722 described in Modified Example 10 of the embodiment, the embodiment is not limited thereto. The delivery vehicle 500, which is a ground traveling vehicle or an unmanned aircraft, may include a plurality of hooks 750 in place of the storage boxes 521 to 524 or two not-illustrated storage boxes. In addition, the delivery vehicle 400, which is a ground traveling vehicle, may include a plurality of hooks 750 in place of the storage boxes 421 to 424.

Modified Example 20 of Embodiment

In the embodiment, it was described that the information processing system 1 included the information processing device 100. In addition, in the embodiment, it was described that the CPU 101 of the information processing device 100, by executing the sales brokerage processing illustrated in FIG. 4, the item recommendation processing illustrated in FIG. 10, and the movement control processing illustrated in FIG. 16, functioned as the acquirer 110, the authenticator 115, the detector 120, the extractor 125, the identifier 130, the estimator 135, the determiner 140, and the controller 145 that are illustrated in FIG. 5. In addition, it was described that the hard disk 103b of the information processing device 100 functioned as the information storage 190.

However, the embodiment is not limited to the configuration, and the information processing system 1 does not have to include the information processing device 100. In this case, the sales brokerage processing illustrated in FIG. 4, the item recommendation processing illustrated in FIG. 10, and the movement control processing illustrated in FIG. 16 may be executed by the CPU 491 of the information processing device 490 that delivery vehicle 400 includes. Therefore, the CPU 491 of the delivery vehicle 400 may function as not-illustrated functional units equivalent to the acquirer 110, the authenticator 115, the detector 120, the extractor 125, the identifier 130, the estimator 135, the determiner 140, and the controller 145 of the information processing device 100. In addition, the flash memory 493b of the delivery vehicle 400 may function as a not-illustrated functional unit equivalent to the information storage 190 of the information processing device 100.

In addition, the embodiment is not limited to the above configuration, the sales brokerage processing illustrated in FIG. 4, the item recommendation processing illustrated in FIG. 10, and the movement control processing illustrated in FIG. 16 may be executed by two or more of the CPU 101 of the information processing device 100, the CPU 491 of the delivery vehicle 400, and not-illustrated CPUs that the terminal devices 901 to 904 include in a distributed manner.

The embodiment and Modified Examples 1 to 20 of the embodiment of the present disclosure can be combined with one another.

It is possible to provide the present disclosure as not only the information processing device 100 that includes a configuration for achieving functions according to any one of the embodiment and Modified Examples 1 to 19 of the embodiment and the information processing device 490 that includes a configuration for achieving functions according to Modified Example 20 of the embodiment but also a system that is a system including a plurality of devices and that includes, as a whole system, a configuration for achieving functions according to any one of the embodiment and Modified Examples 1 to 20 of the embodiment of the present disclosure.

It is possible to provide the present disclosure as the information processing device 100 that includes, in advance, a configuration for achieving functions according to any one of the embodiment and Modified Examples 1 to 19 of the embodiment. It is also possible to, by applying a program, cause an existing information processing device to function as the information processing device 100 according to any one of the embodiment and Modified Examples 1 to 19 of the embodiment. That is, it is possible to, by a computer (CPU or the like) that controls an existing information processing device executing a program for achieving various functional configurations of the information processing device 100 exemplified in any one of the embodiment and Modified Examples 1 to 19 of the embodiment, cause the existing information processing device to function as the information processing device 100 according any one of the embodiment and Modified Examples 1 to 19 of the embodiment.

It is possible to provide the present disclosure as the information processing device 490 that includes, in advance, a configuration for achieving functions according to Modified Example 20 of the embodiment of the present disclosure. It is also possible to, by applying a program, cause an existing information processing device to function as the information processing device 490 according to Modified Example 20 of the embodiment. That is, it is possible to, by a computer (CPU or the like) that controls an existing information processing device executing a program for achieving various functional configurations of the information processing device 490 exemplified in Modified Example 20 of the embodiment, cause the existing information processing device to function as the information processing device 490 according to Modified Example 20 of the embodiment.

Any distribution method of such programs can be used, and the programs can be stored and distributed in a recording medium, such as a memory card, a compact disc (CD)-ROM, and a digital versatile disc (DVD)-ROM, or can be distributed via a communication medium, such as the Internet.

A method according to the present disclosure can be implemented using the information processing device 100 according to any one of the embodiment and Modified Examples 1 to 19 of the embodiment and the information processing device 490 according to Modified Example 20 of the embodiment. In addition, the method according to the present disclosure can be implemented using the information processing system 1 according to any one of the embodiment and Modified Examples 1 to 20 of the embodiment.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDICES

Appendix 1

An information processing system including:
at least one memory storing program code; and
at least one processor configured to access the program code and operate as instructed by the program code,
wherein the program code includes:
 control code configured to cause the at least one processor to, when a delivery request of a transportable object is accepted, perform control to cause a delivery vehicle having a plurality of storage boxes to deliver the transportable object;
 acquisition code configured to cause the at least one processor to, when it is detected that a user has accessed the information processing system, acquire a delivery destination set or estimated with respect to the user;
 extraction code configured to cause the at least one processor to, when one or more of the plurality of storage boxes are vacant, extract a vicinity route having an end point located at the acquired delivery destination of the user or within a vicinity of the delivery destination from among delivery routes of transportable objects stored in one or more of the plurality of storage boxes; and identification code configured to cause the at least one processor to identify a pickup point at which the delivery vehicle is able to pick up a transportable object before the delivery vehicle reaches the end point of the extracted vicinity route.

Appendix 2

The information processing system according to Appendix 1, wherein the vicinity route is a route along which the delivery vehicle is moving.

Appendix 3

The information processing system according to Appendix 1 or 2, wherein the identification code is configured to cause the at least one processor to identify the pickup point located on the vicinity route or located within a vicinity of the vicinity route.

Appendix 4

The information processing system according to any one of Appendices 1 to 3, wherein the program code further includes estimation code configured to cause the at least one processor to estimate movement time required for the delivery vehicle to move to the identified pickup point, and the identification code is configured to cause the at least one processor to identify a preparable transportable object that is a transportable object having preparation time required for preparation to make the transportable object ready for pickup at the identified pickup point less than or equal to the estimated movement time.

Appendix 5

The information processing system according to Appendix 4, wherein the estimation code is configured to cause the at least one processor to further estimate an arrival time at which the delivery vehicle arrives at the identified pickup point, the program code further includes determination code configured to cause the at least one processor to determine an acceptance time limit within which a delivery request of the preparable transportable object is acceptable, based on the estimated arrival time and the estimated preparation time, and the information processing system further includes a communication circuit configured to send information indicating the identified pickup point, the identified preparable transportable object, and the determined acceptance time limit to a terminal device of the user.

Appendix 6

The information processing system according to Appendix 5, wherein the communication circuit is configured to receive a delivery request requesting pickup of the preparable transportable object at the identified pickup point and delivery of the transportable object, and the identification code is configured to cause the at least one processor to, when the received delivery request is accepted, identify the pickup point that is a pickup location at which the preparable transportable object is picked up and that is located at a location at which, compared with movement time required for the delivery vehicle to move along an order sequence route for performing delivery to the end point of the vicinity route in accordance with a preceding request having been accepted before the received delivery request, pickup at the pickup location in accordance with a succeeding request that is the received delivery request, and delivery from the pickup location in accordance with the succeeding request in this order or distance of the order sequence route, movement time required for the delivery vehicle to move along a non-order sequence route for performing the pickup in accordance with the succeeding request, the delivery in accordance with the preceding request, and the delivery in accordance with the succeeding request in this order or distance of the non-order sequence route is shorter.

Appendix 7

The information processing system according to Appendix 6, wherein when a final route is the vicinity route, the final route being a route along which the delivery vehicle is scheduled to move last within a route along which the delivery vehicle is scheduled to move before the succeeding request is accepted, the order sequence route is a route including:

a partial route of the vicinity route starting from a location of the delivery vehicle and reaching the end point of the vicinity route;

a pickup route starting from the end point of the final route and reaching the pickup location; and a delivery route starting from the pickup location and reaching the delivery destination of the user in this order, and the non-order sequence route is a route including:

a pickup route starting from the location of the delivery vehicle and reaching the pickup location;

a delivery route starting from the pickup location and reaching the end point of the vicinity route; and a delivery route starting from the end point of the vicinity route and reaching the delivery destination of the user in this order.

Appendix 8

The information processing system according to Appendix 7, wherein when the final route is not the vicinity route, the order sequence route further includes, after the partial route, a succeeding route, movement along which by the delivery vehicle immediately after the vicinity route is scheduled before acceptance of the succeeding request, and includes, after the succeeding route, the pickup route starting from the end point of the final route and reaching the pickup location, and the non-order sequence route further includes, after the delivery route starting from the end point of the vicinity route and reaching the delivery destination of the user, a pickup route starting from the delivery destination of the user and reaching an end point of the succeeding route.

Appendix 9

The information processing system according to any one of Appendices 6 to 8, wherein the control code is configured to cause the at least one processor to perform control to, when the succeeding request is accepted, cause the delivery vehicle to move along the non-order sequence route.

Appendix 10

The information processing system according to any one of Appendices 5 to 9, wherein the communication circuit is configured to receive a connection request including identification information identifying the user and requesting connection to the information processing system, the program code further includes detection code configured to cause the at least one processor to, when the received connection request is approved, detect that the user has accessed the information processing system, the acquisition code is configured to cause the at least one processor to acquire the identification information from the connection request and cause the at least one processor to acquire, from a storage storing the identification information of the user and location information indicating a location of the delivery destination of the user in association with each other, the location information of the delivery destination associated with the acquired identification information, or cause the at least one processor to acquire location information indicating a location of the terminal device of the user as the location information indicating the location of the delivery destination, the storage is configured to further store, with respect to each of the one or more storage boxes of the plurality of storage boxes, a delivery schedule indicating the delivery route of the transportable object stored in the storage box, the extraction code is configured to cause the at least one processor to extract the delivery schedule indicating the vicinity route from one or more stored delivery schedules, based on the acquired location information of the delivery destination, the storage is configured to further store one or more pieces of location information respectively indicating one or a plurality of pickup points, and the identification code is configured to cause the at least one processor to identify the pickup point at which the delivery vehicle is able to pick up the transportable object before the delivery vehicle reaches the end point of the vicinity route, based on the one or more pieces of location information respectively indicating the locations of the one or plurality of pickup points and the extracted delivery schedule indicating the vicinity route.

Appendix 11

An information processing device including:

at least one memory storing program code; and at least one processor configured to access the program code and operate as instructed by the program code, wherein the program code includes:

control code configured to cause the at least one processor to, when a delivery request of a transportable object is accepted, perform control to cause a delivery vehicle having a plurality of storage boxes to deliver the transportable object;

acquisition code configured to cause the at least one processor to, when it is detected that a user has accessed the information processing device, acquire a delivery destination set or estimated with respect to the user;

extraction code configured to cause the at least one processor to, when one or more of the plurality of storage boxes are vacant, extract a vicinity route having an end point located at the acquired delivery destination of the user or within a vicinity of the delivery destination from among delivery routes of transportable objects stored in one or more of the plurality of storage boxes; and identification code configured to cause the at least one processor to identify a pickup point at which the delivery vehicle is able to pick up a transportable object before the delivery vehicle reaches the end point of the extracted vicinity route.

Appendix 12

A method that an information processing system or an information processing device executes, the method including:

when a delivery request of a transportable object is accepted, performing control to cause a delivery vehicle having a plurality of storage boxes to deliver the transportable object;

when it is detected that a user has accessed the information processing system or the information processing device, acquiring a delivery destination set or estimated with respect to the user;

when one or more of the plurality of storage boxes are vacant, extracting a vicinity route having an end point located at the acquired delivery destination of the user or within a vicinity of the delivery destination from among delivery routes of transportable objects stored in one or more of the plurality of storage boxes; and identifying a pickup point at which the delivery vehicle is able to pick up a transportable object before the delivery vehicle reaches the end point of the extracted vicinity route.

What is claimed is:

1. An information processing system, comprising:

at least one memory storing program code; and at least one processor configured to access the program code and operate as instructed by the program code, wherein the program code includes:

control code configured to cause the at least one processor to, based on determining a delivery request of a first transportable object is accepted, perform control to cause an autonomous delivery vehicle having a plurality of storage boxes to deliver the first transportable object;

acquisition code configured to cause the at least one processor to, based on detecting that a user has accessed the information processing system, acquire a delivery destination set or estimated with respect to the user;

extraction code configured to cause the at least one processor to, based on determining one or more of the plurality of storage boxes are vacant, extract a vicinity route having an end point located at the acquired delivery destination of the user or within a vicinity of the delivery destination from among delivery routes of transportable objects stored in one or more of the plurality of storage boxes, the transportable objects stored in the one or more of the plurality of storage boxes including the first transportable object; and identification code configured to cause the at least one processor to identify a pickup point at which the autonomous delivery vehicle is able to pick up a second transportable object before the autonomous delivery vehicle reaches the end point of the extracted vicinity route, wherein the information processing system further comprises a communication circuit configured to receive a succeeding request later than reception of a preceding request, the preceding request being the delivery request, the succeeding request being a delivery request requesting pick up of the second transportable object at the identified pickup point and delivery of the second transportable object, wherein the identification code is configured to cause the at least one processor to, based on determining the succeeding request is accepted, identify the pickup point that is located at a location at which a movement time required for the autonomous delivery vehicle to move along a non-order sequence route is shorter than a movement time required for the autonomous delivery vehicle to autonomously move along an order sequence route in accordance with light detection and ranging (LiDAR) sensor data indicating one or more objects on the order sequence route that the autonomous delivery vehicle avoids based on the LiDAR sensor data, wherein the order sequence route is a route for performing (i) delivery to the end point of the vicinity route in accordance with the preceding request, (ii) pickup at the pickup point in accordance with the succeeding request, and (iii) delivery in accordance with the succeeding request in this order, wherein the non-order sequence route is a route for performing (i) the pickup in accordance with the succeeding request, (ii) the delivery in accordance with the preceding request, and (iii) the delivery in accordance with the succeeding request in this order, and wherein the control code is configured to cause the at least one processor to perform control to, based on determining the succeeding request is accepted, (i) send a stop command to a data communication circuit of the autonomous delivery vehicle that causes one or more processors of the autonomous delivery vehicle to interpret the stop command and cause the autonomous delivery vehicle to stop while on the order-sequence route and (ii) send a start command to the data communication circuit of the autonomous delivery vehicle that causes the one or more processors of the autonomous delivery vehicle to interpret the start command and cause the autonomous delivery vehicle to autonomously move along the non-order sequence route in accordance with the LiDAR sensor data indicating one or more objects on the non-order sequence route that the autonomous delivery vehicle avoids based on the LiDAR sensor data.

2. The information processing system according to claim 1, wherein the vicinity route is a route along which the autonomous delivery vehicle is moving.

3. The information processing system according to claim 2, wherein the identification code is configured to cause the at least one processor to identify the pickup point located on the vicinity route or located within a vicinity of the vicinity route.

4. The information processing system according to claim 2, wherein the program code further includes estimation code configured to cause the at least one processor to estimate a movement time required for the autonomous delivery vehicle to move to the identified pickup point, the identification code is configured to cause the at least one processor to identify a preparable transportable object that is a transportable object having preparation time required for preparation to make the transportable object ready for pickup at the identified pickup point less than or equal to the estimated movement time, and the second transportable object is the preparable transportable object.

5. The information processing system according to claim 1, wherein the identification code is configured to cause the at least one processor to identify the pickup point located on the vicinity route or located within a vicinity of the vicinity route.

6. The information processing system according to claim 5, wherein the program code further includes estimation code configured to cause the at least one processor to estimate a movement time required for the autonomous delivery vehicle to move to the identified pickup point, the identification code is configured to cause the at least one processor to identify a preparable transportable object that is a transportable object having preparation time required for preparation to make the transportable object ready for pickup at the identified pickup point less than or equal to the estimated movement time, and the second transportable object is the preparable transportable object.

7. The information processing system according to claim 1, wherein the program code further includes estimation code configured to cause the at least one processor to estimate a movement time required for the autonomous delivery vehicle to move to the identified pickup point, the identification code is configured to cause the at least one processor to identify a preparable transportable object that is a transportable object having preparation time required for preparation to make the transportable object ready for pickup at the identified pickup point less than or equal to the estimated movement time, and the second transportable object is the preparable transportable object.

8. The information processing system according to claim 7, wherein the estimation code is configured to cause the at least one processor to further estimate an arrival time at which the autonomous delivery vehicle arrives at the identified pickup point, the program code further includes determination code configured to cause the at least one processor to determine an acceptance time limit within which the second delivery request of the preparable transportable object is acceptable, based on the estimated arrival time and the preparation time, and the communication circuit is configured to send information indicating the identified pickup point, the identified preparable transportable object, and the determined acceptance time limit to a terminal device of the user.

9. The information processing system according to claim 8, wherein the communication circuit is configured to receive a connection request including identification information identifying the user and requesting connection to the information processing system, the program code further includes detection code configured to cause the at least one processor to, based on determining the received connection request is approved, detect that the user has accessed the information processing system, the acquisition code is configured to cause the at least one processor to acquire the identification information from the connection request and cause the at least one processor to acquire, from a storage storing the identification information of the user and location information indicating a location of the delivery destination of the user in association with each other, the location information of the delivery destination associated with the acquired identification information, or cause the at least one processor to acquire location information indicating a location of the terminal device of the user as the location information indicating the location of the delivery destination, the storage is configured to further store, with respect to each of the one or more storage boxes of the plurality of storage boxes, a delivery schedule indicating a delivery route of a transportable object stored in a storage box, the transportable object stored in the storage box being the first transportable object or being a transportable object different from the first transportable object and the second transportable object, the extraction code is configured to cause the at least one processor to extract a delivery schedule indicating the vicinity route from one or more stored delivery schedules, based on the acquired location information of the delivery destination, the storage is configured to further store one or a plurality of pieces of location information respectively indicating pickup points, and the identification code is configured to cause the at least one processor to identify the pickup point at which the autonomous delivery vehicle is able to pick up the second transportable object before the autonomous delivery vehicle reaches the end point of the vicinity route, based on the one or plurality of pieces of location information respectively indicating the locations of the pickup points and the extracted delivery schedule indicating the vicinity route.

10. The information processing system according to claim 8, wherein based on determining a final route is the vicinity route, the final route being a route along which the autonomous delivery vehicle is scheduled to move last within routes along which the autonomous delivery vehicle is scheduled to move before the succeeding request is accepted, the order sequence route further includes:

a partial route of the vicinity route starting from a location of the autonomous delivery vehicle and reaching the end point of the vicinity route;

a pickup route starting from the end point of the final route and reaching the pickup location; and a delivery route starting from the pickup location and reaching the delivery destination of the user in this order, and the non-order sequence route further includes:

a pickup route starting from the location of the autonomous delivery vehicle and reaching the pickup location;

a delivery route starting from the pickup location and reaching the end point of the vicinity route; and a delivery route starting from the end point of the vicinity route and reaching the delivery destination of the user in this order.

11. The information processing system according to claim 10, wherein based on determining the final route is not the vicinity route, the order sequence route further includes:

after the partial route, a succeeding route, movement along which by the autonomous delivery vehicle immediately after the vicinity route is scheduled before acceptance of the succeeding request, and includes, after the succeeding route, the pickup route starting from the end point of the final route and reaching the pickup location, and the non-order sequence route further includes, after the delivery route starting from the end point of the vicinity route and reaching the delivery destination of the user, a pickup route starting from the delivery destination of the user and reaching an end point of the succeeding route.

12. The information processing system according to claim 11, wherein the communication circuit is configured to receive a connection request including identification information identifying the user and requesting connection to the information processing system, the program code further includes detection code configured to cause the at least one processor to, based on determining the received connection request is approved, detect that the user has accessed the information processing system, the acquisition code is configured to cause the at least one processor to acquire the identification information from the connection request and cause the at least one processor to acquire, from a storage storing the identification information of the user and location information indicating a location of the delivery destination of the user in association with each other, the location information of the delivery destination associated with the acquired identification information, or cause the at least one processor to acquire location information indicating a location of the terminal device of the user as the location information indicating the location of the delivery destination, the storage is configured to further store, with respect to each of the one or more storage boxes of the plurality of storage boxes, a delivery schedule indicating a delivery route of a transportable object stored in a storage box, the transportable object stored in the storage box being the first transportable object or being a transportable object different from the first transportable object and the second transportable object, the extraction code is configured to cause the at least one processor to extract a delivery schedule indicating the vicinity route from one or more stored delivery schedules, based on the acquired location information of the delivery destination, the storage is configured to further store one or a plurality of pieces of location information respectively indicating pickup points, and the identification code is configured to cause the at least one processor to identify the pickup point at which the autonomous delivery vehicle is able to pick up the second transportable object before the autonomous delivery vehicle reaches the end point of the vicinity route, based on the one or plurality of pieces of location information respectively indicating the locations of the pickup points and the extracted delivery schedule indicating the vicinity route.

13. The information processing system according to claim 10, wherein the communication circuit is configured to receive a connection request including identification information identifying the user and requesting connection to the information processing system, the program code further includes detection code configured to cause the at least one processor to, based on determining the received connection request is approved, detect that the user has accessed the information processing system, the acquisition code is configured to cause the at least one processor to acquire the identification information from the connection request and cause the at least one processor to acquire, from a storage storing the identification information of the user and location information indicating a location of the delivery destination of the user in association with each other, the location information of the delivery destination associated with the acquired identification information, or cause the at least one processor to acquire location information indicating a location of the terminal device of the user as the location information indicating the location of the delivery destination, the storage is configured to further store, with respect to each of the one or more storage boxes of the plurality of storage boxes, a delivery schedule indicating a delivery route of a transportable object stored in a storage box, the transportable object stored in the storage box being the first transportable object or being a transportable object different from the first transportable object and the second transportable object, the extraction code is configured to cause the at least one processor to extract a delivery schedule indicating the vicinity route from one or more stored delivery schedules, based on the acquired location information of the delivery destination, the storage is configured to further store one or a plurality of pieces of location information respectively indicating pickup points, and the identification code is configured to cause the at least one processor to identify the pickup point at which the autonomous delivery vehicle is able to pick up the second transportable object before the autonomous delivery vehicle reaches the end point of the vicinity route, based on the one or plurality of pieces of location information respectively indicating the locations of the pickup points and the extracted delivery schedule indicating the vicinity route.

14. The information processing system according to claim 1, wherein the communication circuit is configured to send, after the pickup point is identified, to a terminal device of the user, information indicating the identified pickup point, and receive, from the terminal device of the user, the succeeding request requesting pick up of the second transportable object at the identified pickup point and delivery of the second transportable object.

15. The information processing system according to claim 1, wherein the delivery in accordance with the preceding request is a delivery to the end point of the vicinity route, the delivery in accordance with the succeeding request is a delivery to the delivery destination of the user, and the end point of the vicinity route and the delivery destination of the user are different from each other.

16. An information processing device, comprising:

at least one memory storing program code; and at least one processor configured to access the program code and operate as instructed by the program code, wherein the program code includes:

control code configured to cause the at least one processor to, based on determining a delivery request of a first transportable object is accepted, perform control to cause an autonomous delivery vehicle having a plurality of storage boxes to deliver the first transportable object;

acquisition code configured to cause the at least one processor to, based on detecting that a user has accessed the information processing device, acquire a delivery destination set or estimated with respect to the user;

extraction code configured to cause the at least one processor to, based on determining one or more of the plurality of storage boxes are vacant, extract a vicinity route having an end point located at the acquired delivery destination of the user or within a vicinity of the delivery destination from among delivery routes of transportable objects stored in one or more of the plurality of storage boxes, the transportable objects stored in the one or more of the plurality of storage boxes including the first transportable object; and identification code configured to cause the at least one processor to identify a pickup point at which the autonomous delivery vehicle is able to pick up a second transportable object before the autonomous delivery vehicle reaches the end point of the extracted vicinity route, wherein the information processing device further comprises a communication circuit configured to receive a succeeding request later than reception of a preceding request, the preceding request being the delivery request, the succeeding request being a delivery request requesting pick up of the second transportable object at the identified pickup point and delivery of the second transportable object, wherein the identification code is configured to cause the at least one processor to, based on determining the succeeding request is accepted, identify the pickup point that is located at a location at which a movement time required for the autonomous delivery vehicle to move along a non-order sequence route is shorter than a movement time required for the autonomous delivery vehicle to move autonomously along an order sequence route in accordance with the LiDAR sensor data indicating one or more objects on the non-order sequence route that the autonomous delivery vehicle avoids based on the LiDAR sensor data, wherein the order sequence route is a route for performing (i) delivery to the end point of the vicinity route in accordance with the preceding request, (ii) pickup at the pickup point in accordance with the succeeding request, and (iii) delivery in accordance with the succeeding request in this order, wherein the non-order sequence route is a route for performing (i) the pickup in accordance with the succeeding request, (ii) the delivery in accordance with the preceding request, and (iii) the delivery in accordance with the succeeding request in this order, and wherein the control code is configured to cause the at least one processor to perform control to, based on determining the succeeding request is accepted, (i) send a stop command to a data communication circuit of the autonomous delivery vehicle that causes one or more processors of the autonomous delivery vehicle to interpret the stop command and cause the autonomous delivery vehicle to stop while on the order-sequence route and (ii) send a start command to the data communication circuit of the autonomous delivery vehicle that causes the one or more processors of the autonomous delivery vehicle to interpret the start command and cause the autonomous delivery vehicle to autonomously move along the non-order sequence route in accordance with the LiDAR sensor data indicating one or more objects on the non-order sequence route that the autonomous delivery vehicle avoids based on the LiDAR sensor data.

17. The information processing device according to claim 16, wherein the communication circuit is configured to send, after the pickup point is identified, to a terminal device of the user, information indicating the identified pickup point, and receive, from the terminal device of the user, the succeeding request requesting pick up of the second transportable object at the identified pickup point and delivery of the second transportable object.

18. A method that an information processing system or an information processing device executes, the method comprising:

based on determining a delivery request of a first transportable object is accepted, performing control to cause an autonomous delivery vehicle having a plurality of storage boxes to deliver the first transportable object;

based on detecting that a user has accessed the information processing system or the information processing device, acquiring a delivery destination set or estimated with respect to the user;

based on determining one or more of the plurality of storage boxes are vacant, extracting a vicinity route having an end point located at the acquired delivery destination of the user or within a vicinity of the delivery destination from among delivery routes of transportable objects stored in one or more of the plurality of storage boxes, the transportable objects stored in the one or more of the plurality of storage boxes including the first transportable object;

identifying a pickup point at which the autonomous delivery vehicle is able to pick up a second transportable object before the autonomous delivery vehicle reaches the end point of the extracted vicinity route;

receiving a succeeding request later than reception of a preceding request, the preceding request being the delivery request, the succeeding request being a delivery request requesting pick up of the second transportable object at the identified pickup point and delivery of the second transportable object;

based on determining the succeeding request is accepted, identifying the pickup point that is located at a location at which a movement time required for the autonomous delivery vehicle to move along a non-order sequence route is shorter than a movement time required for the autonomous delivery vehicle to autonomously move along an order sequence route in accordance with light detection and ranging (LiDAR) sensor data indicating one or more objects on the order sequence route that the autonomous delivery vehicle avoids based on the LiDAR sensor data, wherein the order sequence route is a route for performing (i) delivery to the end point of the vicinity route in accordance with the preceding request, (ii) pickup at the pickup point in accordance with the succeeding request, and (iii) delivery in accordance with the succeeding request in this order, wherein the non-order sequence route is a route for performing (i) the pickup in accordance with the succeeding request, (ii) the delivery in accordance with the preceding request, and (iii) the delivery in accordance with the succeeding request in this order; and based on determining the succeeding request is accepted, (i) send a stop command to a data communication circuit of the autonomous delivery vehicle that causes one or more processors of the autonomous delivery vehicle to interpret the stop command and cause the autonomous delivery vehicle to stop while on the order-sequence route and (ii) send a start command to the data communication circuit of the autonomous delivery vehicle that causes the one or more processors of the autonomous delivery vehicle to interpret the start command and cause the autonomous delivery vehicle to autonomously move along the non-order sequence route in accordance with the LiDAR sensor data indicating one or more objects on the non-order sequence route that the autonomous delivery vehicle avoids based on the LiDAR sensor data.

19. The method according to claim 18, further comprising:

sending, after the pickup point is identified, to a terminal device of the user, information indicating the identified pickup point, and receiving, from the terminal device of the user, the succeeding request requesting pick up of the second transportable object at the identified pickup point and delivery of the second transportable object.

* * * * *